US012684454B2

(12) United States Patent
Bangolae et al.

(10) Patent No.: US 12,684,454 B2
(45) Date of Patent: Jul. 14, 2026

(54) SIDELINK RELAY ENHANCEMENTS TO SUPPORT MULTIPATH

(71) Applicant: Intel Corporation, Santa Clara, CA (US)

(72) Inventors: Sangeetha L. Bangolae, Portland, OR (US); Rafia Malik, Hillsboro, OR (US); Youn Hyoung Heo, San Jose, CA (US); Ansab Ali, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/346,541

(22) Filed: Jul. 3, 2023

(65) Prior Publication Data

US 2023/0354152 A1    Nov. 2, 2023

Related U.S. Application Data

(60) Provisional application No. 63/411,459, filed on Sep. 29, 2022, provisional application No. 63/358,372, filed on Jul. 5, 2022, provisional application No. 63/358,376, filed on Jul. 5, 2022.

(51) Int. Cl.
| | |
|---|---|
| *H04W 40/22* | (2009.01) |
| *H04W 40/12* | (2009.01) |
| *H04W 88/06* | (2009.01) |

(52) U.S. Cl.
CPC .......... *H04W 40/22* (2013.01); *H04W 40/12* (2013.01); *H04W 88/06* (2013.01)

(58) Field of Classification Search
CPC ..... H04W 40/22; H04W 40/12; H04W 88/06; H04W 88/04
See application file for complete search history.

(56) References Cited

U.S. PATENT DOCUMENTS

| | | | |
|---|---|---|---|
| 2019/0296805 A1* | 9/2019 | Son | H04W 76/27 |
| 2023/0199614 A1* | 6/2023 | Wang | H04W 40/12 |
| | | | 370/315 |
| 2023/0319931 A1* | 10/2023 | Zhou | H04W 76/18 |
| | | | 370/216 |

OTHER PUBLICATIONS

3GPP, "Technical Specification Group Radio Access Network; NR; Radio Resource Control (RRC) protocol specification (Release 17)," 3GPP TS 38.331 V17.0.0 (Mar. 2022), 5G, 1221 pages.
3GPP, "Technical Specification Group Radio Access Network; NR; Packet Data Convergence Protocol (PDCP) specification (Release 17)," 3GPP TS 38.323 V17.0.0 (Mar. 2022),. 5G, 46 pages.
3GPP, "Technical Specification Group Radio Access Network; NR; Medium Access Control (MAC) protocol specification (Release 17), "3GPP TS 38.321 V17.0.0 (Mar. 2022), 5G, 221 pages.

(Continued)

*Primary Examiner* — Shawn D Miller

(74) *Attorney, Agent, or Firm* — Schwegman Lundberg & Woessner, P.A.

(57) ABSTRACT

Various embodiments herein provide techniques related to sidelink relay enhancements in a cellular network. In some embodiments, a UE may include circuitry configured to identify, from a gNodeB (gNB) of a serving cell to which the UE and one or more relay UEs belong, a medium access control (MAC) control element (CE); and identifying, based on the MAC CE, that the UE is to communicate with the gNB via multipath communication. Other embodiments may be described and/or claimed.

8 Claims, 34 Drawing Sheets

(56)                References Cited

OTHER PUBLICATIONS

3GPP, "Technical Specification Group Radio Access Network; NR; NR and NG-RAN Overall Description; Stage 2 (Release 17)," 3GPP TS 38.300 V17.0.0 (Mar. 2022), 5G, 204 pages.
3GPP, "Technical Specification Group Radio Access Network; Evolved Universal Terrestrial Radio Access (E-UTRA) and NR; Multi-connectivity; Stage 2 (Release 17)," 3GPP TS 37.340 V17.0.0 (Mar. 2022), 5G, 110 pages.
3GPP, "Technical Specification Group Services and System Aspects; System architecture for the 5G System (5GS); Stage 2 (Release 17)," 3GPP TS 23.501 V17.5.0 (Jun. 2022), 5G, 568 pages.
3GPP, "Technical Specification Group Services and System Aspects; Architecture enhancements for 5G System (5GS) to support Vehicle-to-Everything (V2X) services (Release 17)," 3GPP TS 23.287 V17.3.0 (Jun. 2022), 5G, 60 pages.
3GPP, "Technical Specification Group Services and System Aspects; Service requirements for cyber-physical control applications in vertical domains; Stage 1 (Release 18)," 3GPP TS 22.104 V18.3.0 (Dec. 2021), 5G, 101 pages.

* cited by examiner

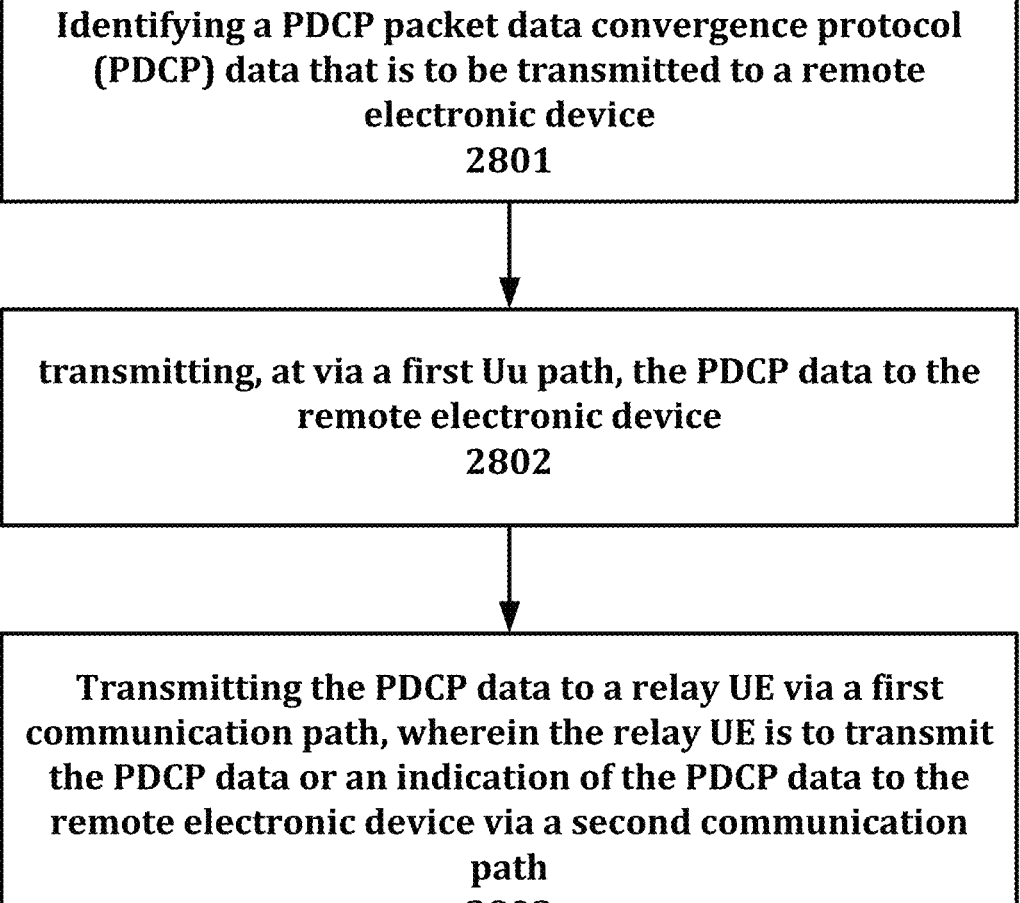

Identifying a PDCP packet data convergence protocol (PDCP) data that is to be transmitted to a remote electronic device
2801 transmitting, at via a first Uu path, the PDCP data to the remote electronic device
2802

Transmitting the PDCP data to a relay UE via a first communication path, wherein the relay UE is to transmit the PDCP data or an indication of the PDCP data to the remote electronic device via a second communication path
2803

Figure 29:
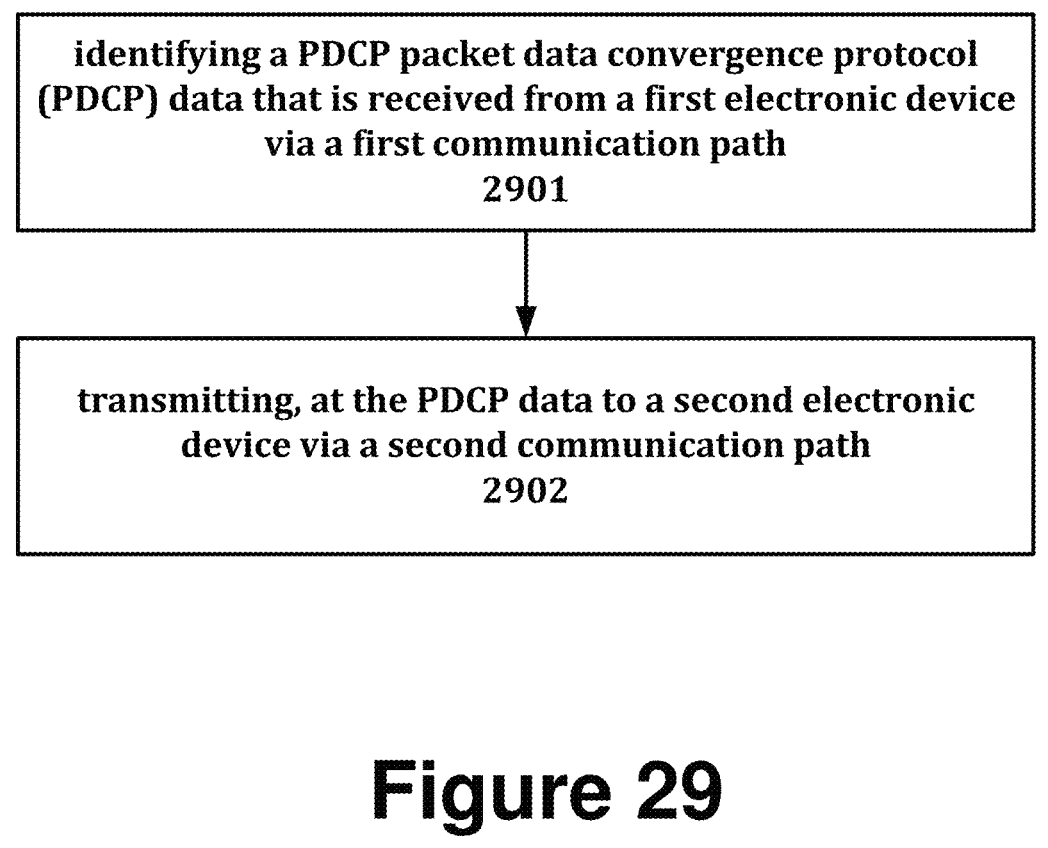

Figure 28 identifying a PDCP packet data convergence protocol
(PDCP) data that is received from a first electronic device
via a first communication path
2901 transmitting, at the PDCP data to a second electronic
device via a second communication path
2902

Figure 30:
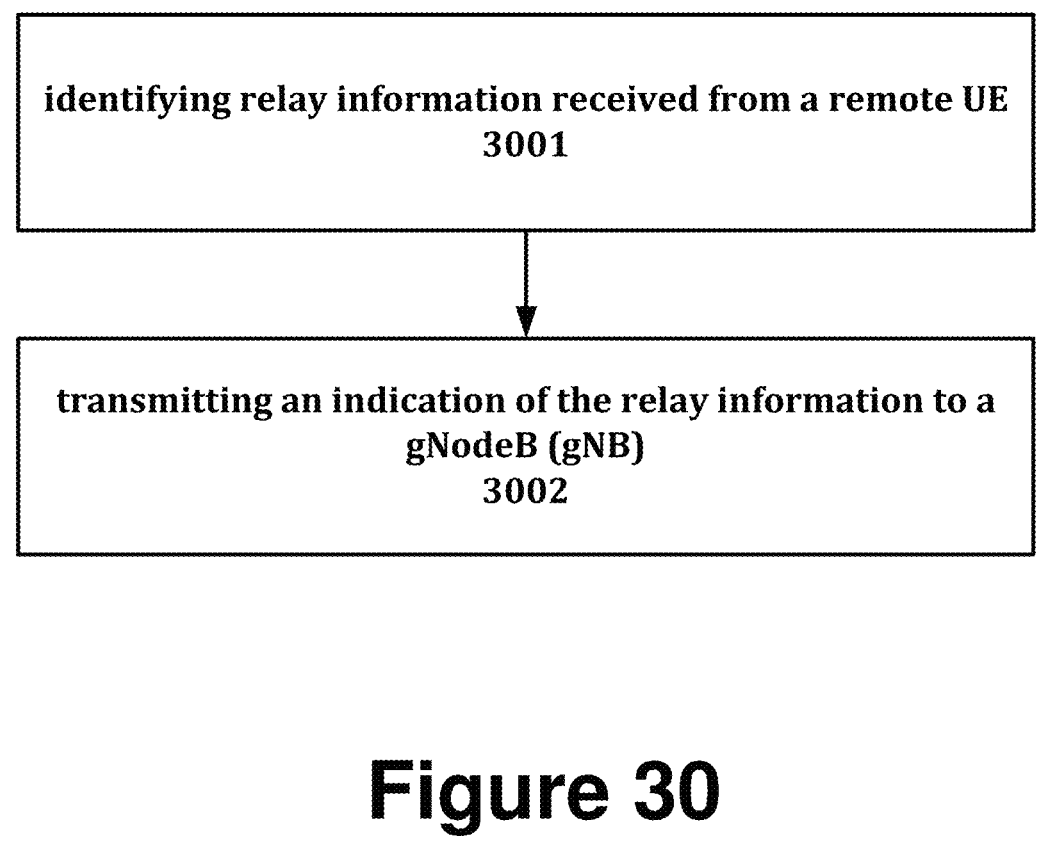

Figure 29 identifying relay information received from a remote UE
3001 transmitting an indication of the relay information to a
gNodeB (gNB)
3002

Figure 31:
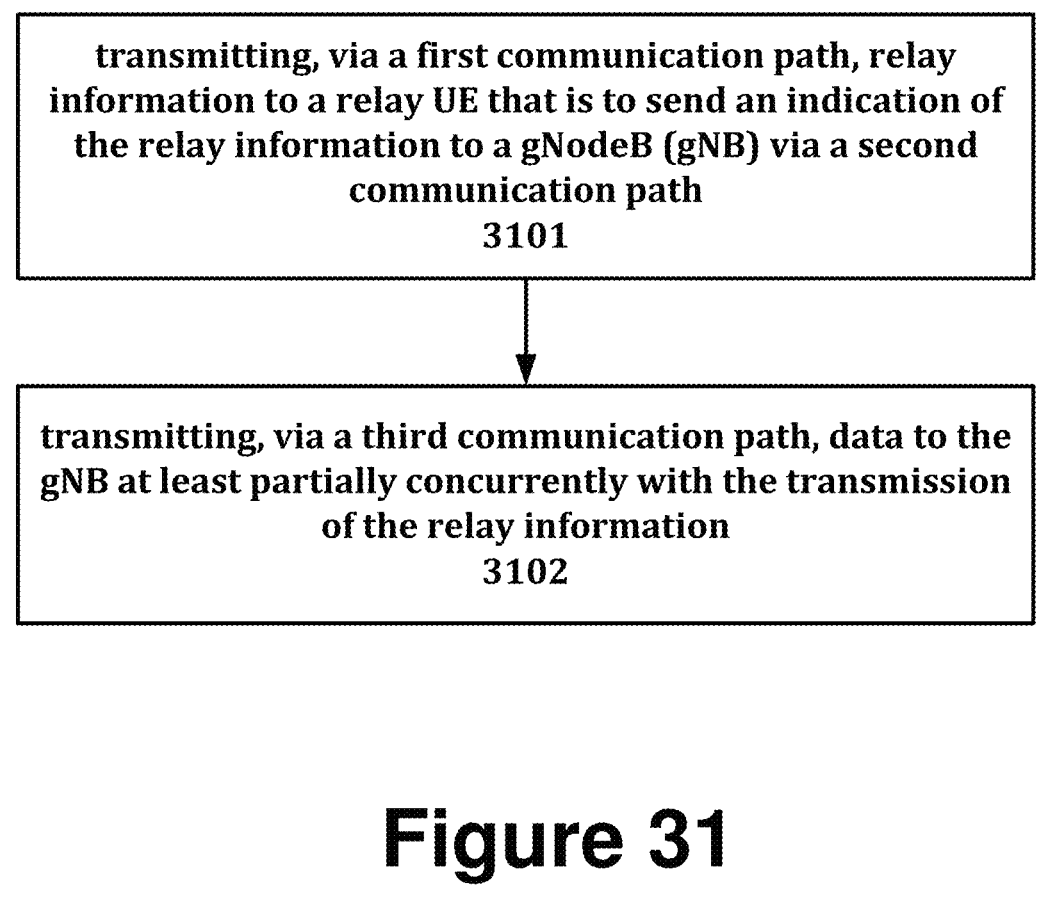

Figure 30 transmitting, via a first communication path, relay
information to a relay UE that is to send an indication of
the relay information to a gNodeB (gNB) via a second
communication path
3101 transmitting, via a third communication path, data to the
gNB at least partially concurrently with the transmission
of the relay information
3102

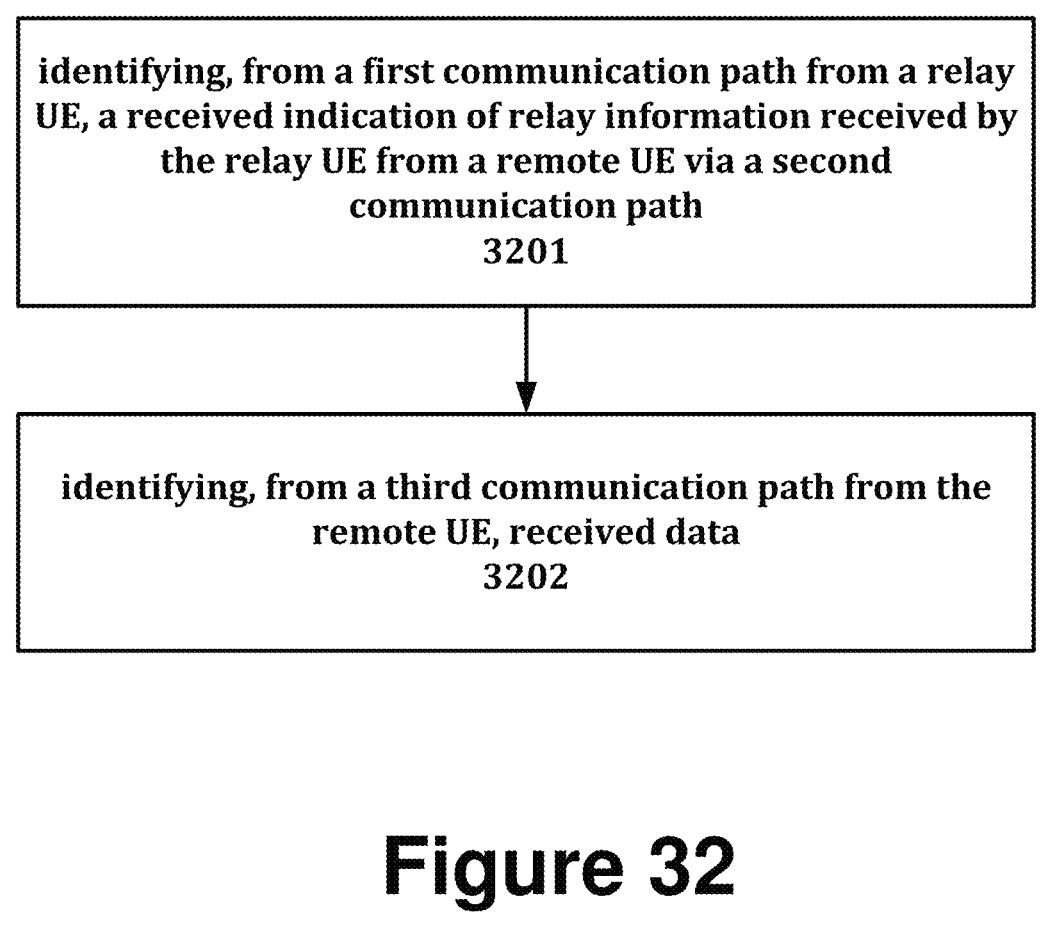

Figure 31 identifying, from a first communication path from a relay UE, a received indication of relay information received by the relay UE from a remote UE via a second communication path
3201 identifying, from a third communication path from the remote UE, received data
3202

Figure 32

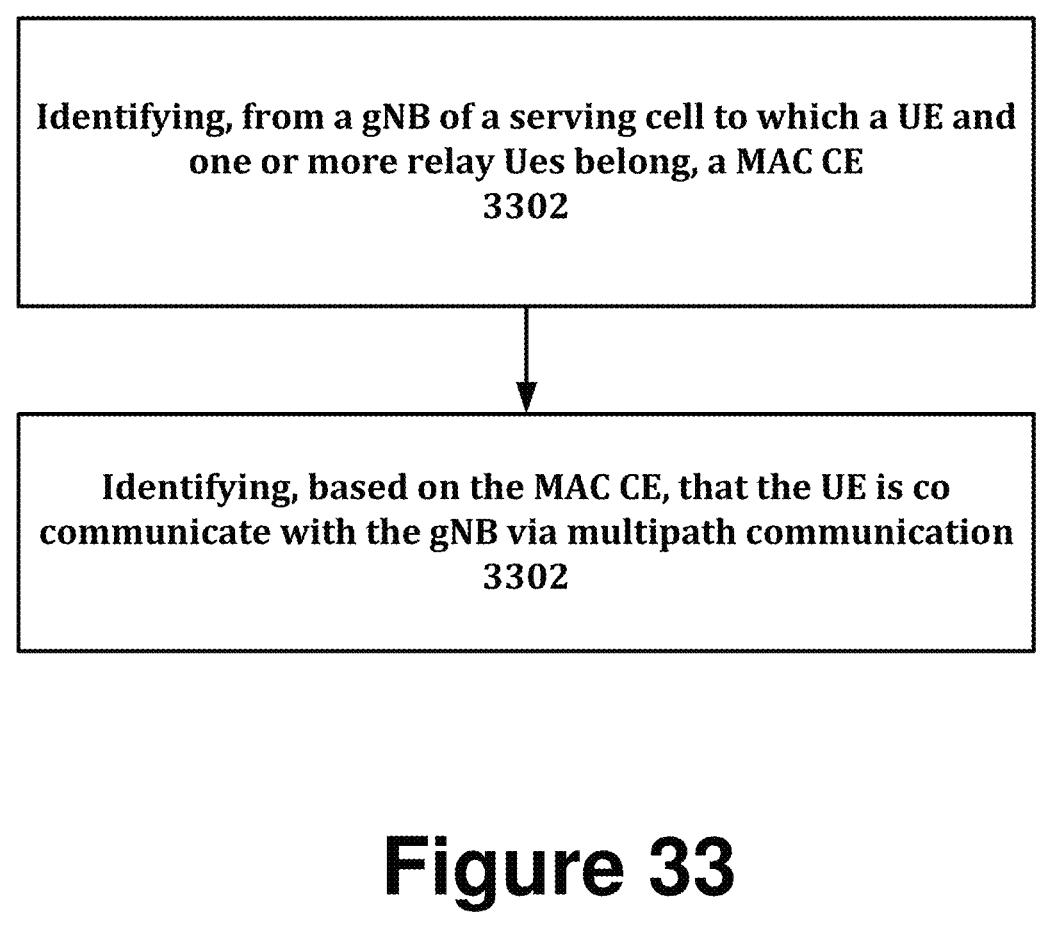

Identifying, from a gNB of a serving cell to which a UE and one or more relay Ues belong, a MAC CE
3302

Identifying, based on the MAC CE, that the UE is co communicate with the gNB via multipath communication
3302

Figure 33

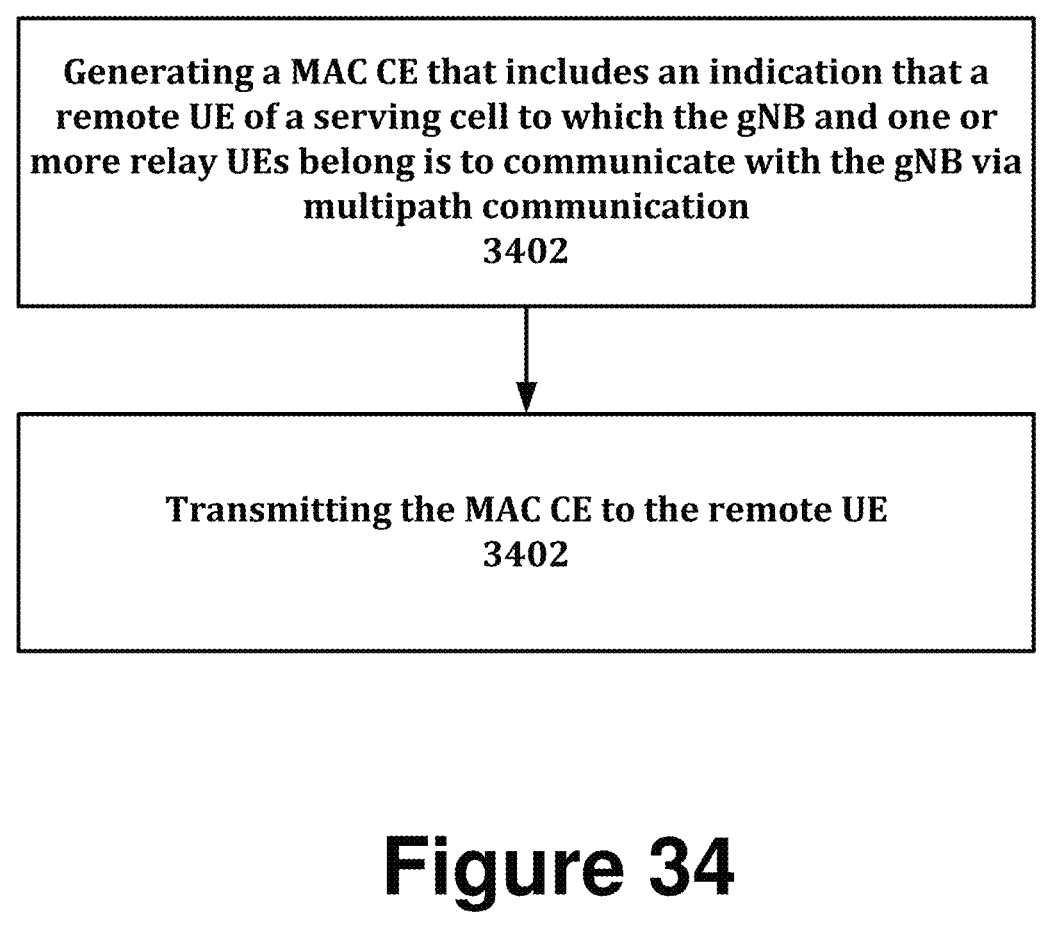

Generating a MAC CE that includes an indication that a remote UE of a serving cell to which the gNB and one or more relay UEs belong is to communicate with the gNB via multipath communication
3402

Transmitting the MAC CE to the remote UE
3402

Figure 34

SIDELINK RELAY ENHANCEMENTS TO SUPPORT MULTIPATH

CROSS REFERENCE TO RELATED APPLICATION

The present application claims priority to U.S. Provisional Patent Application No. 63/358,376, which was filed Jul. 5, 2022; U.S. Provisional Patent Application No. 63/358,372, which was filed Jul. 5, 2022; and to U.S. Provisional Patent Application No. 63/411,459, which was filed Sep. 29, 2022; the disclosures of which are hereby incorporated by reference.

FIELD

Various embodiments generally may relate to the field of wireless communications. For example, some embodiments may relate to sidelink (SL) relay enhancements in wireless communications.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 28 depicts an example procedure for practicing the various embodiments discussed herein.

FIG. 29 depicts another example procedure for practicing the various embodiments discussed herein.

FIG. 30 depicts an example procedure for practicing the various embodiments discussed herein.

FIG. 31 depicts another example procedure for practicing the various embodiments discussed herein.

FIG. 32 depicts another example procedure for practicing the various embodiments discussed herein.

FIG. 33 depicts another example procedure for practicing the various embodiments discussed herein.

FIG. 34 depicts another example procedure for practicing the various embodiments discussed herein.

DETAILED DESCRIPTION

Figure 1:
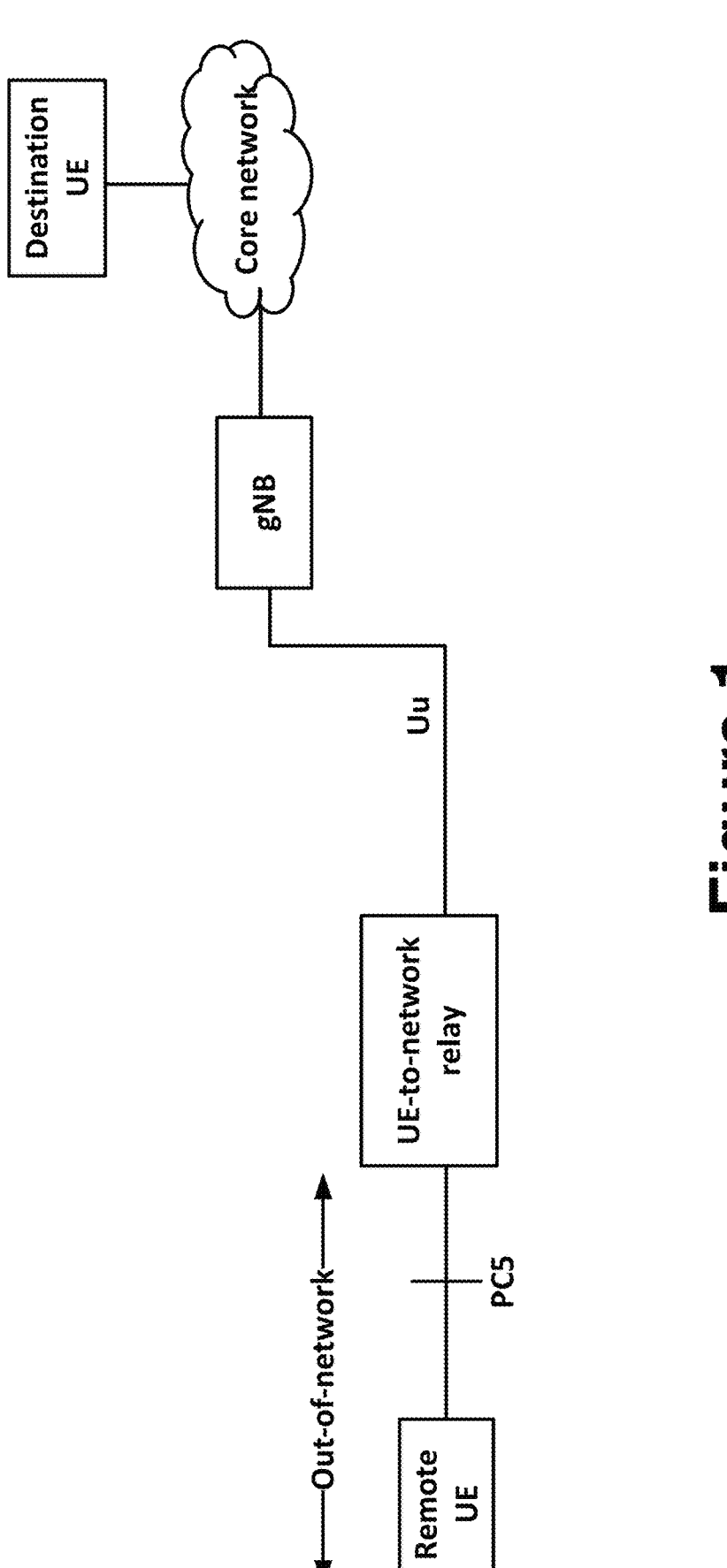
FIG. 1 illustrates an example of user equipment (UE)-to-network (NW) relay operation in sidelink (SL), in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Aspects of L2 UE-to-NW relaying were defined in the third generation partnership project (3GPP) Release-17 (which may also be referred to herein as "Release 17," "Rel-17," "Rel.17," "Rel. 17," etc.) specifications to support network coverage extension for Remote UEs. Support of multipath with a UE having at least one direct path to a gNB and at least one indirect path to another UE is being studied for inclusion in the 3GPP Release-18 (which may also be referred to herein as "Release 18," "Rel-18," "Rel. 18," "Rel.18," etc.) specifications. Embodiments herein may relate to the case when the indirect path is via an ideal link (as opposed to, for example, the case when the indirect path is via a L2 U2N relay UE).

As used herein, the term "ideal link" may refer to a theoretical link that has no latency, bandwidth, security, and/or compatibility imperfections associated with it. Such an ideal link may be, in various embodiments, wired or wireless. In some cases, the "ideal" link may be additionally or alternatively referred to as a "lossless" link. More generally, the "ideal" link may be considered to be a theoretical concept that is applied as a "control" when evaluating other links in a given network.

To enhance reliability and throughput of the Remote UE when in-coverage of a gNB, multi-path enhancements (when the UE is connected to the same gNB using one direct path and one indirect path) are being considered in Release 18 and discussed in this disclosure for the case when the indirect path is such that the Remote UE is connected to another UE via an ideal link.

Multiple paths to transport data packets may enable the Remote UE to increase its performance. For example, network products when supporting sidelink technology for use cases such as industrial internet of things (IIoT) or vehicle-to-everything (V2X) may benefit from supporting advanced relaying solutions for enhancing user experience.

A first version of NR sidelink, for example as may be associated with the 3GPP Release-16 (which may also be referred to as "Release 16," "Rel.16," "Rel. 16," "Rel-16," etc.) (e.g., as may be related to the 3GPP technical specification (TS) 38.300) may aim to support broadcast, unicast, and/or groupcast communications pertaining to both safety-related V2X scenarios such as automated driving, vehicle platooning etc., and non-safety related V2X scenarios such as mobile high data-rate entertainment, dynamic digital map update etc. On top of that, sidelink-based relaying functionality was studied and specified for sidelink/network coverage extension and power efficiency improvement, considering wider range of applications and services.

A "PC5-radio resource control (RRC)" connection may refer to a logical connection between two UEs for a pair of Source and Destination Layer-2 (which may also be referred to as "L2") identifiers (IDs), which is established after a corresponding PC5 unicast link is set up as specified, for example, in 3GPP TS 23.287. A UE may have multiple PC5-RRC connections with one or more UEs for different pairs of Source and Destination Layer-2 IDs.

Separate PC5-RRC procedures and messages may be used for a UE to transfer UE capability and sidelink AS layer configuration including sidelink radio bearer (SLRB) configuration to the peer UE. Both peer UEs may be able to exchange their own UE capability and sidelink configuration using separate bi-directional procedures in both sidelink directions.

To further explore coverage extension for sidelink-based communication, aspects of UE-to-Network based relaying may be described in the 3GPP Rel-17 specifications.

UE-to-network coverage extension: Uu coverage reachability is necessary for UEs to reach a server in a packet data network (PDN) network or counterpart UE out of proximity area. However, the 3GPP Release-13 (Rel-13, Rel. 13, Rel.13, Release 13, etc.)-13 solution on UE-to-network relay may be limited to evolved universal mobile telecommunications system (UMTS) terrestrial radio access (collectively, EUTRA or E-UTRA)-based technology, and thus may not be applied to new radio (NR)-based systems, for both next generation radio access network (NG-RAN) and/or NR-based sidelink communication.

As shown in FIG. 1, a UE-to-NW relay may provide extended coverage for a remote UE to access the network when the remote UE is out of network coverage.

Figure 2:
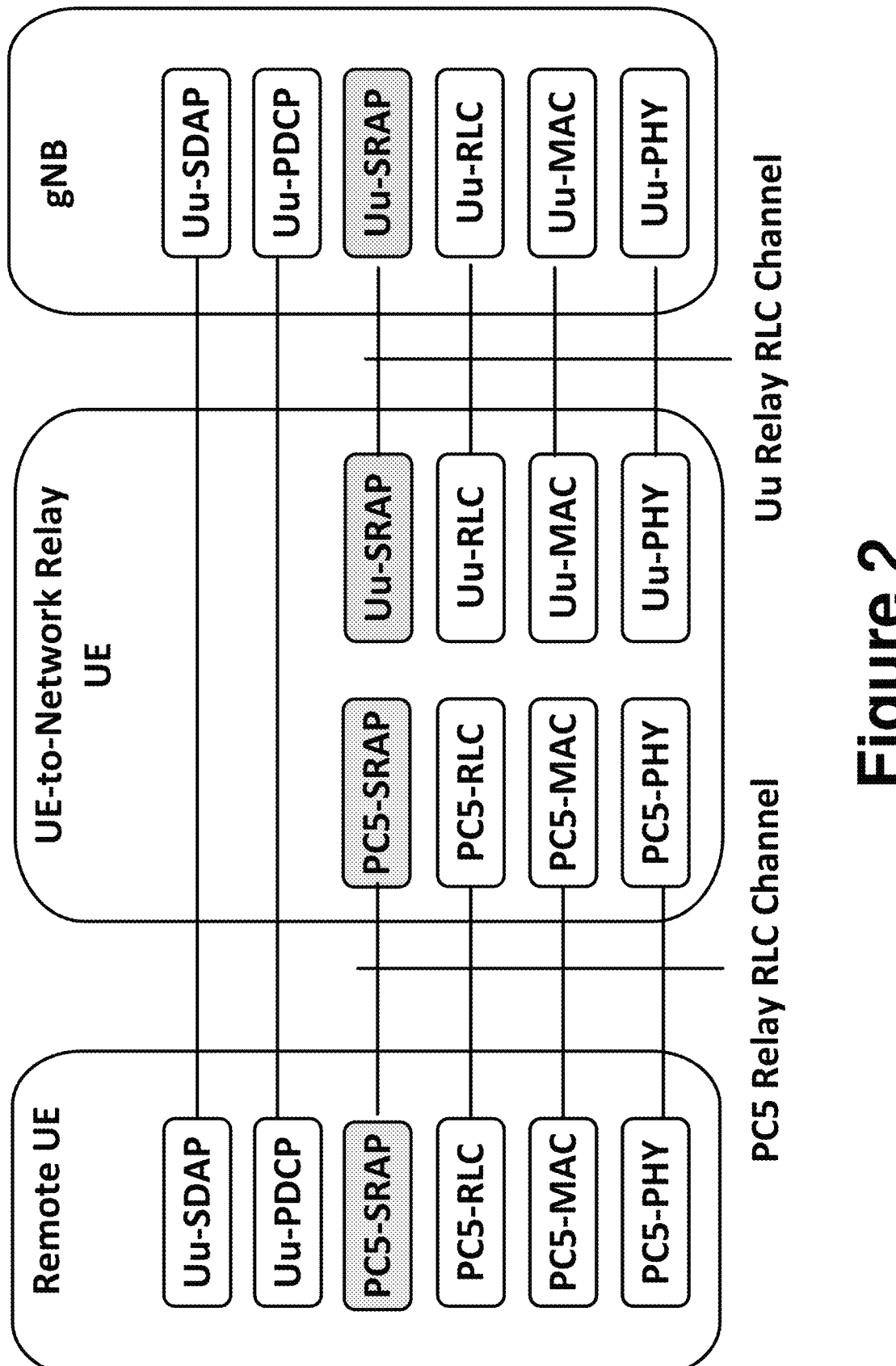
FIG. 2 illustrates an example of a user plane (UP) protocol stack for a layer 2 (L2) UE-to-NW relay, in accordance with various embodiments.
Figure 3:
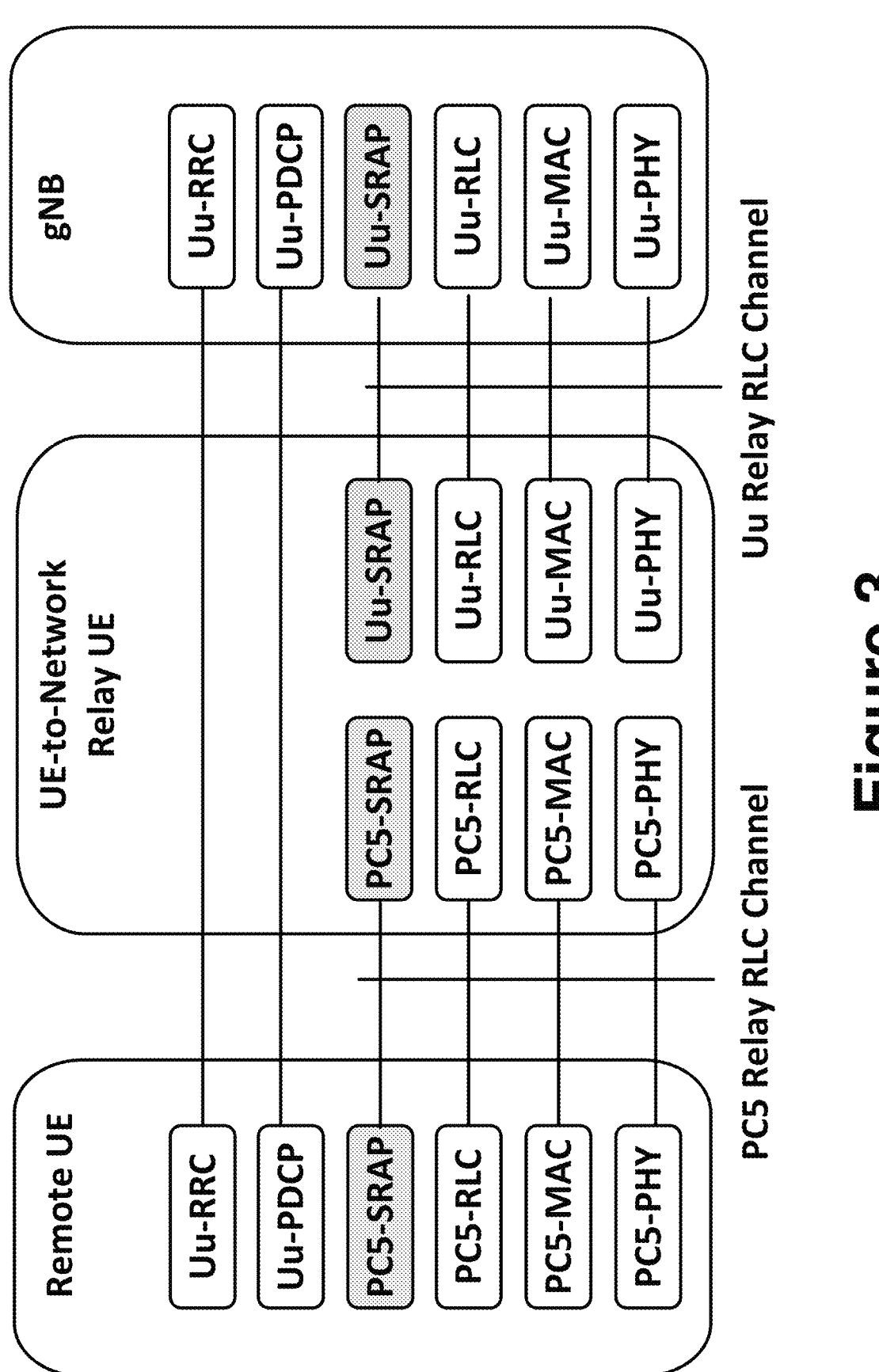
FIG. 3 illustrates an example control plane (CP) protocol stack for a L2 UE-to-NW relay, in accordance with various embodiments.

To this end, the following are two examples of how such relaying may be performed:

1. Layer-2 based relaying, where it is assumed that relaying is performed above radio link control (RLC) sublayer as the baseline. The Remote UE's user plane and control plane data are relayed above the RLC via the relay in both uplink and downlink directions. Consequently, the Remote UE's packet data convergence protocol (PDCP) and RRC may be terminated between thee Remote UE and the gNB, while RLC, medium access control (MAC) and physical (PHY) may be terminated in each link (between the Remote UE and Relay UE, and between a Relay UE and the gNB, respectively). Example user plane and control plane protocol stacks for the L2-based relay solution are depicted, for example, in FIGS. 2 and 3.

2. Layer-3 (which may also be referred to as "L3") based relaying, where it is assumed that relaying is performed at the internet protocol (IP) layer as the baseline may not have many, or any, RAN2 impacts.

In addition to the protocol stack support for relaying, relay discovery, relay selection/reselection, and RRC connection management (system information, paging via the L2 relay, and service continuity while path switching from direct to indirect links and vice versa are supported).

Embodiments herein may be described or implemented with respect to one or more of the following assumptions and/or definitions:

"Remote UE" may refer to a source UE that is registered at the network (e.g. there is Uu UE context at the network), may be in coverage, and may be in one of a RRC_CONNECTED, RRC_IDLE, or RRC_INACTIVE state.

a. In some embodiments, the Remote UE may be required to be in-coverage to support multipath relaying and authorized by the Core network.

The terms "Relay UE," "Forwarding UE," and "Aggregate UE" may be used interchangeably herein, and may be required to be in-coverage (and also assumed to be connected to the gNB/network) when it is performing UE-to-network data forwarding for the Remote UE.

Figure 4:
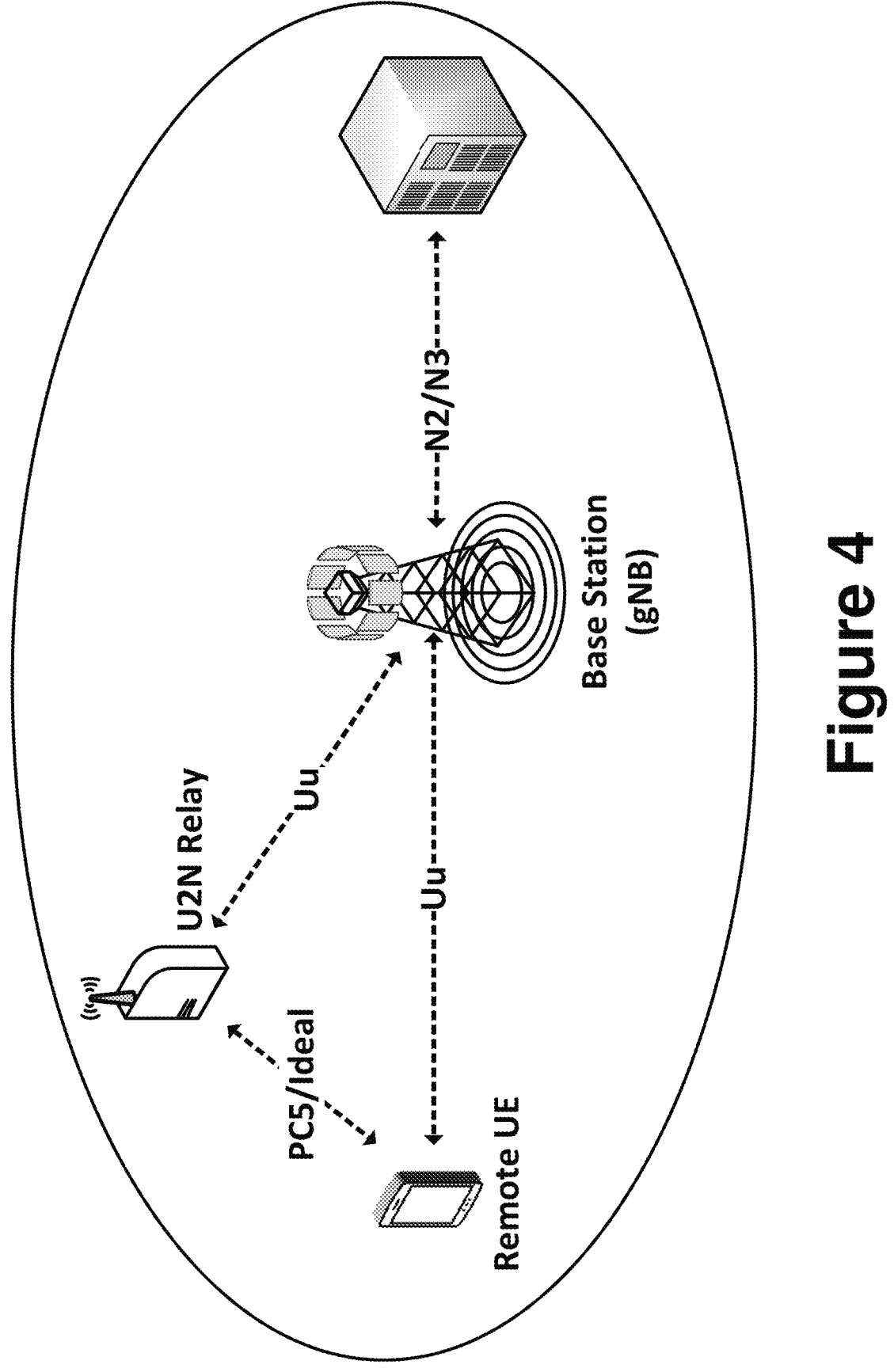
FIG. 4 illustrates an example architecture for a multi-path relay, in accordance with various embodiments.

In some embodiments, it may be desirable to support multi-path with relaying wherein the Remote UE may be connected to the same gNB via both the indirect path (through an L2 UE to Network Relay UE or an ideal non-3gpp connection with the remote UE) and direct Uu path (assuming the Remote UE is in-coverage). A high-level example of such a scenario wherein a Remote UE is connected to the gNB via two links is shown in FIG. 4.

Figure 5:
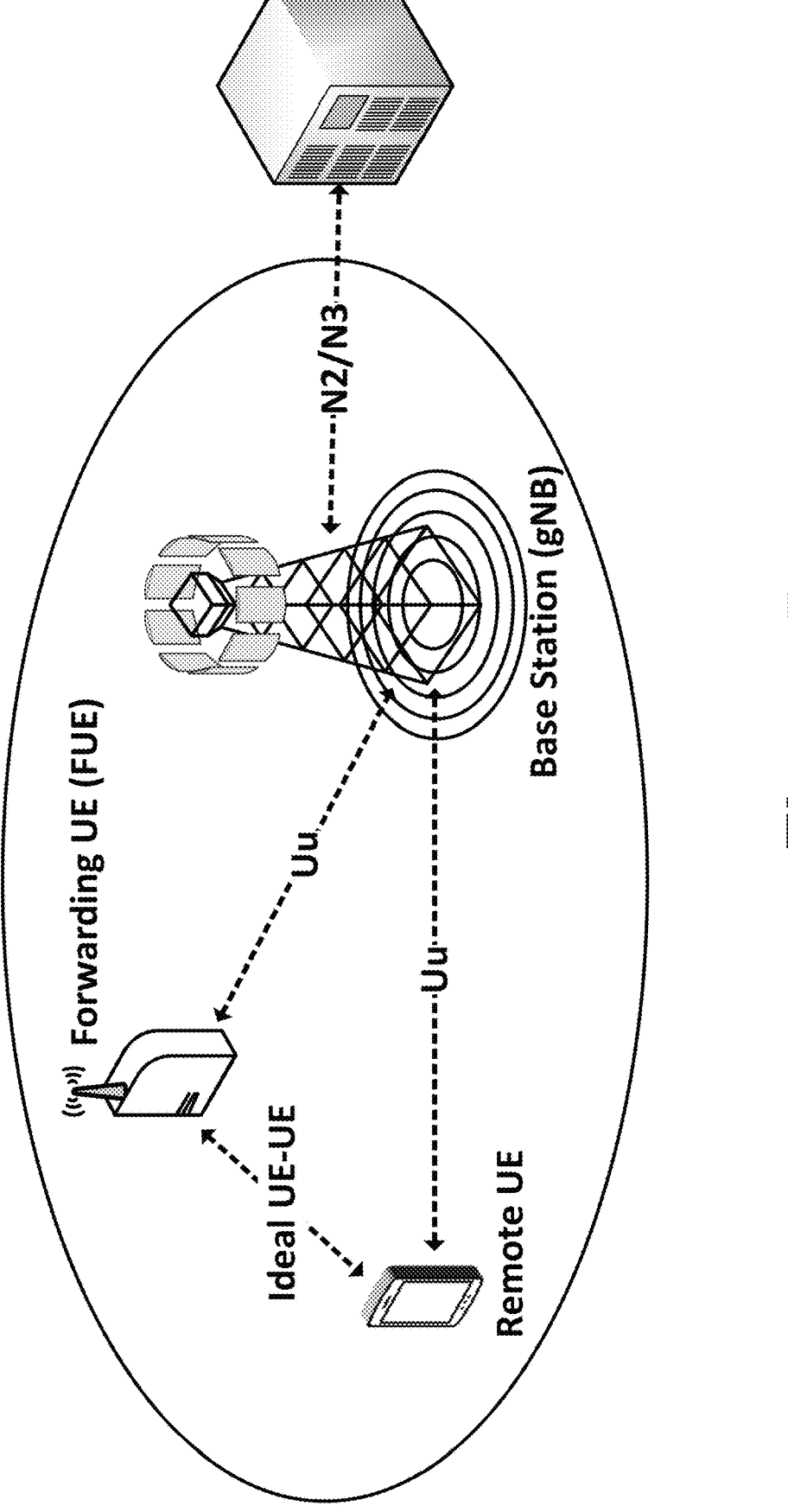
FIG. 5 illustrates an example architecture that includes a connection through an ideal UE-UE link, in accordance with various embodiments.

Generally, embodiments herein may be described with respect to the case where Remote UE has connectivity via another UE (where the UE-UE inter-connection is assumed to be ideal) instead of PC5 sidelink as in the case of a Relay UE. This case may be referred to as "Scenario 2" for multipath. This could be particularly beneficial to boost the uplink (UL) data throughput to cater for the limited UL transmission power handicap of any given Remote UE. Here the ideal connection could be due to close proximity of the two UEs and/or for example a lossless wired connection between them. The forwarding UE may transfer data of the Remote UE to the network as shown, for example, in FIG. 5.

Embodiment #1 Network Awareness and Configuration of Scenario 2 (UE-UE Ideal Link)

"Multipath enabling," as used herein, may refer to how the Remote UE is enabled to utilize the multiple (e.g. two in this release) available paths for packet transfer. The different cases wherein multiple paths of direct and indirect links can be applicable for potential packet duplication or path switching across the two paths for both signaling radio bearer (SRB) and data radio bearer (DRB) in both uplink and downlink and may include one or more of the following (herein direct path corresponds to a suitable cell and indirect path corresponds to ideal UE-UE link to the same gNB):

L2 Remote UE is active on the direct path and finds that the indirect path is available and adds this path if configured to support two paths simultaneously. Some SRBs and DRBs can use one or both paths as per configuration.

L2 Remote UE is active on both the indirect path and the direct path for some SRBs and DRBs as per configuration.

For scenario 2 where the UE-UE ideal link is used as the indirect path, upon direct path connection establishment, the gNB is informed of the available indirect path either by the Remote UE or the Forwarding UE. Upon receiving this indication and verifying the Remote UE's authorization, the gNB configures the indirect path via the Forwarding UE.

It may be further enforced that Remote UE is configured with UE aggregation as follows:

Uses only direct path for initial connection establishment and RRC re-establishment and thereby the cell with which the Remote UE performs connection establishment is deemed the primary cell (PCell)/serving cell or the primary path.

Uses only direct path (or primary path) for RLM (Radio Link Monitoring) and corresponding RLF (Radio Link Failure) and recovery Uses only direct path to receive paging and system information (e.g. from the serving cell where the RRC resides only)

Initial Configuration for UE Aggregation Setup

Aggregate/Forwarding UE is defined to be the UE relaying the Remote UE's packets via the non-3GPP link. This link may be, for example, a WiFi link, an Ethernet link, and/or some other high-speed and high reliability link and this path is deemed as the indirect path. One general consideration is that the Remote UE may always have a direct path towards the gNB and establishes initial RRC connection via the direct path. Even if the indirect path is available, it can be enforced that the RRC connection establishment is done through the direct path for those Remote UEs supporting UE aggregation. It may be indicated either in the core network through authorization in Remote UE's subscription information or as UE capability information that the Remote UE supports UE Aggregation in UL and DL through the Aggregator/forwarding UE which may be collocated or connected via ideal UE-UE link. This is because the aggregator/forwarding UE may not be able to be configured to receive SRB0 messages from the Remote UE. In some embodiments, it may be assumed that the Aggregator/forwarding UE is already in RRC_CONNECTED state.

Addition of Indirect Path

As part of the configuration, the gNB may receive the information on non-3GPP link/indirect path (e.g. the Aggregate UE ID) either through the Remote UE or the Aggregate UE as shown in various Figures herein. In one example, the measurement configuration/report messages can also be used for the Remote UE to share the aggregate UE information with the gNB.

Furthermore, the Remote UE and the Aggregate link or the indirect path could likely be already established. In another example, the Remote UE can provide the ID of the Aggregate UE to the gNB and the gNB can then check the Remote UE's and the Aggregate UE's authorization (assuming the gNB can recognize the aggregate UE ID) to confirm its connectivity as well as provide a local ID for the Relay/Aggregate/Forwarding UE towards the Remote UE. This local ID may also be provided to the Aggregate UE by the gNB or by the upper layer (e.g. application function or non-access-stratum (NAS) layer).

The local identity provided by the gNB for the Relay UE or aggregate UE can be an octet string as defined by the gNB included in an RRC Reconfiguration message. A new RRC message could be defined or a DLDedicatedMessageSegment could be used.

Release of Indirect Path

In the case where the indirect path is 3GPP-based e.g. PC5/sidelink, the Relay UE can provide notification to the Remote UE when radio link failure (RLF) or cell reselection occurs to enable the Remote UE to either release the PC5 link or perform relay reselection. With a non-3GPP link, it may be possible to leave it to UE implementation about if/how the Remote UE releases the ideal link. Since the Remote UE and the Aggregate UE are in proximity, if an RLF is experienced by the Aggregate UE, it is most likely experienced by the Remote UE as well. At the same time, in another example, a new dedicated message may be defined using which the gNB could inform the Remote UE or the Aggregate UE to release the indirect path for one or more of the following conditions if the Remote UE's Uu is still active:

Aggregate UE Uu RLF (if the gNB centralized unit (CU) is aware of the Aggregate UE's radio link condition when the aggregate UE is connected through a different cell), Aggregate UE handover (HO) (when it is connected to a different cell and its serving cell changes although up to gNB implementation, it should not initiate HO when multipath is enabled via the Aggregate UE), Aggregate UE RRC failure.

In another example, the gNB may reuse a legacy RRCReconfiguration message and disable multipath and packet duplication for one or more of the corresponding radio bearers when a change in the serving cell ID of the Forwarding UE (FUE) happens.

In yet another example, a periodic keep-alive type of message may be defined in Uu RRC to enable the FUE/Aggregate UE to periodically send its status (including at least the signal strength and the serving cell ID) to the gNB so that the gNB can keep track of its connection availability since discovery is not supported by the FUE or the gNB can send a signal periodically towards the FUE as well (this may operate similarly to how channel state information (CSI)-reference signal (RS) is supported in NR).

In another example, the Remote UE may report about the release of indirect path to receive updated configuration from the gNB.

RRC Signalling Enhancements (i) In one example, the gNB may configure multipath transmission, but the Remote UE is responsible for the setup of the indirect connection. The core network (CN) may authorize the connection from a security viewpoint, but otherwise no involvement may be expected from RAN side.

Figure 6:
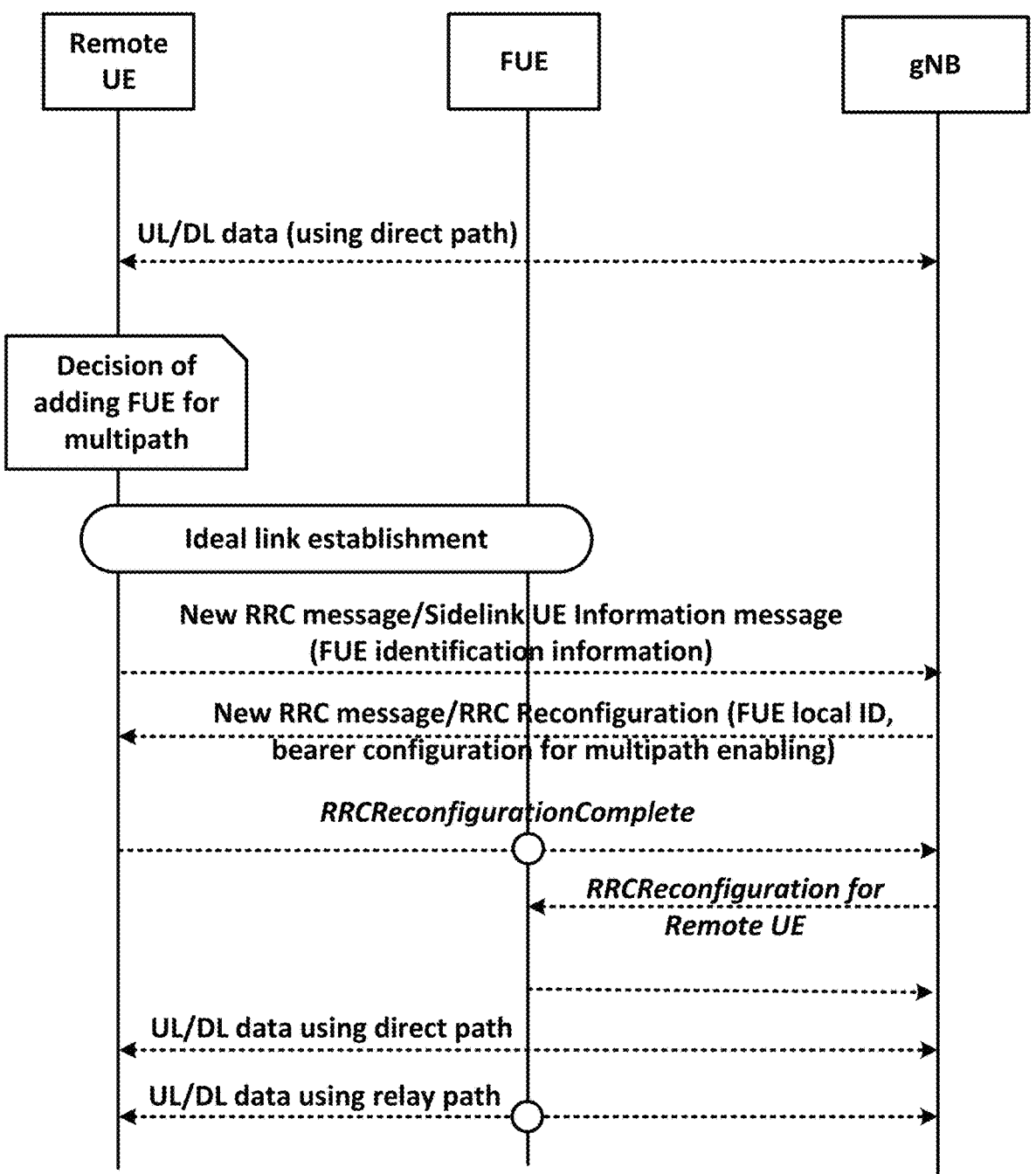
FIG. 6 illustrates an example of remote UE-initiated ideal link indirect path establishment, in accordance with various embodiments.
Figure 7:
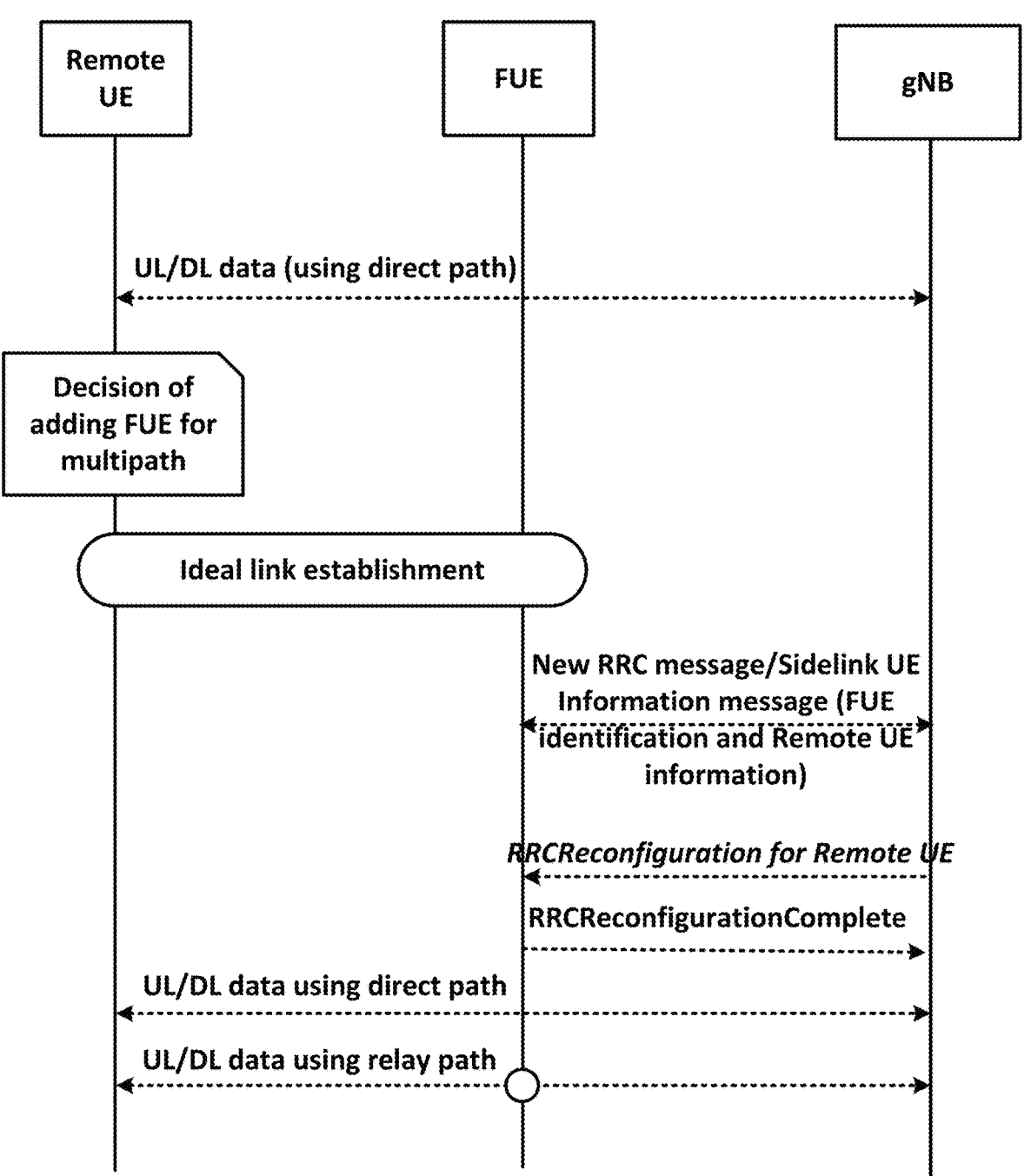
FIG. 7 illustrates an example of forwarding UE or relay UE-initiated ideal link indirect path establishment, in accordance with various embodiments.

(ii) RRC signalling when the gNB provides the configuration for the two paths upon any indication/signalling from a Remote UE or a Forwarding UE about the ideal UE-UE connection establishment:

a. In one example, the Remote UE may provide Forwarding UE information (including, for example, a FUE ID, a serving cell ID, etc.) when it is already connected via direct path towards the gNB with an optional indication suggesting that it is intended for multipath or in response to gNB activation trigger/configuration to perform multipath transmission.

b. In another example, the Remote UE may be responsible for not only choosing the forwarding UE but also setting up the ideal connection and then informing the gNB of the FUE ID and serving cell ID of the FUE.

c. Since both the Remote UE and the FUE may be required to have a Uu connection with the gNB, either may be configured to inform the gNB once the ideal connection is established between them for relaying, using the direct path (e.g. via new Uu RRC message) as shown in FIG. 6 and/or send RRCReconfigurationComplete using the new configuration as shown in FIG. 7.

Figure 8:
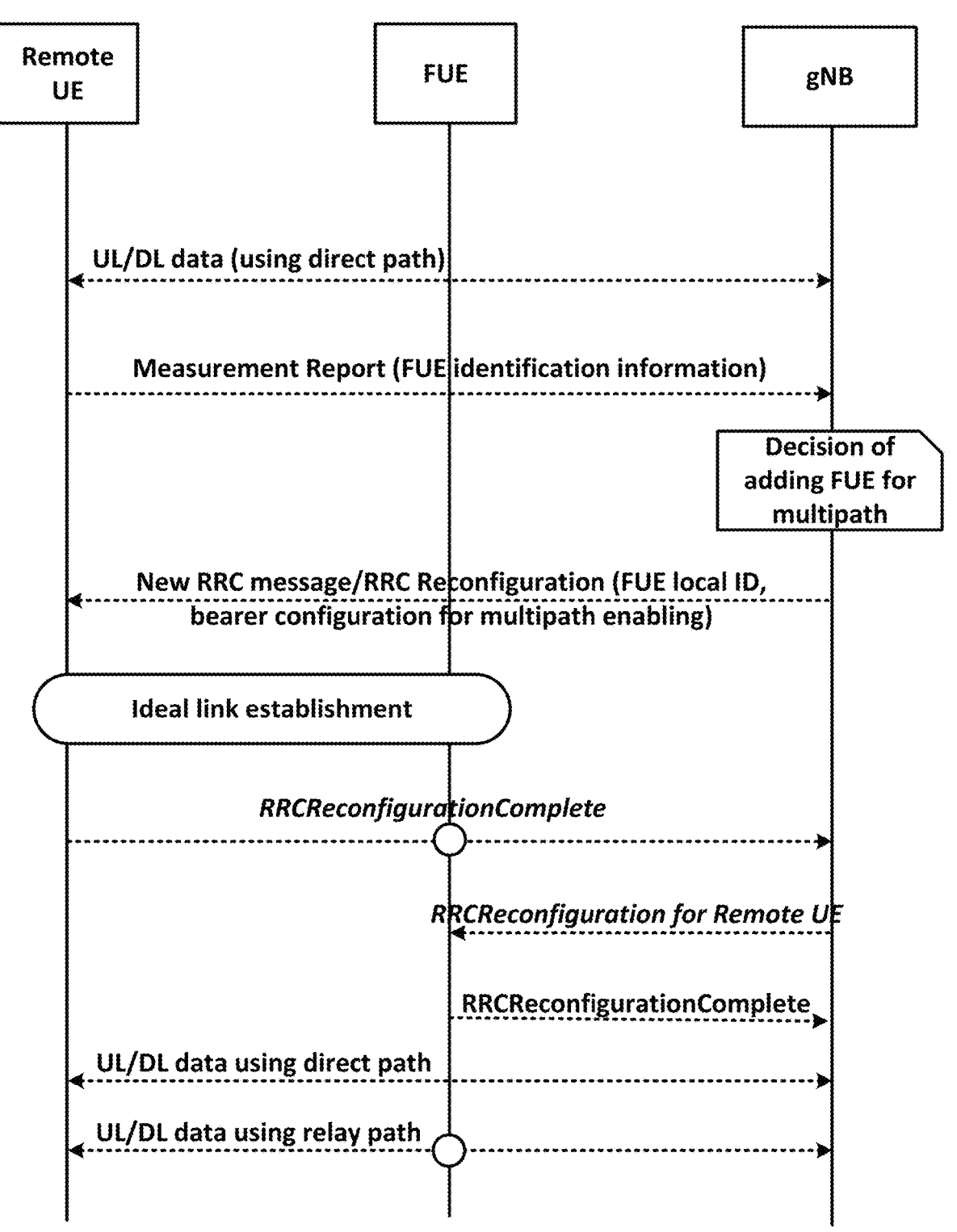
FIG. 8 illustrates an example of gNodeB (gNB)-controlled ideal link indirect path establishment, in accordance with various embodiments.

(iii) In another example, the gNB can control the selection of the Forwarding UE as shown in FIG. 8 wherein the Remote UE shares the list of candidate Forwarding UE information for the gNB to decide to add multipath and configure the UEs accordingly.

The gNB may be required to support scenario 2 and showcases its support as part of system information (either as part of system information block (SIB)12 or another SIB) or gNB may request to provide a list of candidate FUE information to the remote UE via dedicated RRC signaling based on UE capability (one example is to use the Measurement report/configuration messages similar to the path switching case for L2 U2N relay wherein the gNB chooses the Aggregate UE and provides the original ID as well as a new ID). The benefit of using SIB is that the UE may indicate the support/availability of FUE earlier once RRC connection is established. An example configuration is as shown below. Without gNB's explicit support, a Remote UE may not be able to use UE-UE ideal link for UE aggregation.

An example view of SIB12 for support of UE aggregation:

```
SIB12-IEs-r16 ::=              SEQUENCE {
    ....
    ....
        sl-L2U2N-Relay-r17        ENUMERATED {enabled}
        sl-UEAggregation-r18      ENUMERATED {enabled}
    ....
    ....
    ....
    }
```

Control Plane Path

The following may relate to two possible options possible for the support of some control plane SRBs via UE aggregation/indirect path. On a per-bearer basis, the gNB could configure the bearers as shown in example configuration below.

a) CP may not be supported through the indirect path. This option may be considered to be a relatively easy way to manage control plane activities like radio link monitoring (RLM), paging, system information all via the direct path only. The gNB may not configure the CP bearers to be multipath enabled or mapped to both direct and indirect paths.

b) Some SRBs such as SRB2 may be configured to use an indirect path (split SRB with both direct and indirect or indirect only) according to configuration from the gNB.

Configuration for Relay UE/Aggregate UE/Forwarding UE and Remote UE

The gNB may provide the following configuration for each radio bearer of the Remote UE which has two paths available and enabled with multipath aggregation/duplication:

PDCP and SDAP configuration (common/separate to both Aggregator/forwarding path and direct path and indicated accordingly)

Uu RLC/logical channel (LCH) configuration for direct path support

Figure 9:
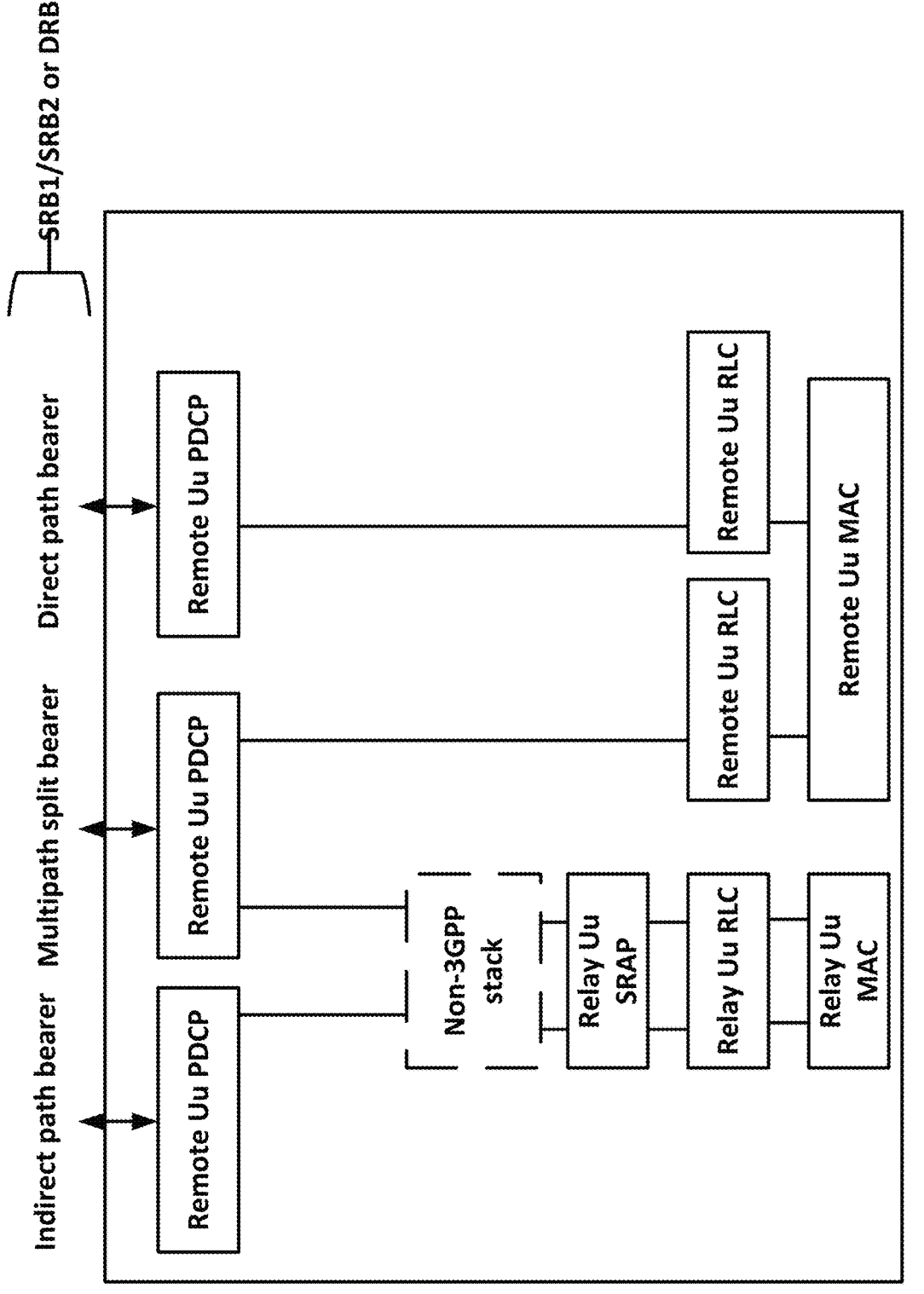
FIG. 9 illustrates an example of multipath bearer support with a non-third generation partnership project (3GPP) UE-UE link with sidelink relay adaptation protocol (SRAP), in accordance with various embodiments.
Figure 10:
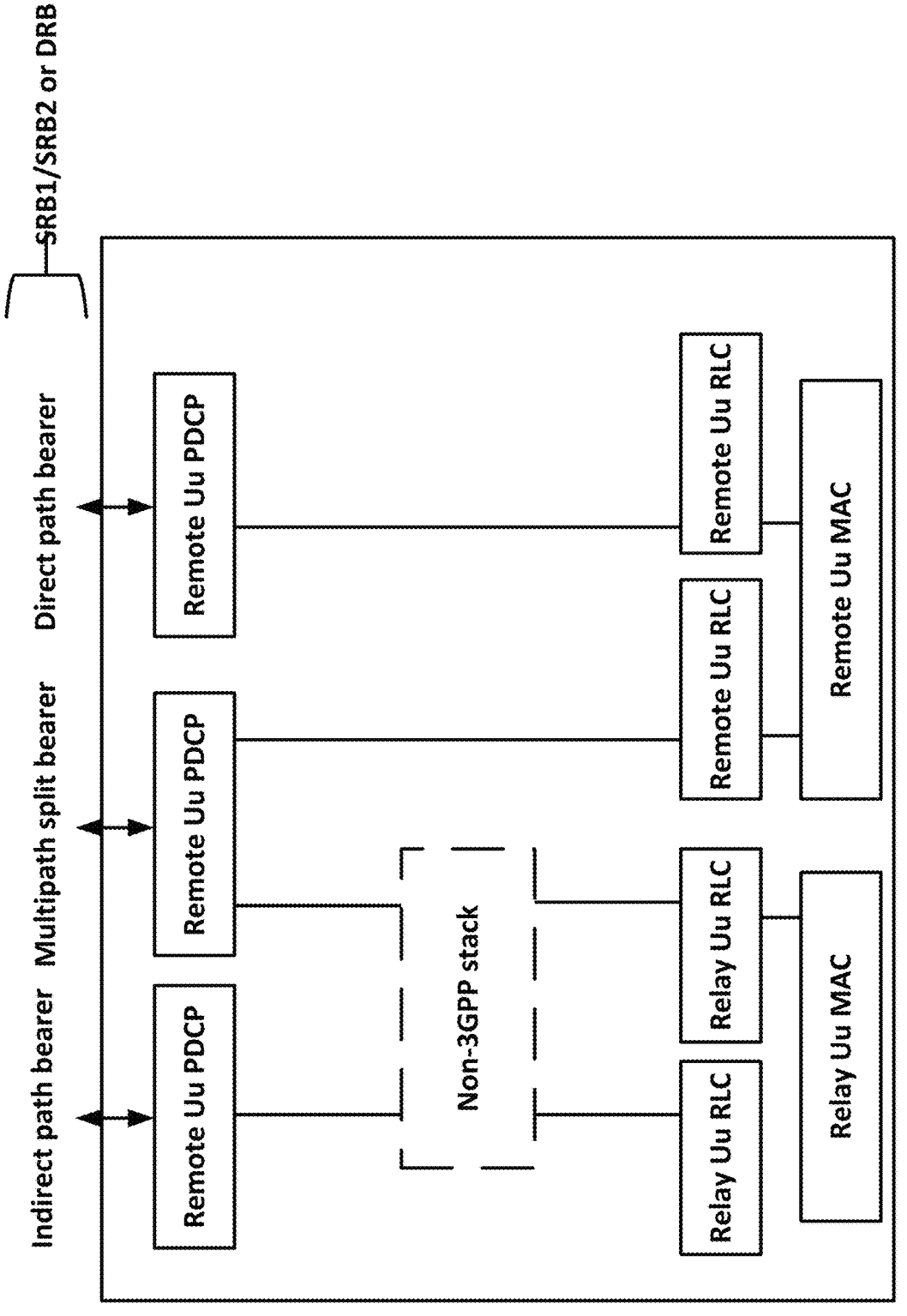
FIG. 10 illustrates an example of bearer support with a non-3GPP UE-UE link and no SRAP, in accordance with various embodiments.

As may be described in legacy 3GPP standards, the gNB may configure the Aggregator/forwarding UE with egress Uu RLC/LCH configuration for relaying Remote UE radio bearer as well as providing Aggregator/forwarding UE local ID if necessary and corresponding Remote UE ID. An example configuration is shown below and the architecture for multipath bearer support is shown in FIG. 9 and FIG. 10 considering SRAP support is present or not over the Uu link of the relaying UE.

Some example configurations for the Aggregator/forwarding UE with aggregation configuration (which is shared for Remote UE as well) are shown below based on 3GPP TS 38.331. Generally, the aggregator UE is mapped to specific Remote UEs (L2 ID) that it supports along with one or more of the following:

---

SL-AggregatorUEConfig information element

---

```
-- ASN1START
-- TAG-SL-AGGREGATOR-UE-CONFIG-START
SL-AggregatorUEConfig-r18 ::=        SEQUENCE {
    sl-RemoteUE-ToAddModList-r17 ::=        SEQUENCE (SIZE (1..maxRemoteUE)) OF
SL-RemoteUE-ToAddMod-r17         OPTIONAL,   -- Need M
    sl-RemoteUE-ToReleaseList-r17 ::=        SEQUENCE (SIZE (1..maxRemoteUE)) OF
SL-DestinationIdentity-r16        OPTIONAL,   -- Need M
    ...
}
SL-RemoteUE-ToAddMod-r17 ::=        SEQUENCE {
    sl-L2Identity-Remote-r17                SL-DestinationIdentity-r16,
    sl-Aggregation-Config-AUE--r18          SL-Aggregation-Config-r18
OPTIONAL,    -- L2RelayUE
    ...
}
-- TAG-SL-L2RELAYUECONFIG-STOP
-- ASN1STOP
```

---

SL-Aggregation-Config information element

---

```
-- ASN1START
-- TAG-SL-Aggregation-CONFIG-START
SL-Aggregation-Config-r18 ::=                SEQUENCE {
    sl-LocalIdentity-RemoteUE-r17                INTEGER (0..255)
OPTIONAL, -- Need M
    sl-LocalIdentity-AggregatorUE-r18            INTEGER (0..255)
OPTIONAL, -- Need M
    sl-MappingToAddModList-r17                SEQUENCE (SIZE (1..maxLC-ID)) OF SL-
MappingToAddMod-r17         OPTIONAL, -- Need M
    sl-MappingToReleaseList-r17                SEQUENCE (SIZE (1..maxLC-ID)) OF SL-
RemoteUE-RB-Identity-r17         OPTIONAL, -- Need M
    ...
}
SL-MappingToAddMod-r17 ::=                SEQUENCE {
    sl-RemoteUE-RB-Identity-r17                SL-RemoteUE-RB-Identity-r17,
    sl-Egress-RLC-Channel-Uu-r17                Uu-Aggregator-RLC-ChannelID-
r17
OPTIONAL,    -- AggregatorUE
    sl-MultiPath-enabled-r18                ENUMERATED
{BOOLEN}                 OPTIONAL
or
    sl-DirectPath-enabled-r18                ENUMERATED
{BOOLEN}                 OPTIONAL
or
    sl-IndirectPath-enabled-r18                ENUMERATED
{BOOLEN}                 OPTIONAL
    ...
}
SL-RemoteUE-RB-Identity-r17 ::=                CHOICE {
    srb-Identity-r17                INTEGER (0..),
    drb-Identity-r17                DRB-Identity,
    ...
}
-- TAG-SL-Aggregation-CONFIG-STOP
-- ASN1STOP
```

---

It is assumed that the ideal link will be able to receive the PDCP protocol data unit (PDU) at the aggregator/forwarding UE and maintain the RB ID through implementation. Then it is passed to the corresponding Uu RLC entity as per gNB configuration. The gNB may be required to be further aware of the mapping between Remote UE and aggregator/forwarding UE to provide appropriate configuration:

Remote UE ID and mapping of Remote UE ID to aggregator/forwarding UE ID assuming one or more Remote UEs may connect to one aggregator/forwarding UE.

Mapping of each Remote UE ID's RB ID onto a different Uu RLC channel of the corresponding aggregator/forwarding UE.

Embodiment #2 Support of Duplication for Scenario 2

This embodiment may relate to support of RAN based redundancy for scenario 2, that is using multipath transmission via a direct (Uu) link and an indirect link through an ideal UE-UE connection. Increased transmission power is one way of boosting data reliability since it has a direct relation with increasing the Signal to Noise Ratio. Due to limitations on transmission power of typical UEs, aggregated UEs (such as those in the case of scenario 2) can be used where the Remote UE and the Forwarding UE can simultaneously transmit redundant information. Such aggregated transmission can provide enhanced reliability on one hand and achieve higher throughputs (due to higher SNR as per Shannon's capacity theorem).

This embodiment may be described with respect to the following example assumption: It is assumed that multipath transmission capability is supported by the UE, authorization for multipath transmission has been carried out and the gNB has configured multipath transmission as required.

Trigger Condition

Network Activated

If multiple path transmission is active, that is the remote UE is actively transmitting data via both direct and indirect links, then the gNB can trigger duplication activation via RRC configuration for applications/quality of service (QoS) flows which have high reliability (e.g., a low packet error rate (PER)) requirement.

Examples of Remote-UE Triggered Conditions (i) Condition 1: Remote UE monitors Uu RLM for the direct link and sends CSI measurement reports to the gNB. If the Uu link becomes worse than thresh1 with hysteresis, the Remote UE triggers packet duplication. Since the connection between Remote UE and Forwarding UE is assumed to be ideal/lossless, there seems to be no reason to have a requirement for continuous monitoring or threshold-based trigger events for the indirect link.

(ii) Condition 2: Remote UE receives a retransmission grant (after unsuccessful packet delivery) from the gNB, and triggers packet duplication for the retransmitted packet and subsequent packets.

Mechanism

For the case of multipath transmission using L2 UE to Network Relay, the Uu SDAP, PDCP and RRC are terminated between L2 U2N Remote UE and gNB, however, the Remote UE also maintains a complete Uu stack, with the RLC, MAC and PHY also terminating between the Remote UE and the gNB. Different for scenario 2, however, a non-standardized stack lies between the Remote UE and the Relay UE. It can therefore be assumed that it is up to the Forwarding UE (FUE) to identify and map the incoming data from one or multiple Remote UEs through some mapping mechanism similar to SRAP for Rel-17 L2 U2N relaying case. A standardized SRAP adaptation sublayer is hence not maintained over the first hop, e.g., the ideal UE-UE link. A Uu SRAP adaptation sublayer could optionally be configured for the second hop however in this case, the functionality of mapping between PC5 and Uu RLC channels is not required. This could therefore be considered as a simplified SRAP layer.

In uplink, the SRAP layer may perform Radio Bearer (RB) mapping from the non-standardized L2 layer to egress Uu RLC channels for the Forwarding UEs Uu interface. Note that considering the non-standardized L2 connection between the remote UE and the forwarding UE, it is possible that RB multiplexing over the same egress Uu RLC channel is not supported. In this sense, for each Remote UE connected to a Forwarding UE, a singular RB may be supported which may be mapped to a unique egress Uu RLC entity/channel/bearer at the forwarding UE. For this mapping between the RB of a Remote UE and the Uu RLC entity of the Forwarding UE, the SRAP layer could maintain Remote UE identification for the UL traffic similar to the case of L2 U2N Relay UE. gNB can also configure the mapping information between remote UE's RB (Radio bearer ID) and egress Uu RLC entity (logical channel ID) to both remote UE and forwarding UE. In this case, SRAP may be omitted if mapping function is specified in Uu RLC layer at forwarding UE side as shown in FIG. 10.

In downlink, the SRAP layer could perform DL RB mapping (DRB and SRB if CP supported on indirect path) between ingress Uu RLC channel of the Forwarding UE, and the singular RB of a given Remote UE. Similar to uplink, Remote UE identification for DL traffic can be maintained at the SRAP or it can be done without the SRAP and as per the mapping maintained by the gNB.

The L2 Remote UE configuration could be updated to also include the SL-Aggregation-Config as shown above with the egress Uu RLC channel Identity for the aggregator/forwarding UE so that the Remote UE can provide this information along with the data PDU to the aggregator/forwarding UE by implementation to aid with the mapping.

Figure 11:
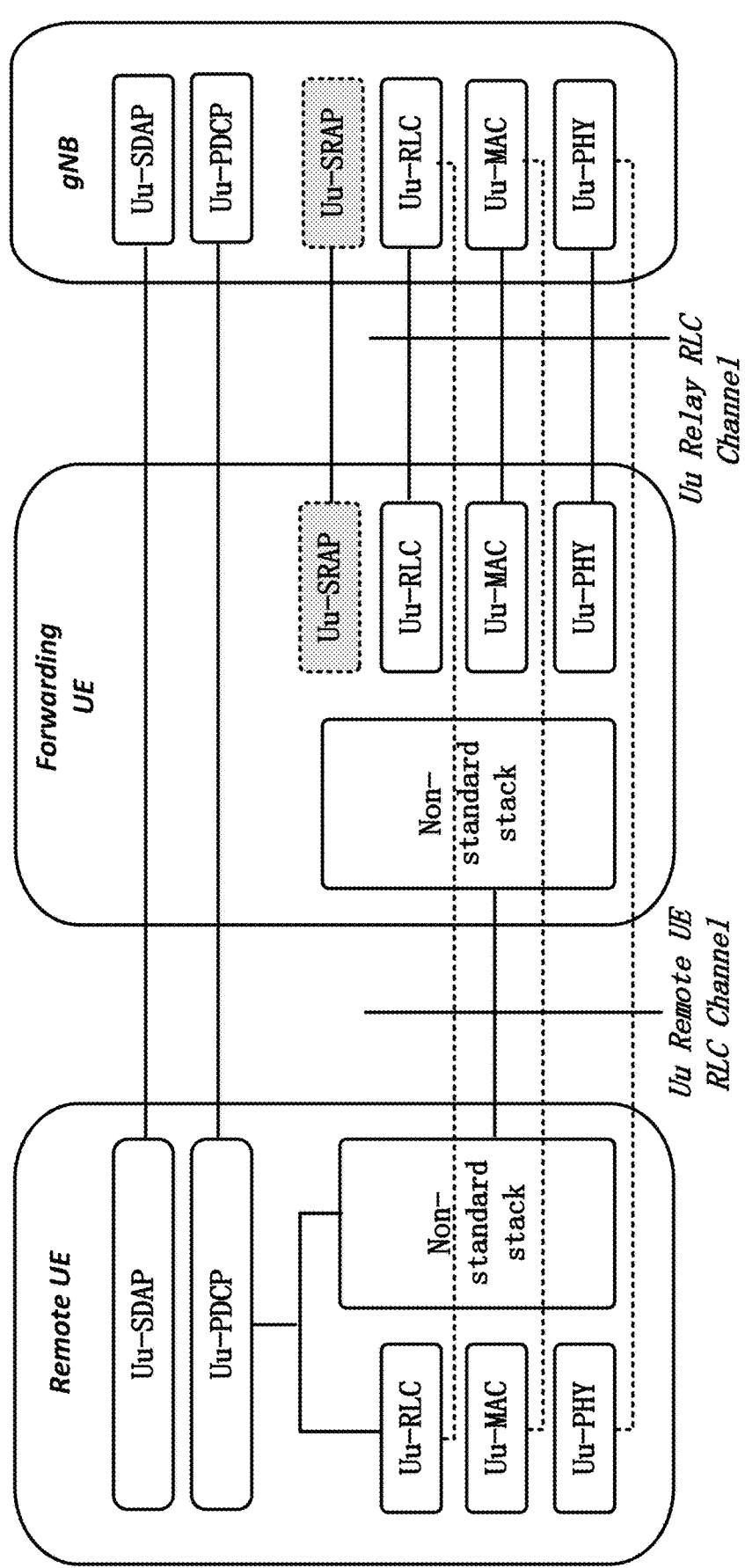
FIG. 11 illustrates an example UP Protocol stack with a non-3GPP UE-UE link, in accordance with various embodiments.

An example of the user plane protocol stack for multipath scenario 2 is shown in FIG. 11.

Figure 12:
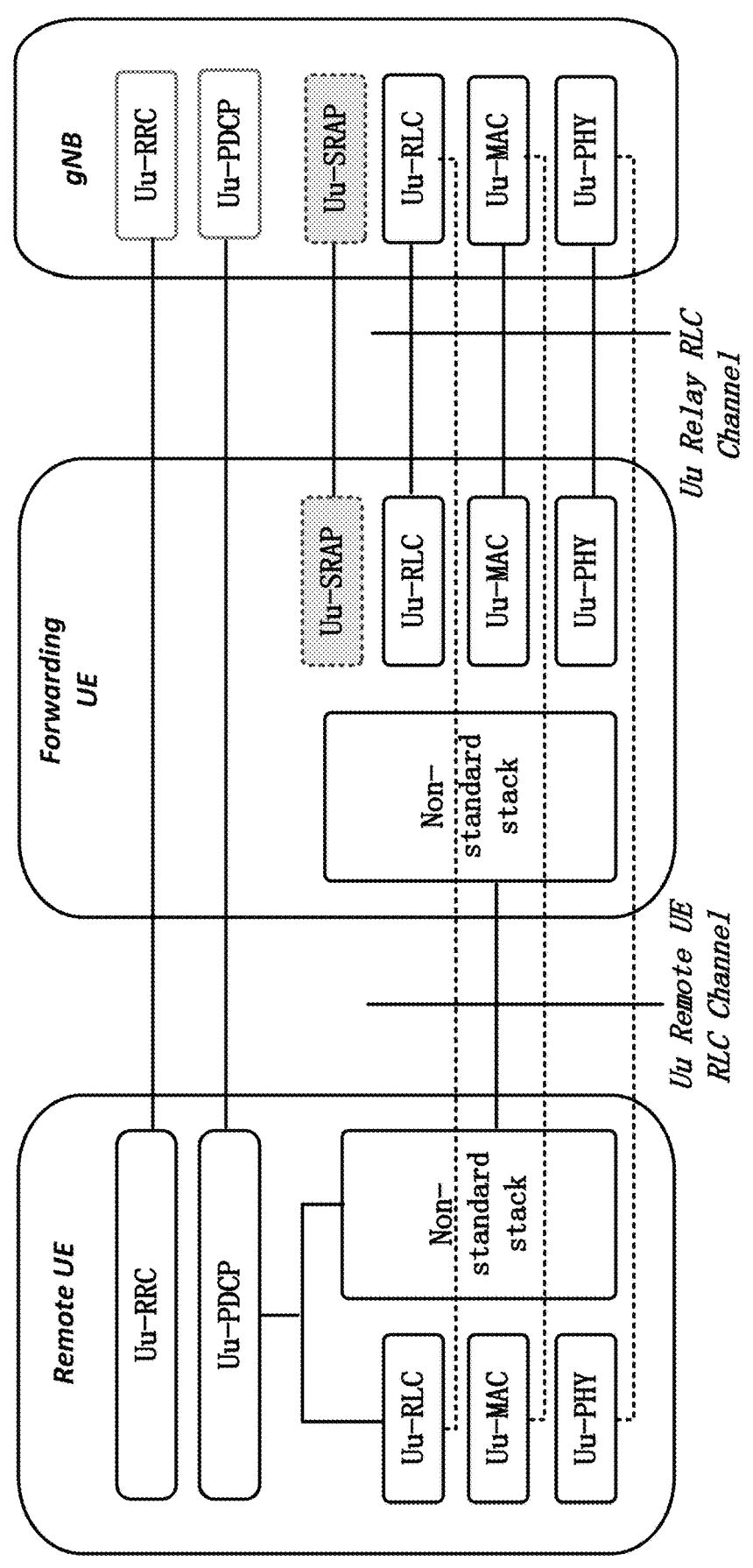
FIG. 12 illustrates an example CP protocol stack for dual path transmission with ideal UE-to-UE connection, in accordance with various embodiments.

For the control plane architecture, similar to the case of L2 U2N Relay UE, the Remote UE has a single RRC state based on its RRC connection to its serving gNB. If control plane is supported through the indirect link at all (e.g. through the split bearer option), then an example of the CP protocol stack is shown in FIG. 12.

It is to be noted that the SRAP over both the UP and CP stacks may be optional in some embodiments, hence shown with dashed line.

Packet Duplication in Uplink

Figure 13:
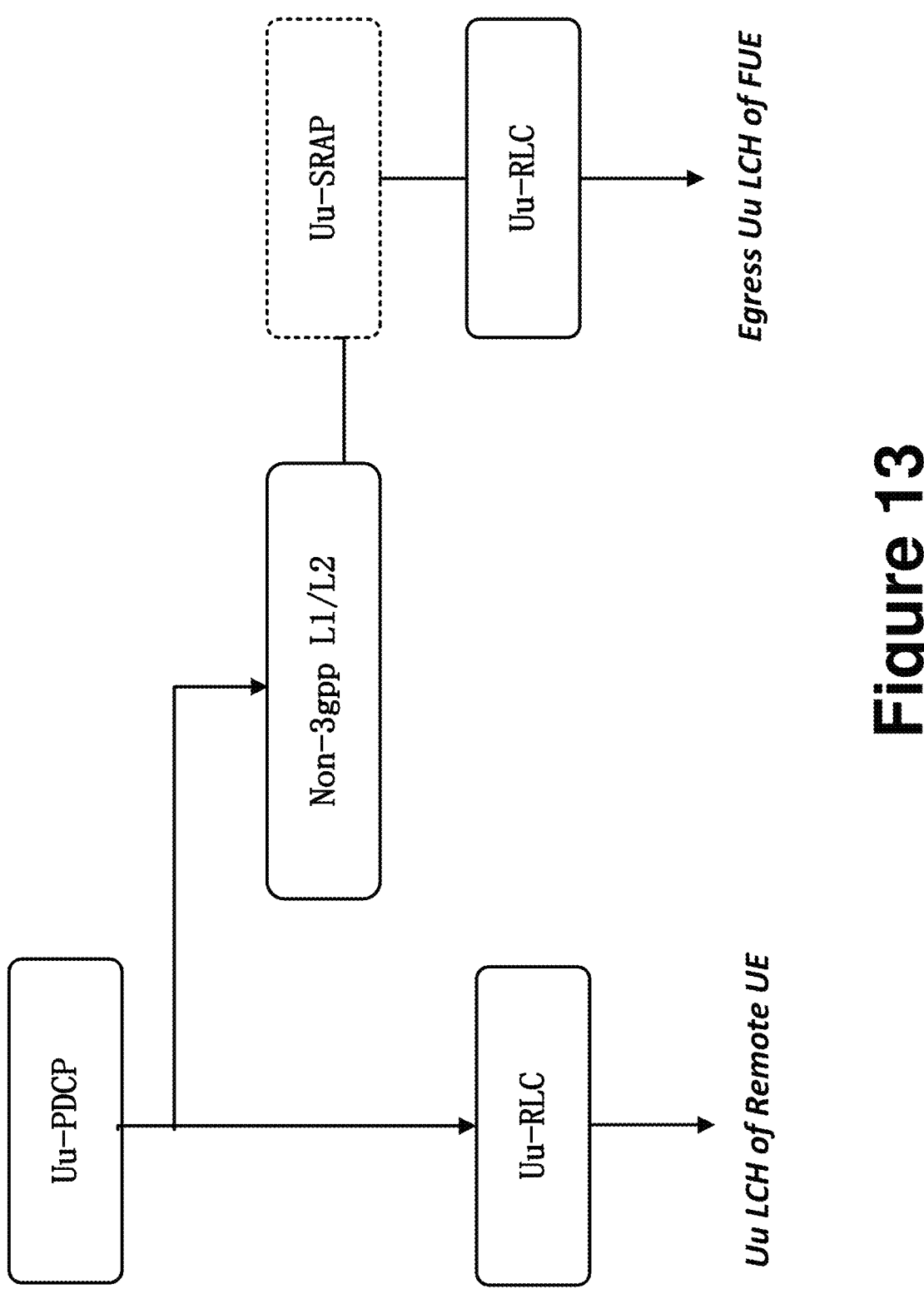
FIG. 13 illustrates an example of packet data convergence protocol (PDCP) duplication, in accordance with various embodiments.

Similar to Scenario 1 via an L2 U2N Relay, in Scenario 2 via an ideal UE-UE connection, a split bearer architecture can be used where the remote UE's Uu RB is forwarded over both the direct and indirect links. PDCP based duplication from NR dual connectivity (DC) may be used as a baseline for Scenario 2 also. The Uu PDCP entity at the UE duplicates the PDCP PDU and submits the PDU to the Uu RLC entity which is activated for duplication, of the direct link and can be encapsulated with the appropriate L2 header over the ideal UE-UE link up to UE implementation. Layer 2 at the forwarding UE can be assumed to receive the data from the Remote UE, strip the L2 header, and can transparently forward the duplicated PDCP PDU to the Uu SRAP layer (if configured, otherwise directly to the Uu RLC entity) at the Forwarding UE, while maintaining the RB and Remote UE identification through implementation. This is shown in FIG. 13. Based on the identification information from the Remote UE and its RB in the Uu SRAP header, the gNB can determine the packets received from the Uu PDCP entity at the Remote UE but received through the direct Uu link and the indirect ideal UE-UE connection.

Figure 14:
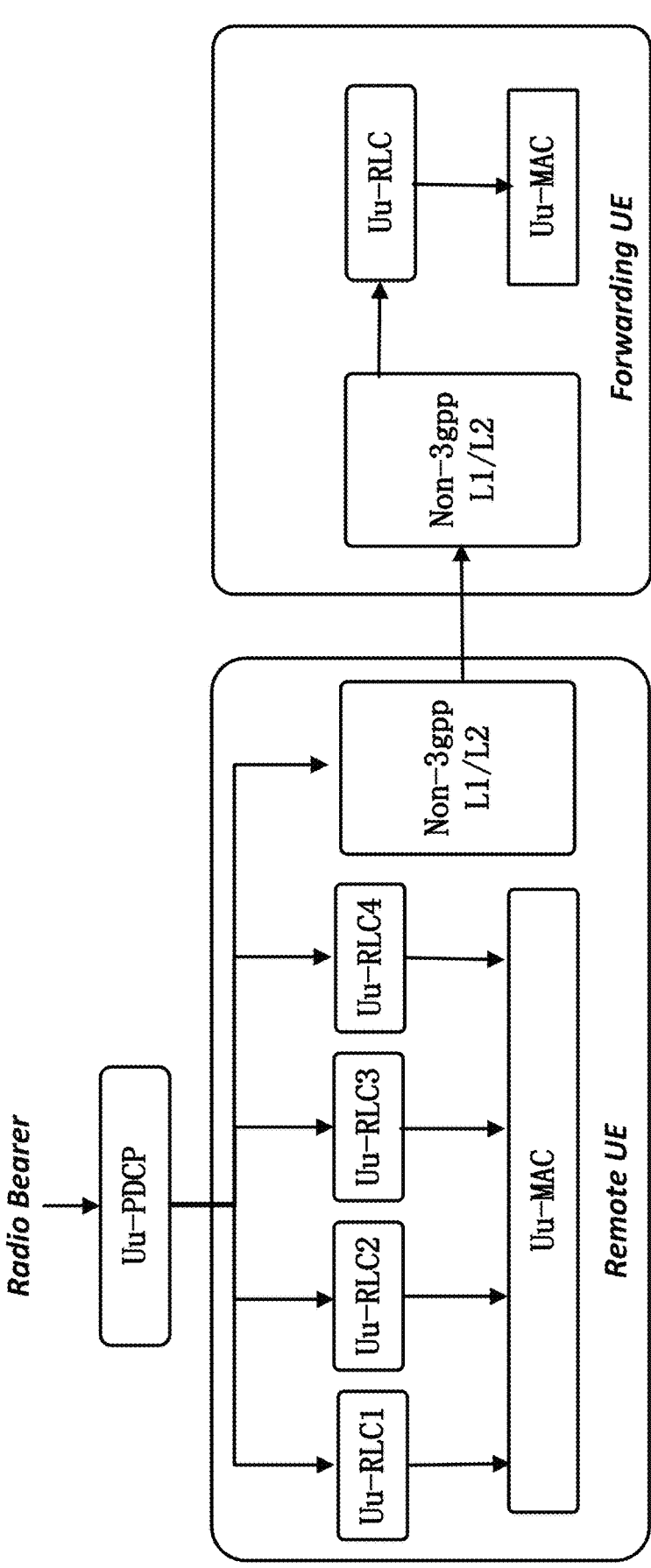
FIG. 14 illustrates an example of carrier aggregation (CA) duplication for a direct Uu link along with multipath duplication, in accordance with various embodiments.

If control plane is supported on the indirect link, certain SRBs e.g SRB1 and SRB2 can be duplicated. Uu SRBs (if CP is supported) and Uu DRB(s) from the Uu PDCP entity are mapped to the Remote UE's Uu RLC channel (via direct link) and the Forwarding UEs egress Uu RLC channel after RB mapping from the Remote UE. Over the direct Uu link, potentially CA duplication could be supported as per legacy and there may not be a need to preclude CA duplication for the Uu link in the case of multipath transmission. An example of this is shown in FIG. 14.

In 3GPP TS 38.331, an example duplication configuration modified for UE aggregation is shown below:

```
UEAggregationRemoteConfig        SEQUENCE {
   primaryPath                   SEQUENCE {
      cellGroup                     CellGroupId             OPTIONAL,   -- Need R
      logicalChannel                LogicalChannelIdentity  OPTIONAL    -- Need
R
   },
   ul-DataSplitThreshold         UL-DataSplitThreshold      OPTIONAL,   --
Cond SplitBearer
      pdcp-Duplication              BOOLEAN                 OPTIONAL    -- Need R
      }                                                     OPTIONAL,   -- Cond
UEAggregation
```

Activation/Deactivation and Primary RLC Entity

For scenario 2, it can be assumed that the primary RLC entity is associated with the direct Uu path for the remote UE. If CA duplication is configured as shown, for example, in FIG. 8, then for example Uu-RLC1 could be the primary RLC entity while Uu-RLC2-4 could be the secondary RLC entities. In the case of ideal UE-UE connection, since L2 connection is transparent to the PDCP entity, such that the duplicated PDCP PDU from the Uu PDCP entity is in essence delivered to the Uu RLC entity at the Forwarding UE, it can be assumed that the primary RLC entity never resides with the indirect path.

Also, for the case of activation/deactivation of duplication, it could be done through RRC signalling over the direct path only (for CP restricted to direct path), however for dynamic activation/deactivation, the duplication MAC CE could only be transmitted via the direct Uu path. Since there is no PC5 connection, such activation/deactivation MAC CE may not be forwarded as a sidelink (SL) MAC control element (CE). It could, however, be carried as a regular data packet through the ideal connection (since it can be assumed to have high reliability and speed) but in this case the priority of the MAC CE will not be reflected in such transmission. Nonetheless it can be assumed that for the case of scenario 2, given that the connection is assumed to be ideal, delay may be minimal in this case. Therefore, even if it may not be preferable to activate/deactivate duplication via a MAC CE transmitted over the indirect link as a regular data packet, however, the gNB could have some additional threshold criteria, for example if the direct Uu path has poor channel condition, then the gNB may decide to forward the MAC CE encapsulated as a regular data packet over the indirect link. In some embodiments, this may be up to gNB implementation.

Data Duplication for Reliability Enhancement

Additional embodiments herein may relate to data duplication at the packet data convergence protocol (PDCP) layer to increase data reliability in Rel-18 whereby a user is connected to the network via multiple paths, first one being a direct Uu path, and second one being an indirect path using a layer-2 UE-to-network relay. Examples of triggering conditions, the overall mechanism, radio protocol architecture and activation/deactivation procedure are discussed herein.

The following may describe two options for data duplication to enhance reliability:
1) Radio access network (RAN)-based redundancy, where PDCP duplication is configured for a radio bearer by radio resource control (RRC). Both carrier aggregation (CA)-only and dual connectivity (DC)+CA duplication is supported for up to 4 legs (in Release 17).
2) Fifth generation (5G) system (5GS) based redundancy, which involves end-to-end duplication with redundant protocol data unit (PDU) sessions over the 5G network. Two redundant sessions are supported in Release 16.

Figure 15:
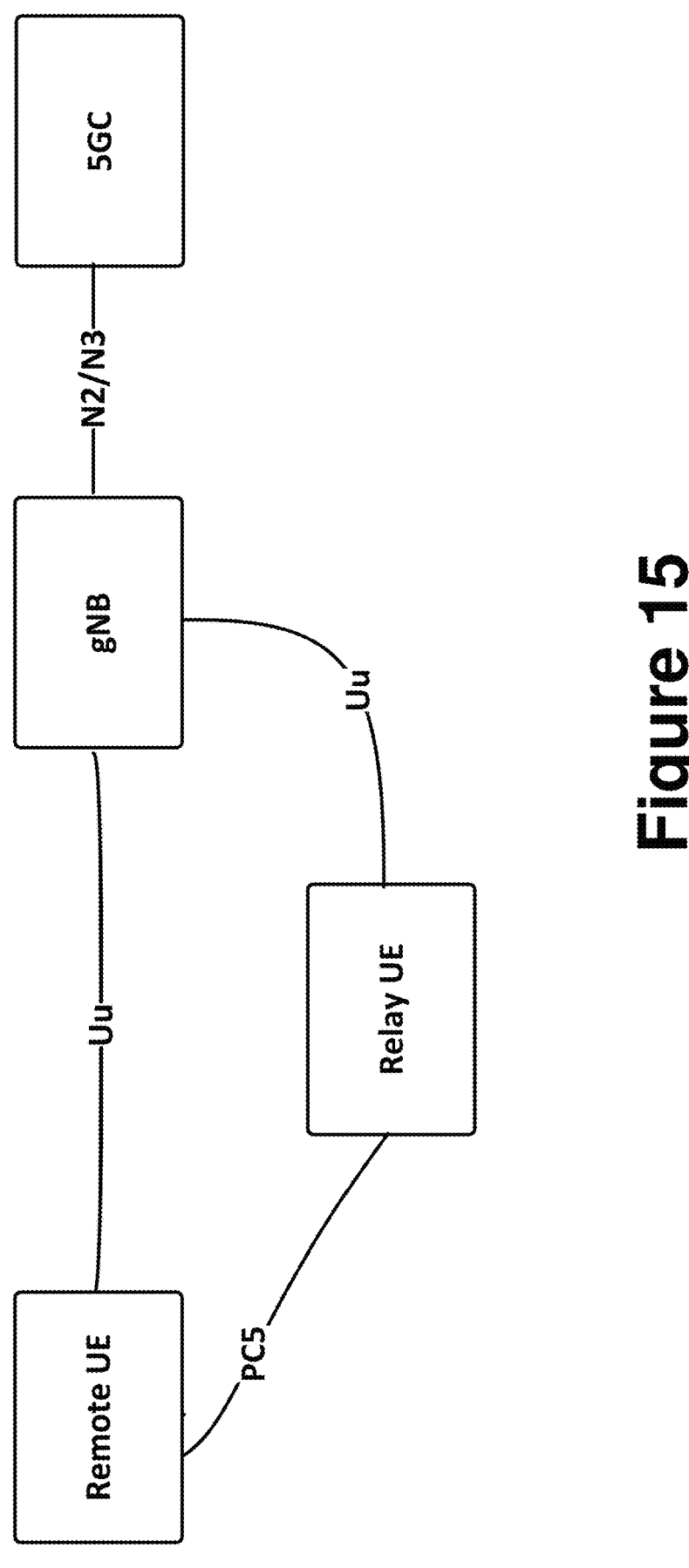
FIG. 15 illustrates an example of multipath transmission with one direct Uu path and one indirect PC5+Uu path, in accordance with various embodiments.

The afore-mentioned RAN based and 5GS based techniques have been developed for duplication of Uu traffic only. In long term evolution (LTE) vehicle-to-anything (V2X) communication, the Prose Per-Packet Reliability (PPPR) parameter is defined to indicate the need for duplication over PC5 interface of a particular V2X packet. For both mode 3 (UE-autonomous) and mode 4 (network controlled) resource allocation modes, the UE performs sidelink packet duplication for the data with the configured PPPR value(s) until packet duplication is de-configured for these PPPR value(s). For LTE-based PC5, a granular packet based QoS handling is designed based on ProSe per packet priority (PPPP) and ProSe Per Packet reliability (PPPR) parameters. On the other hand, for NR based PC5, a quality of service (QoS) model similar to that defined in 3GPP technical specification (TS) 23.501 for Uu reference point is used, i.e. a set of standardized PC5 5QIs (PQI) are defined. Since per-flow QoS model is applied for NR sidelink, it can be considered more appropriate to explore the applicability and modifications required to the two aforementioned Uu data duplication techniques for this novel case of multipath transmission scenario, where one link is direct Uu link between the UE and the gNB and the other is an indirect link, where a remote UE connects to the gNB via a L2 UE to Network Relay UE as shown in FIG. 15.

Embodiments herein relate to RAN based redundancy in the case of multipath transmission via a direct and an indirect link between the Remote UE and the gNB. Embodiments may be described with respect to the following assumption: It is assumed that multipath transmission capability is supported by the UE, authorization for multipath transmission has been carried out and the gNB has configured multipath transmission as required.

Embodiment 1—Trigger Condition

Several trigger conditions may be possible for activation of PDCP duplication. Such trigger conditions may include or relate to one or more of the following:

Condition 1

This may be similar to regular multipath transmission condition. Given that the Remote UE is connected to the gNB both via a direct Uu link, and indirectly via the relay over PC5+Uu link, the Remote UE continues Uu Radio Link Monitoring (RLM) in the active bandwidth part (BWP) based on reference signals (synchronization signal block (SSB)/CSI-RS) and signal quality thresholds configured by the network. The Remote UE also uses SL-reference signal received power (RSRP) measurements for PC5 RLM to assess the channel condition for the link between the Remote UE and the Relay UE. Dual threshold criteria could be used for duplication activation, i.e. if Uu link becomes worse than threshold1 and/or PC5 link becomes worse than threshold2, then duplication can be activated. Threshold values for threshold1 and threshold2 may be chosen conservatively and with hysteresis to avoid flip-flop between activation/deactivation state of packet duplication. Uu RLM for the link between Relay UE and the gNB may be up to the Relay UE, and the gNB can inform the Remote UE if for example Uu RLF is detected or Relay UE indicates to the Remote UE via a PC5-RRC message when RLF is declared, however, it may not be a part of the channel condition for the packet duplication activation to avoid complexity.

For efficient packet duplication, Block Error Rate (BLER) performance for both links should also be considered, such that both links experience comparable (if not symmetric) block error rate. If the BLER performance for one link is considerably lower than the other link, then only the path with lower BLER value can be used for transmission and duplication should not be activated to avoid unnecessary overhead for marginal gain.

Condition 2:

Given that multiple path flows are set up, PDCP duplication may be activated by the gNB for QoS flows with priority value low (e.g 1) and PER=$10^{-4}$/$10^{-5}$. If the Default priority level of the PC5 QoS ID (PQI) is used together with application indicated priority, then application indicated priority shall take precedence as per legacy sidelink operation. Packets for which the priority and reliability criteria is met, the gNB can use RRC signaling to activate PDCP duplication for UL transmissions.

Condition 3

While conditions 1 and 2 are more proactive conditions, a reactive trigger mechanism may additionally/alternatively be adopted. Packet duplication can also be triggered by HARQ NACK (received by relay UE over Uu and then forwarded to the Remote UE or HARQ NACK received directly from the gNB by the Remote UE over Uu link). HARQ retransmission may be carried out if Packet Delay Budget (PDB) allows, and packet duplication can be activated to avoid future losses. A conservative version of Condition 3 is to activate packet duplication only if COUNT=thresholdCount NACKs are received in x amount of time, or over N transmissions. This would be more complicated from implementation perspective e.g timer to be maintained to track x value etc.

HARQ retransmission may not be possible for all use-cases, e.g cooperative carrying ProSe communication use-cases as defined in Table 5.2-1 in 3GPP TS 22.104 have a transfer interval (e.g., end-to-end (E2E) latency) requirement of as low as 1.7 milliseconds ms, for which hybrid automatic repeat request (HARQ) retransmission may not be possible.

Condition 4

A combination of conditions 1 and 3, or conditions 2 and 3, or other such combinations could be used. For example, packet duplication is configured if HARQ NACK is received AND threshold criteria as specified in condition 1 is also met.

Embodiment 2—Mechanism

Figure 16:
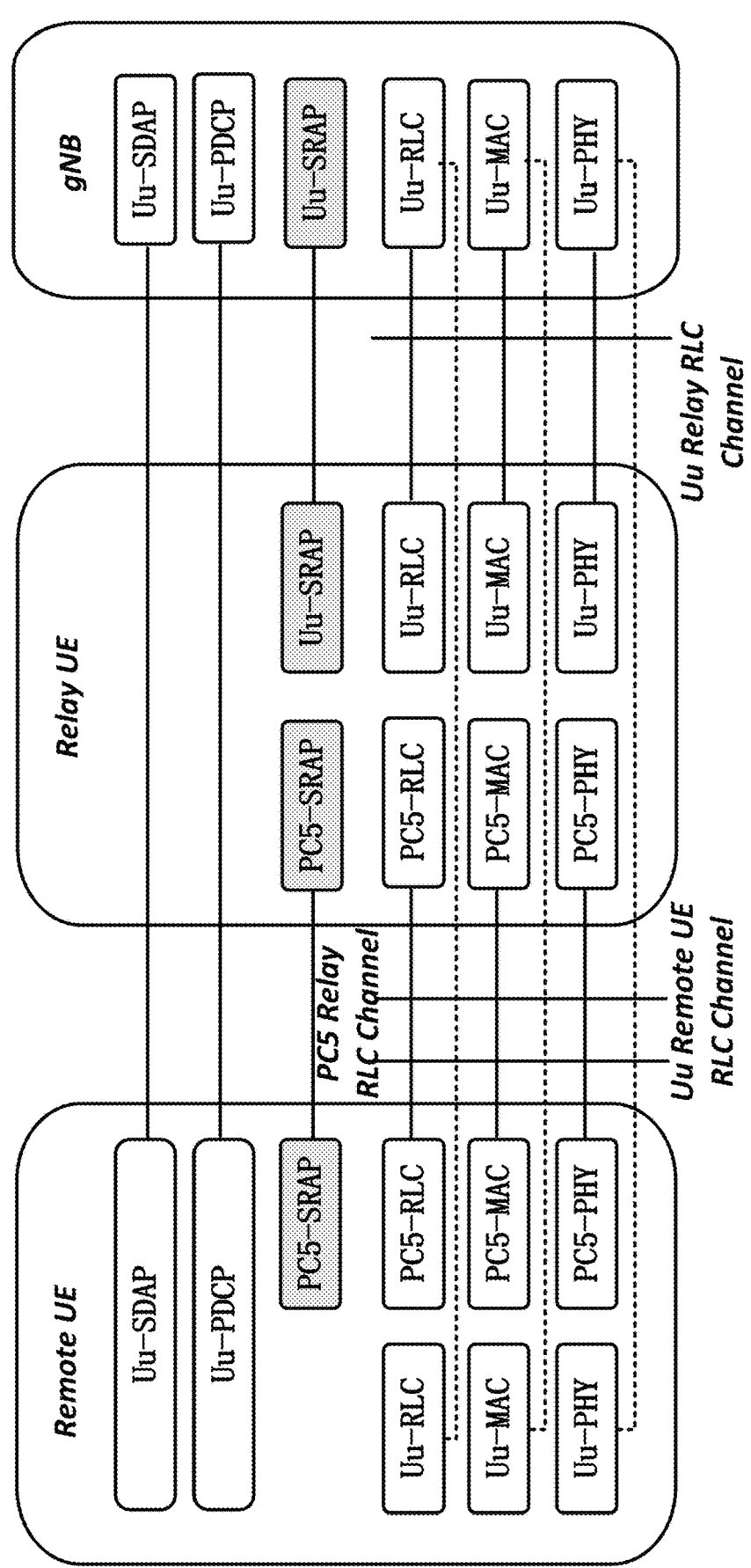
FIG. 16 illustrates an example UP protocol stack for dual path transmission, in accordance with various embodiments.
Figure 17:
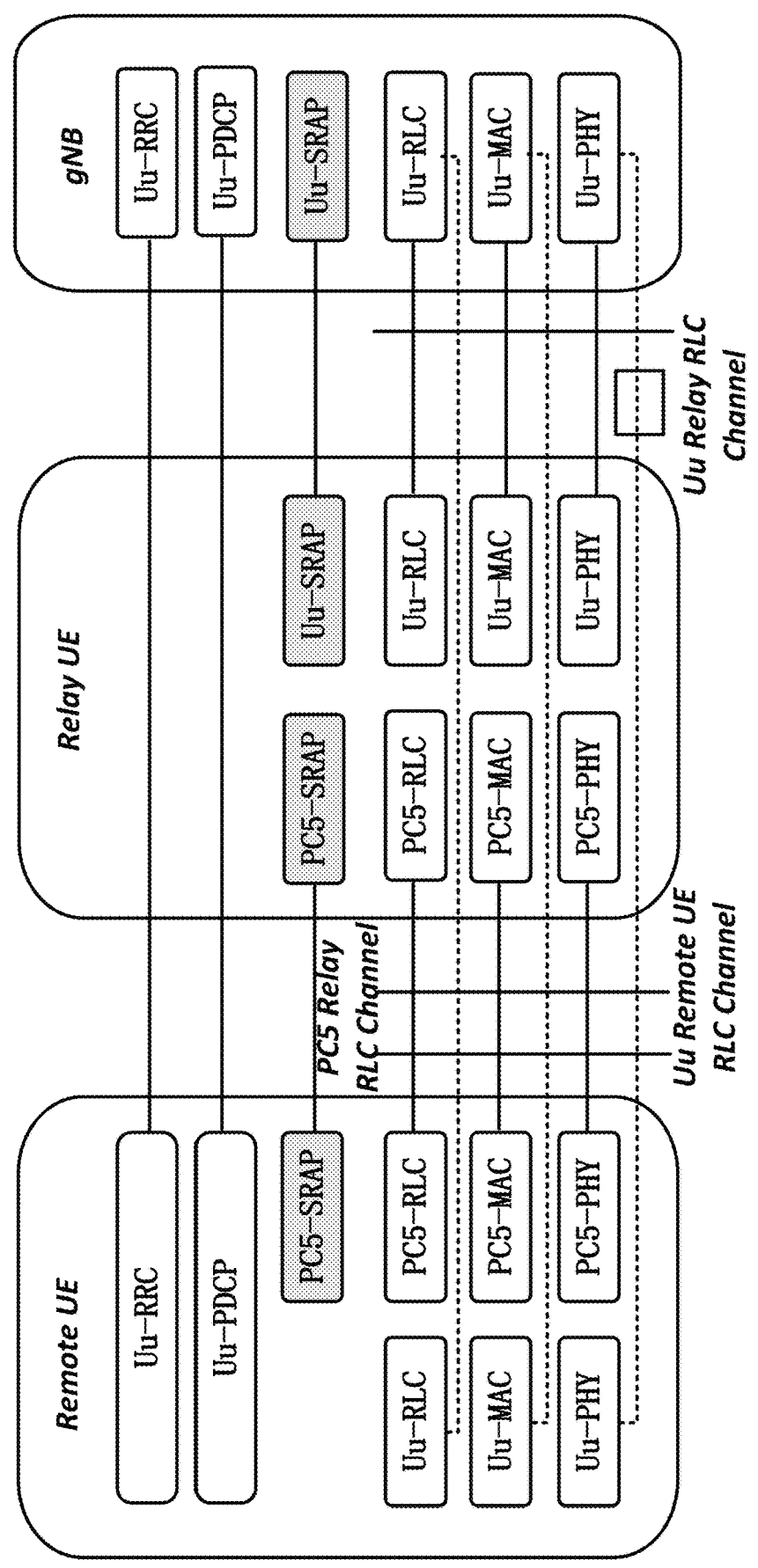
FIG. 17 illustrates an example CP protocol stack for dual path transmission, in accordance with various embodiments.

The architecture shown in FIGS. 16 and 17 for multipath transmission may be used for this RAN based redundancy solution. In Layer 2 UE-to-Network Layer architecture in TS 38.300, the Uu SDAP, PDCP and RRC are terminated between L2 U2N Remote UE and gNB, while SRAP, RLC, MAC and PHY are terminated in each hop (i.e. the link between L2 U2N Remote UE and L2 U2N Relay UE and the link between L2 U2N Relay UE and the gNB). For the case of multipath transmission, the Uu SDAP, PDCP and RRC may still be terminated between L2 U2N Remote UE and gNB, however, the Remote UE also maintains a complete Uu stack, with the RLC, MAC and PHY also terminating between the Remote UE and the gNB.

Packet Duplication in Downlink

Figure 18:
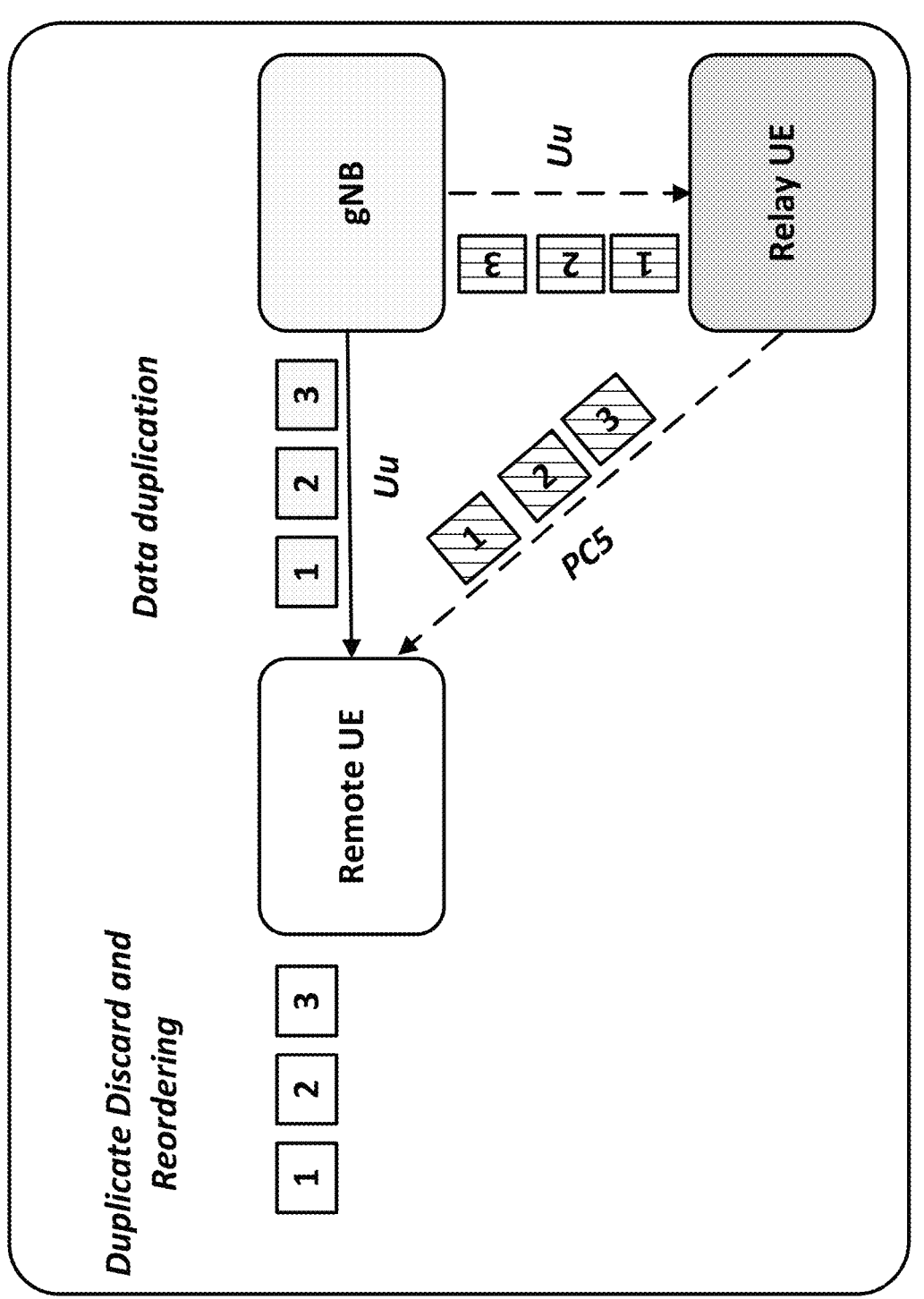
FIG. 18 illustrates an example of data duplication in downlink (DL), in accordance with various embodiments.

In the downlink (DL), the gNB may duplicate PDUs at the PDCP layer, where it sends two copies, one each over the direct and indirect channel as shown, for example, in FIG. 18. The details pertaining to triggering condition, activation/deactivation etc of data duplication in downlink can be up to gNB implementation.

In the case of PDCP duplication in URLLC, t-Reordering timer is configured by the upper layers. However, for the case of sidelink communication, this timer is determined by the UE implementation (see, e.g., 3GPP TS 38.323. In the case of multipath transmission in relaying environment, the t-Reordering timer can be configured by upper layers similar to URLLC case and only one t-Reordering timer per receiving PDCP entity is running at a given time. Upon expiry of t-Reordering timer, the receiving PDCP entity (at the Remote UE in the case of DL PDCP duplication) delivers all stored PDCP SDUs to the upper layers in ascending order of sequence numbers (SNs).

Packet Duplication in Uplink

In the case of an ultra-reliable and low latency communication (URLLC) network, duplication can be activated per radio bearer for PDCP PDUs. Duplication at PDCP may include submitting the same PDCP PDUs multiple times: once to each activated RLC entity for the radio bearer thereby with such multiple independent transmission paths, packet duplication can increase reliability and reduce latency. In the case of Dual Connectivity (DC), the original PDCP PDU and the corresponding duplicates are not transmitted in the same carrier.

Figure 19:
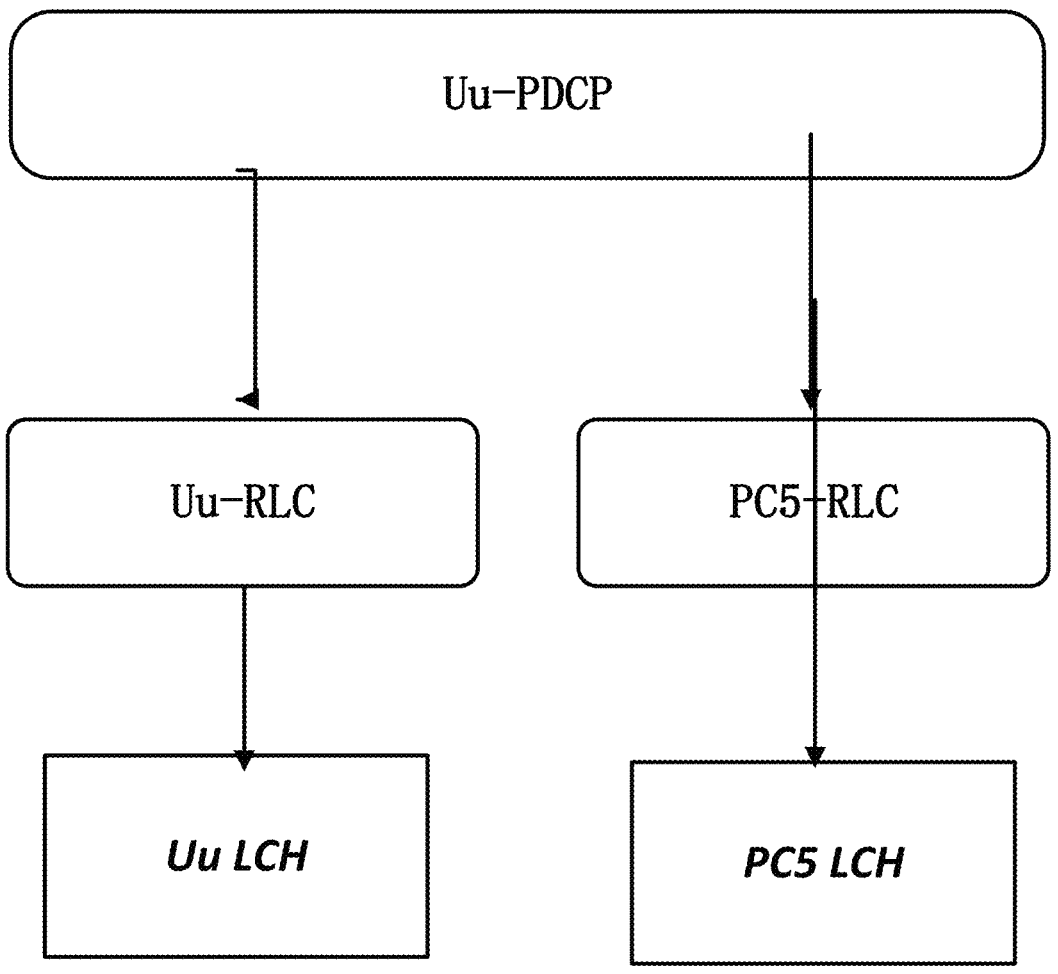
FIG. 19 illustrates an example of packet duplication using a direct path and an indirect path, in accordance with various embodiments.

For the case of multipath transmission in the considered scenario, DC+CA PDCP duplication in URLLC may be taken as a baseline, however in this case there may be no existence of Master Node (MN) and Secondary Node (SN), rather the Remote UE is connected to a single gNB directly, and through a L2 UE-to-Network Relay UE. For UE to Network relaying, the Remote UE establishes its own PDU sessions and DRBs with the network before user plane data transmission. Therefore the split bearer architecture can be used, where the remote UE's Uu DRB is forwarded over both the direct and indirect links. The PDCP entity at the UE thus submits the PDCP PDU to the two RLC entities as shown in FIG. 19, i.e to the Uu RLC entity and the PC5 RLC entity. Here it is assumed that both RLC entities are activated. Since the identity information of Remote UE Uu Radio Bearer and a local Remote UE ID are included in the Uu SRAP header, the gNB can correlate the received packets from the direct Uu link and via the Relay UE to be from the specific PDCP entity associated with the correct Uu radio bearer of the Remote UE.

The Uu DRB(s) and Uu SRB(s) from the PDCP entity may be mapped to different RLC channels i.e PC5 Relay RLC Channels and Uu Remote UE RLC channels. The Uu SRAP at the relay UE performs bearer mapping to the egress Uu RLC channels. The gNB receives duplicated data incoming from the Remote UE's Uu RLC channel (via direct link) and the Relay UE's Uu RLC channel (for indirect link).

Figure 20:
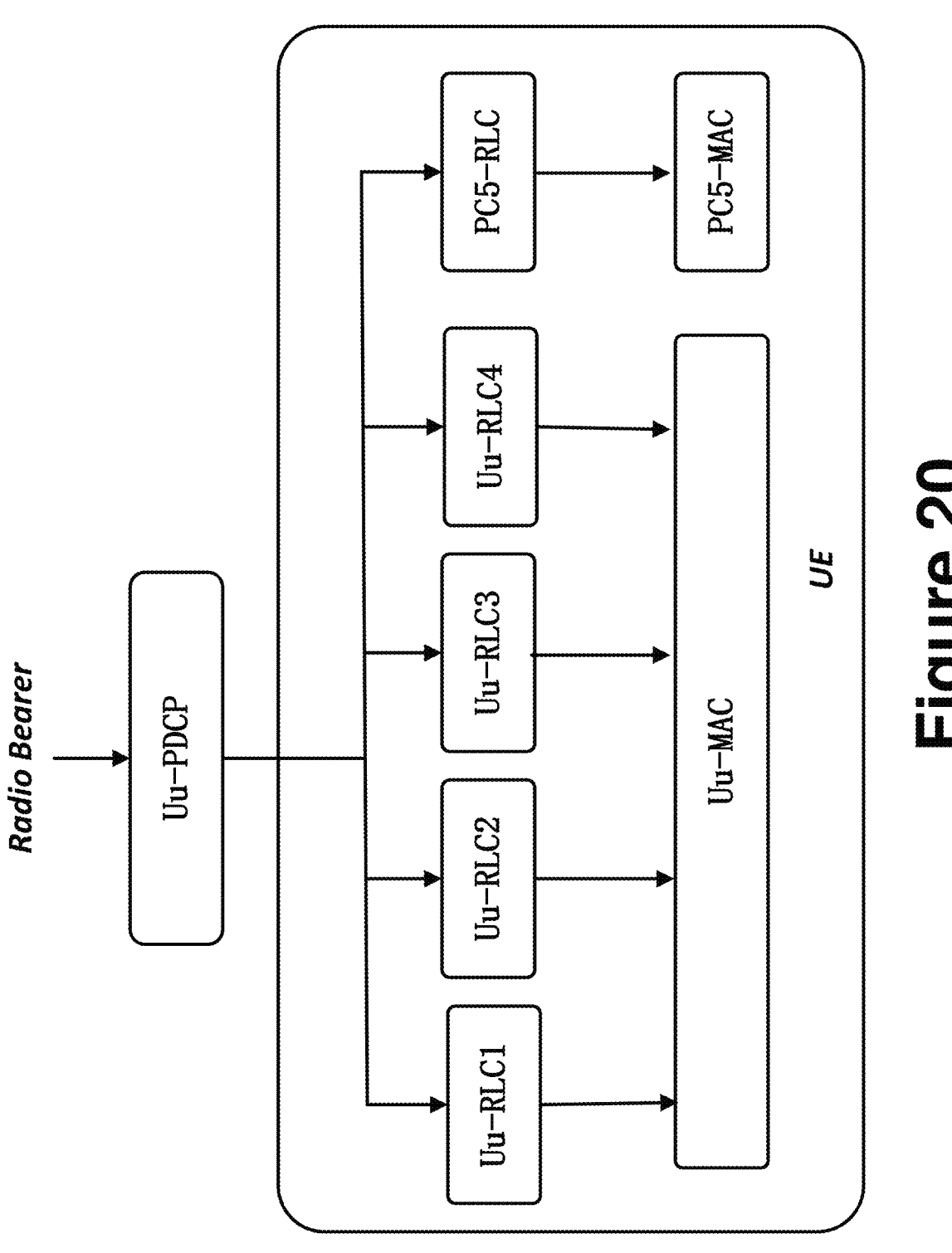
FIG. 20 illustrates an example of CA duplication for Uu radio link control (RLC) and single PC5 RLC in the case of multi-path relaying, in accordance with various embodiments.

In addition to this architecture, it is possible to have CA duplication for the Uu link as per legacy. Then there is one PC5 RLC entity, and up to four Uu RLC entities, with single SL CA and multiple Uu CAs. The secondary Uu RLC entities (in addition to the primary Uu RLC entity) can be assigned to distinct Component Carriers (CCs) such that the PDCP PDU is transmitted over distinct wireless links to achieve the diversity gain. This architecture is shown, for example, in FIG. 20.

Embodiment 3—Activation/Deactivation

PDCP duplication can be configured for a DRB/SRB using RRC signalling and the state of PDCP duplication (activated/deactivated) can also be set at the time of RRC reconfiguration, similar to URLLC case. Once configured, the PDCP duplication state may also be dynamically activated/deactivated using MAC CE for Uu DRBs. For the case of multipath transmission via relay and directly, it can be assumed that both RLC entities (PC5 and Uu) are activated, however if MAC CE is used to deactivate duplication, both RLC entities cannot be deactivated simultaneously, a single valid link must remain active for data transmission. This aspect can be controlled with configuration of path switching mechanism for multipath transmission such that the primary RLC entity is one with the best channel condition. The Remote UE may choose the path with best channel condition as determined at the time of receiving MAC CE from the gNB for transmitting the Uu DRB packets. It can use the same link until an event like RLF or reselection or activation of duplication occurs.

The relay UE may forward the MAC CE from the gNB for duplication activation/deactivation of a Uu DRB. To this end, since MAC layer is terminated in each hop (i.e. the link between Remote UE and Relay UE and the link between Relay UE and the gNB) (see, e.g., TS 38.300), the relay UE may forward the MAC CE to the remote UE as a SL MAC CE or through PC5-RRC signalling. In the case that the Uu MAC CE is forwarded as a SL MAC CE, the Relay UE performs shallow packet inspection and forwards the MAC CE to the Remote UE associated with the destination UE ID in the adaptation layer header, in the scenario that multiple remote UEs are connected to the gNB via the given relay UE. This means that the Remote UE can apply the MAC CE regardless of its origin (from gNB Uu MAC CE or from Relay UE as SL MAC CE) for activation/deactivation of PDCP duplication. The relay UE could also forward the MAC CE encapsulated as a data packet, however, in this case the remote UE would receive it as any other data packet and prioritization for multiplexed data must be configured accordingly to avoid delay of MAC CE.

Embodiments Related to SL Relay Multipath Enablement

Embodiment #1 Multipath Enabling

Multipath enabling refers to how the UE is enabled to utilize the multiple (i.e. two in this release) available paths for packet transfer. The different cases wherein multiple paths of direct and indirect links can be applicable for potential packet duplication or path switching across the two paths for both SRB and DRB in both uplink and downlink may include one or more of the following (herein direct path corresponds to a suitable cell and indirect path corresponds to PC5 link to a suitable UE-to-NW relay (via discovery) with the same gNB, these concepts are as introduced in 3GPP Release 17):

L2 Remote UE is active on the direct path and finds that the indirect path is available (satisfying a specific Uu link quality threshold with, in some embodiments, hysteresis) and adds this path if configured to support two paths simultaneously.

L2 Remote UE is active on the indirect path and finds that direct path is available (satisfying a specific PC5 link quality threshold with, in some embodiments, hysteresis) and adds this path if configured to support two paths simultaneously.

L2 Remote UE finds that both direct and indirect paths are available (meeting the necessary thresholds with hysteresis). Up to UE implementation, it can choose one or the other paths to initiate connection if both are considered to be viable. It can also be specified that the Remote UE chooses the best path of the two available paths by comparing each path's link quality to a predetermined/configured threshold and chooses whichever is better by a larger amount or another specified delta value.

In one example, the term multipath relaying corresponds to the simultaneous operation of both direct and indirect paths at the UE to transmit/receive signalling and data i.e. both links can be active at the same time. In release 17, only one path is allowed to be active at any time.

In one example, the Remote UE can be configured to support multipath (i.e. to perform RLM as described below) dynamically by the gNB using dedicated signalling at any time after the UE completes RRC connection establishment using the first path. The Remote UE and Relay UE can use the UE capability messages to showcase the support of or be preconfigured with, multipath relaying (including in the case of Remote UE, whether it can support PDCP duplication for SRB, DRB or both and whether it can support switching links dynamically for SRB, DRB or both) and the network/gNB can showcase its support through system information.

The UE context at the core network (e.g. access & mobility management function (AMF), unified data management (UDM), etc.) can indicate that the Remote UE is authorized to support multipath and the gNB can fetch this information from the core network when the Remote UE connects for the first time. Once the Remote UE has established connection with the gNB via the first path, if enabled/configured/activated, the Remote UE finds the second path involving the suitable cell/relay as applicable.

Once the capability of the UE, the configuration, and the support of the network for multipath is established, the feature can also be enabled more dynamically using one or more of the following two example approaches:

1) gNB-Based Approach Using Dynamic Activation/Deactivation Based on MAC CE or L1 Signalling.

a. In this approach, in one example, assuming the Remote UE is connected to the serving cell either through direct path or indirect path, the serving cell shall indicate using a MAC CE or L1 signalling to activate or deactivate multipath which enables the Remote UE to start performing measurements on Uu link of serving cell or PC5 link for relay UEs in the serving cell, depending on whether it is connected to indirect path or direct path respectively. The measurement configuration is assumed to be provided to the Remote UE. The necessary thresholds are assumed to be configured to the Remote UE either using dedicated signalling or broadcast signalling.

i. The MAC entity on the Remote UE upon receiving the MAC CE or L1 signalling on the serving cell, performs measurements of relay UE and serving cell and sends a report to the serving cell. It is assumed that the Remote UE obtains the MAC CE either directly on Uu or via the Relay UE. An example of this embodiment may be discussed, for example, above.

b. In another example, assuming the Remote UE is already connected to the serving cell using both direct path and indirect path and has configured bearers that can use multipath either switching between the two paths or using both paths simultaneously for PDCP duplication, the activation/deactivation MAC CE or L1 signalling can indicate to start or stop the multipath transfer in uplink corresponding to dynamic switching or other ways of multipath (an example of the way of PDCP duplication is covered may be seen above). The downlink decision may be left to gNB implementation.

i. The MAC entity on the Remote UE upon receiving the MAC CE or L1 signalling on the serving cell, starts/stops the data transfer using multipath according to the indication.

ii. The gNB can indicate to stop using one path and indicate to use another path or a default path or use the best path as decided by the Remote UE based on Uu link quality and PC5 link quality at that time or to be decided by the Remote UE based on additional information e.g. Relay UE load, QoS support, buffer status, Relay UE's Uu link quality.

2) UE-based approach using channel conditions evaluated against configured thresholds and/or buffer status.

a. Based on channel conditions: For dynamic activation/deactivation of multipath transmission, the channel condition could be taken into account by the Remote UE. In L2 UE to Network Relaying communication, as specified in Release 17, the Remote UE halts the Uu Radio Link Monitoring (RLM) when it is connected to the gNB via the relay UE. For the case of multipath transmission, however, the Remote UE does not suspend the Uu RLM. In addition, the Remote UE also carries out PC5 RLM to gauge the channel condition for the PC5 link between the remote UE and the relay UE.

i. For Reliability improvement scenario: Dual threshold condition could be used, such that multipath transmission is activated if Uu link quality is worse than threshold1a AND PC5 link quality is worse than threshold2a. Once the multipath transmission links are configured and set-up, either of them could also be dynamically deactivated based on measurement results, such that either if Uu link quality is worse than threshold1b OR PC5 link quality is worse than threshold2b, communication is switched to the link with the better channel quality. If however, the channel condition is much worse, such that if Uu link quality is worse than threshold1c, cell reselection can be triggered. Similarly if PC5 link quality is worse than threshold2c, relay reselection may be triggered to avoid Radio Link Failure (RLF) on either paths. Note here the below relations between the threshold values For            Uu               link:
   threshold1a>threshold1b>threshold1c
For            PC5              link:
   threshold2a>threshold2b>threshold2c ii. For capacity improvement scenario: Dual threshold condition could be used, such that multipath transmission is activated if Uu link quality is better than threshold3 AND PC5 link quality is better than threshold4. Once the multipath transmission links are configured and set-up, either of them could also be dynamically deactivated based on measurement results, such that either if Uu link quality is worse than threshold1a OR PC5 link quality is worse than threshold2a, communication is switched to the link with the better channel quality until the other link quality improves.

b. Based on UE's buffer status: For dynamic activation/deactivation of multipath, the UE's buffer status can be used in addition to channel conditions. If the UE's buffer status indicates a possibility of overflow and if the UE has multipath enabled and configured by the gNB, the Remote UE could start to use both the paths to send traffic. It is possible for the Remote UE, based on configuration, to split the bearer traffic using both the paths. It can also send different bearers to different paths as long as the configuration allows for it. Since there is only one PDCP entity at the gNB, it is feasible to allow both paths to be active/inactive dynamically without gNB involvement.

In one example, the network (gNB) configures the support of multipath on a per-bearer basis (including SRB and DRB) and provides necessary configuration to Remote UE and Relay UE accordingly. At the same time, it is possible that the gNB does not prefer to support SRB duplication or SRB switching between multiple paths and supports only the case where DRBs can be enabled with multipath switching/duplication/splitting.

As part of the radio bearer configuration or PDCP configuration information element or SL L2 Remote UE configuration, for each SRB or DRB, the network can configure the IE multipath or RelayAndDirectpath or IndirectAndDirectPath to be enabled as shown below as an example, from the 3GPP TS 38.331 specification:

```
SRB-ToAddMod ::=              SEQUENCE {
    srb-Identity              SRB-Identity,
    reestablishPDCP               ENUMERATED{true}          OPTIONAL,  -- Need N
    discardOnPDCP                 ENUMERATED{true}          OPTIONAL,  -- Need N
    pdcp-Config               PDCP-Config               OPTIONAL,  -- Cond PDCP
        MultipathEnabled or RelayAndDirectPathEnabled             ENUMERATED{true}
OPTIONAL,  -- Need N ...
}
DRB-ToAddModList ::=          SEQUENCE (SIZE (1..maxDRB)) OF DRB-ToAddMod
DRB-ToAddMod ::=              SEQUENCE {
    cnAssociation             CHOICE {
        eps-BearerIdentity            INTEGER (0..15),
        sdap-Config               SAP-Config
    }                         OPTIONAL,  -- Cond DRBSetup
```

-continued

```
    drb-Identity            DRB-Identity,
    reestablishPDCP              ENUMERATED{true}      OPTIONAL,  -- Need N
    recoverPDCP                  ENUMERATED{true}      OPTIONAL,  -- Need N
    pdcp-Config                  PDCP-Config           OPTIONAL,  -- Cond PDCP
        MultipathEnabled or RelayAndDirectPathEnabled  ENUMERATE{true}
OPTIONAL,  -- Need N
    ...,
    [[
    daps-Config-r16              ENUMERATED{true}      OPTIONAL  -- Cond DAPS
    ]]
}
```

In one example, the gNB can configure the Remote UE with multipath enabling to indicate whether the bearer is to support switching or duplication.

```
    e.g. RelayAndDirectPathSupport  Enumerated {switching, duplication, either}
    e.g. MultipathRelaySupport           Enumerated {useBestPath, useDynamicSwitching,
useDirectPath,  useIndirectPath, useDuplication}
```

PDCP-config can also be updated to include information to support multiple paths and the logical channel identity.

The sl-L2RemoteUEConfig IE which currently aids in configuring the SRAP (Sidelink Relay Adaptation Protocol) mapping of the Uu bearer to the egress RLC channel over PC5 and Uu can be updated to support the multipath by including whether the sl-RemoteUE-RB-Identity including the SRB or DRB identity of the Remote UE will be configured with MultipathEnabled/RelayAndDirectPathEnabled IE.

Embodiment #2 Radio Protocol Architecture

Control Plane

As there is only one gNB, the Remote UE has a single RRC state, has only one PDCP termination point (at the gNB) and overall, only a single connection towards the core network. RRC PDUs are end-to-end and only exchanged between the Remote UE and the gNB but can be configured to be sent over either the indirect path (via relaying) or the direct path or both the paths.

Depending on when the network configures the Remote UE, either only SRB2 or both SRB1 and SRB2 in addition to DRB can be configured as multipath bearers or Relay-AndDirectPath or splitRemote bearers or with a similar terminology indicating that these bearers can use both the paths as per configuration.

Control Plane and User Plane Handling (Bearer Type Selection)

For both uplink and downlink, for both control plane and user plane, a bearer (i.e. Uu SRB2 or DRB) is deemed direct path if it uses only the direct path; and it is an indirect path bearer, if it uses the relay-based path and deemed a multipath bearer if it can use either the direct path or indirect path by way of switching or both simultaneously.

The gNB may provide one or more of the following configuration elements for each bearer of the Remote UE which has two paths available and enabled with multipath switching or duplication:

PDCP and SDAP configuration (common/separate to both relay path and direct path and indicated accordingly)

PC5 RLC/LCH configuration for indirect path support

Uu RLC/LCH configuration for direct path support

As per legacy the gNB configures the Relay UE with PC5 RLC/LCH configuration and Uu RLC/LCH configuration for relaying Remote UE radio bearer.

For those bearers that are not enabled to support both paths, the gNB can explicitly configure each bearer to be using direct path only or Indirect path only or the best path or it can be left to Remote UE implementation to use any one path dynamically based on the PC5 signal strength and Uu signal strength/channel conditions at periodic intervals. In this case, the switching is left to UE implementation but the gNB could provide/configure separate link quality thresholds to enable the decision to be taken by the Remote UE. However, such dynamic switching may make UE implementation complex. As such, it may be expected that the UE chooses the best path based on channel conditions and other metrics for a given bearer and continues to use that path until RLF or reselection or change in channel conditions occurs based on RLM.

The gNB is allowed to reconfigure a given bearer at any time to switch the path based on Remote UE measurement report or Relay UE measurement report or QoS information.

For packet duplication in URLLC vertical support, there exists the concept of primary RLC entity and secondary RLC entity, where the primary RLC entity can never be deactivated. In the case of multipath transmission with one direct and another indirect link, there is no notion of primary and secondary RLC entities. However, checks must be in place to ensure that both entities are simultaneously not deactivated rendering the communication link disrupted altogether. So for this case, the categorization of primary and secondary could be based on the channel quality for the direct and indirect link, such that whichever path has better channel quality based on some preconfigured threshold, the associated RLC entity can be considered as the primary RLC entity and can therefore not be deactivated. As a consequence of the Radio Link Monitoring (RLM), the primary and secondary RLC entities may switch as required since the designation is not permanent in this case.

Figure 21:
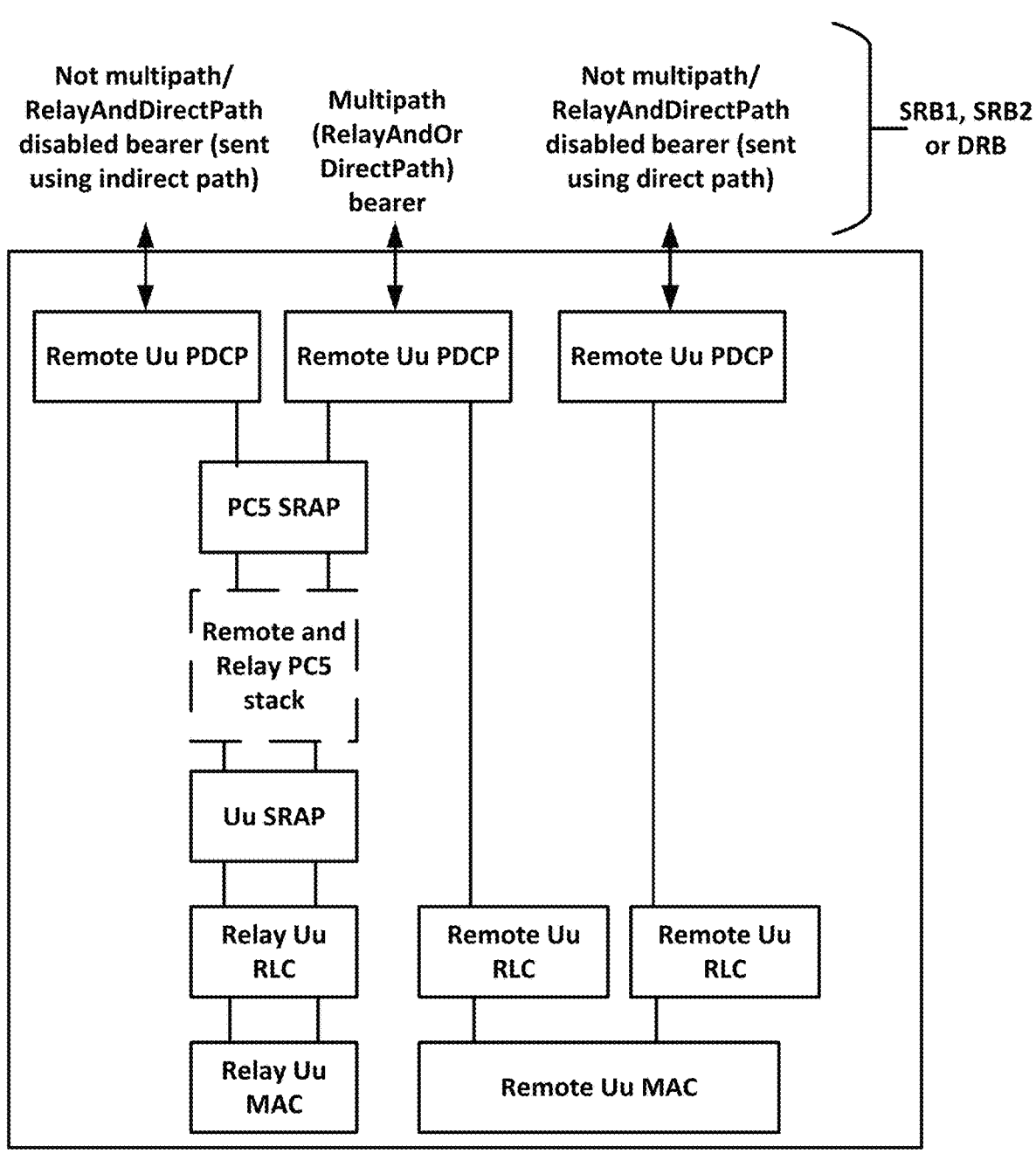
FIG. 21 illustrates an example radio protocol architecture from the UE perspective, in accordance with various embodiments.
Figure 22:
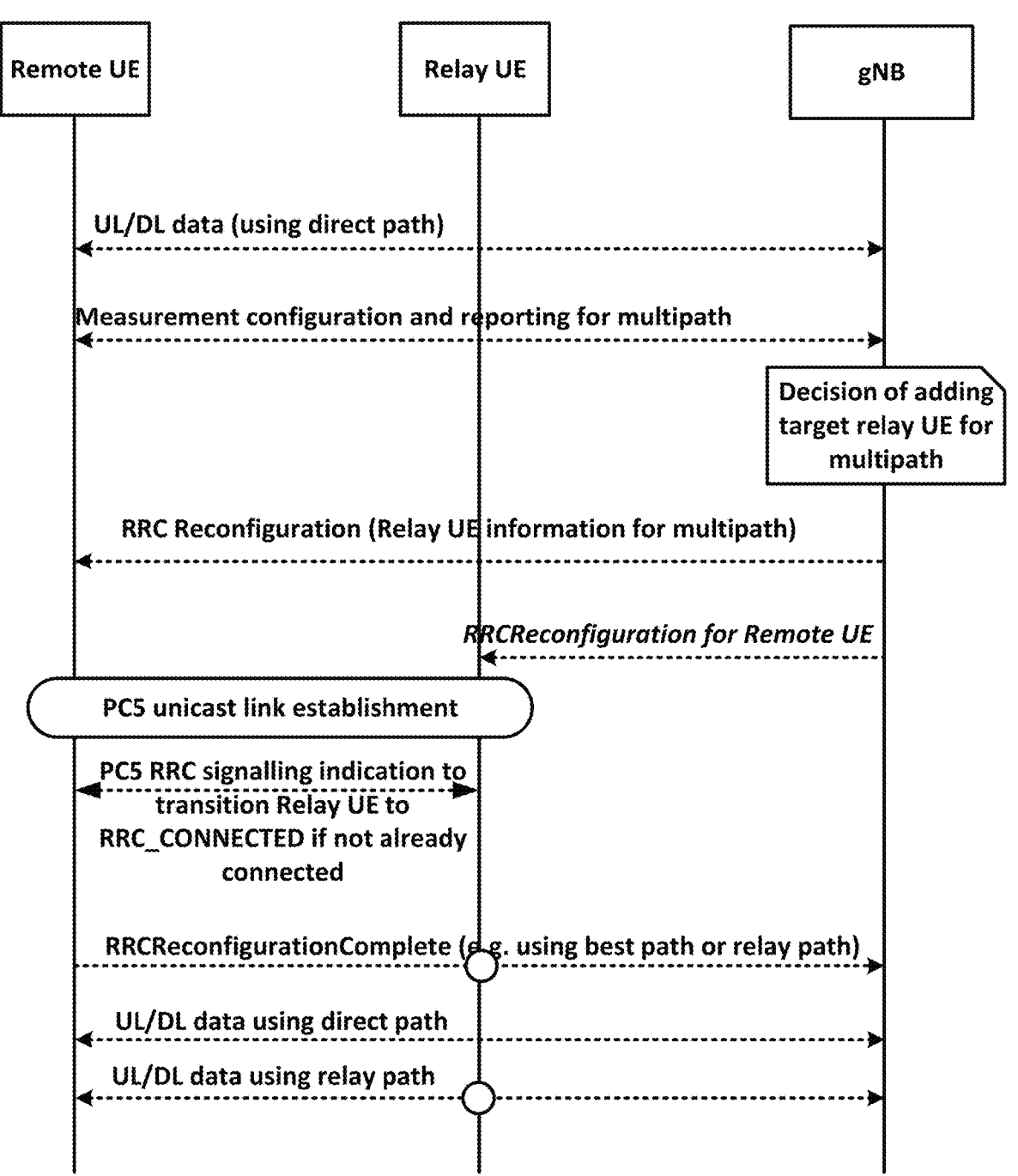
FIG. 22 illustrates an example procedure related to a U2N Remote UE adding a relay path to a direct path, in accordance with various embodiments.

FIG. 21 shows an example radio protocol architecture from UE perspective of multipath bearer, direct path bearer and indirect path bearer. Such architecture may be similar or related to the Release 17 architecture.

Embodiment #3 RRC Signalling Aspects

Dual connectivity or Multiconnectivity is an example architecture where the UE can support access to multiple network nodes simultaneously. As per TS 37.340, the Master node or MN uses secondary node addition/modification procedure to incorporate a secondary node that can be used by the UE for data transmission. The MN node configures the UE via MN RRC signalling on whether to use MCG path or duplicate the transmission on both MCG and SCG.

In the case of multipath relaying, we need to determine the following:

RRC signalling when the gNB is responsible for the decision to perform multipath connectivity (similar to path switching) for the Remote UE (MAC CE or L1 signalling is covered in embodiment #1).

RRC signalling when the gNB provides the configuration for the two paths upon any indication/signalling from Remote UE or Relay UE once the second path is ready (e.g. after PC5 connection establishment).

Remote UE Connected Via Direct Path

In one example, the Remote UE could provide candidate Relay UE information (including Relay UE ID, serving cell ID and sidelink measurement result like SL-RSRP or SD-RSRP) when it is already connected via direct path towards the gNB with an indication suggesting that it is intended for multipath or in response to gNB activation trigger/configuration to perform measurements for multipath. The candidate relay list has to satisfy higher layer criteria as well as the AS layer criteria i.e. the multipath thresholds for PC5 link quality. The gNB could then choose the Relay UE, from the candidate list, for the Remote UE to connect to and provide the Relay UE information to the Remote UE along with the PC5 RLC/LCH configuration information as per Release 17 path switching. Thereafter, the Remote UE or the Relay UE could indicate to the gNB once PC5 connection is established between them for relaying using the direct path (e.g via new Uu RRC message or existing Sidelink UE Information message) and/or send RRCReconfiguration-Complete using the new configuration. In another example, the Remote UE provides the selected Relay UE information while already connected via direct path towards the gNB (e.g. via new Uu RRC message or existing Sidelink UE Information message). This enables/triggers the gNB to provide RLC/LCH configuration to both the Remote UE and Relay UE (e.g. using RRCReconfiguration message).

Figure 23:
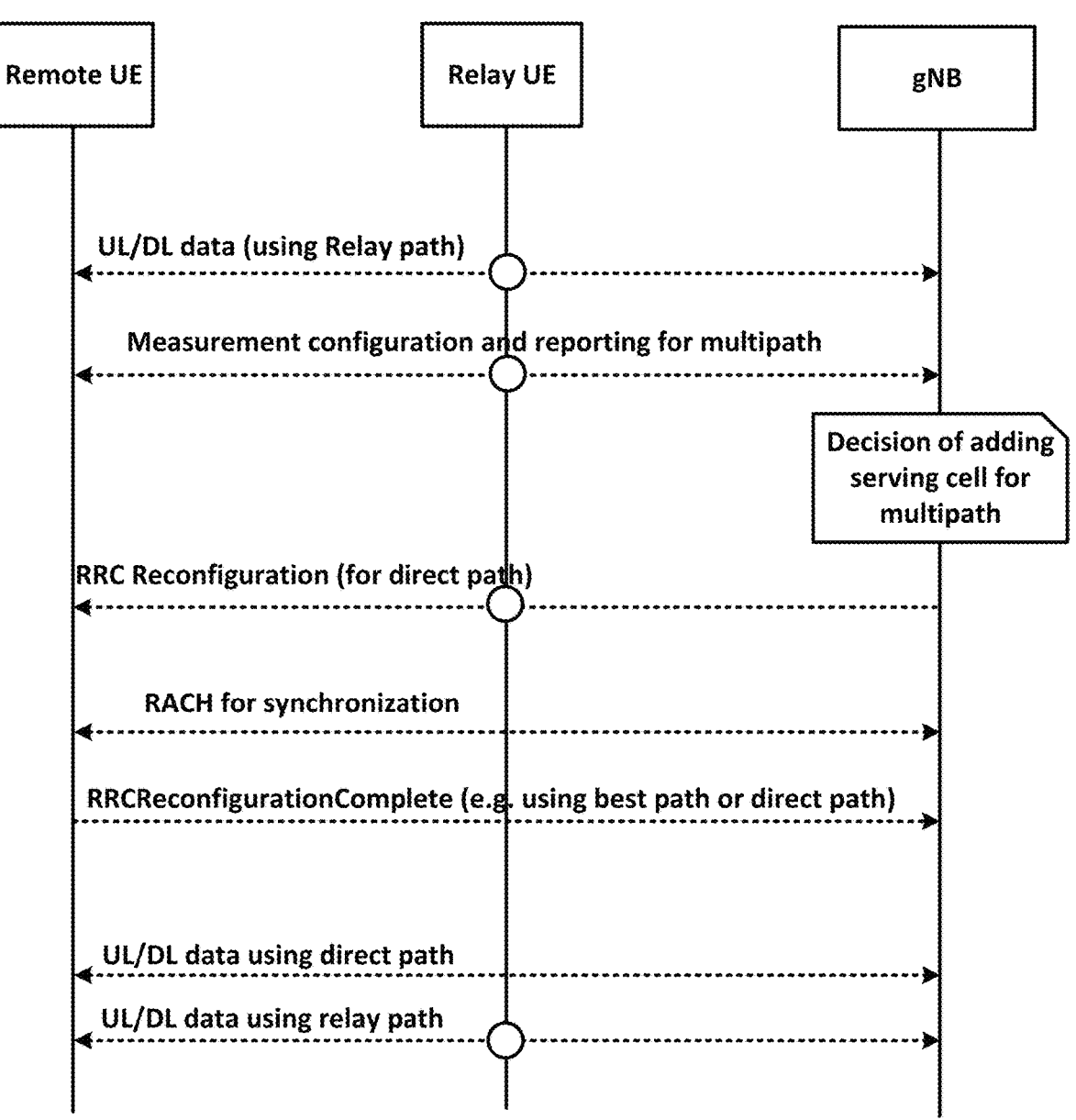
FIG. 23 illustrates an alternative example procedure related to a U2N Remote UE adding a Relay path to a direct path, in accordance with various embodiments.

Using TS 38.300 control plane procedure for path switching for U2N Remote UE as baseline, as can be seen in FIG. 23, the gNB makes the decision to add Relay UE path for the Remote UE based on the measurement results. It sends Reconfiguration to the Remote UE as per Release 17 configuration and towards the Relay UE if and when it is in RRC_CONNECTED. Thereafter based on bearer configuration, the Remote UE could use the best path or one of the paths to send the packets in uplink and it is up to gNB implementation to use one of the paths for downlink.

Remote UE Connected Via Indirect Path

In another case, if the Remote UE is connected via the indirect path through a Relay UE, based on gNB configuration (e.g. of Uu link quality thresholds for multipath), the Remote UE can assume the cell is suitable whenever the link quality measured is above a configured multipath threshold using UE-based approach discussed above. In another example, using gNB-based approach, the gNB can provide Remote UE with Uu RLC/LCH configuration and indication to initiate direct connection using RRCReconfiguration message. The Remote UE can thereafter perform synchronization to the gNB by initiating the RACH procedure. The Remote UE can then send a new message or use existing RRC message (e.g. UE Assistance information or Sidelink UE Information) over Uu as per Remote UE's Uu RLC/LCH configuration provided over the indirect path to use a specific SRB to send RRCReconfigurationComplete and to receive further Uu configuration for multipath transmission and reception.

Figure 24:
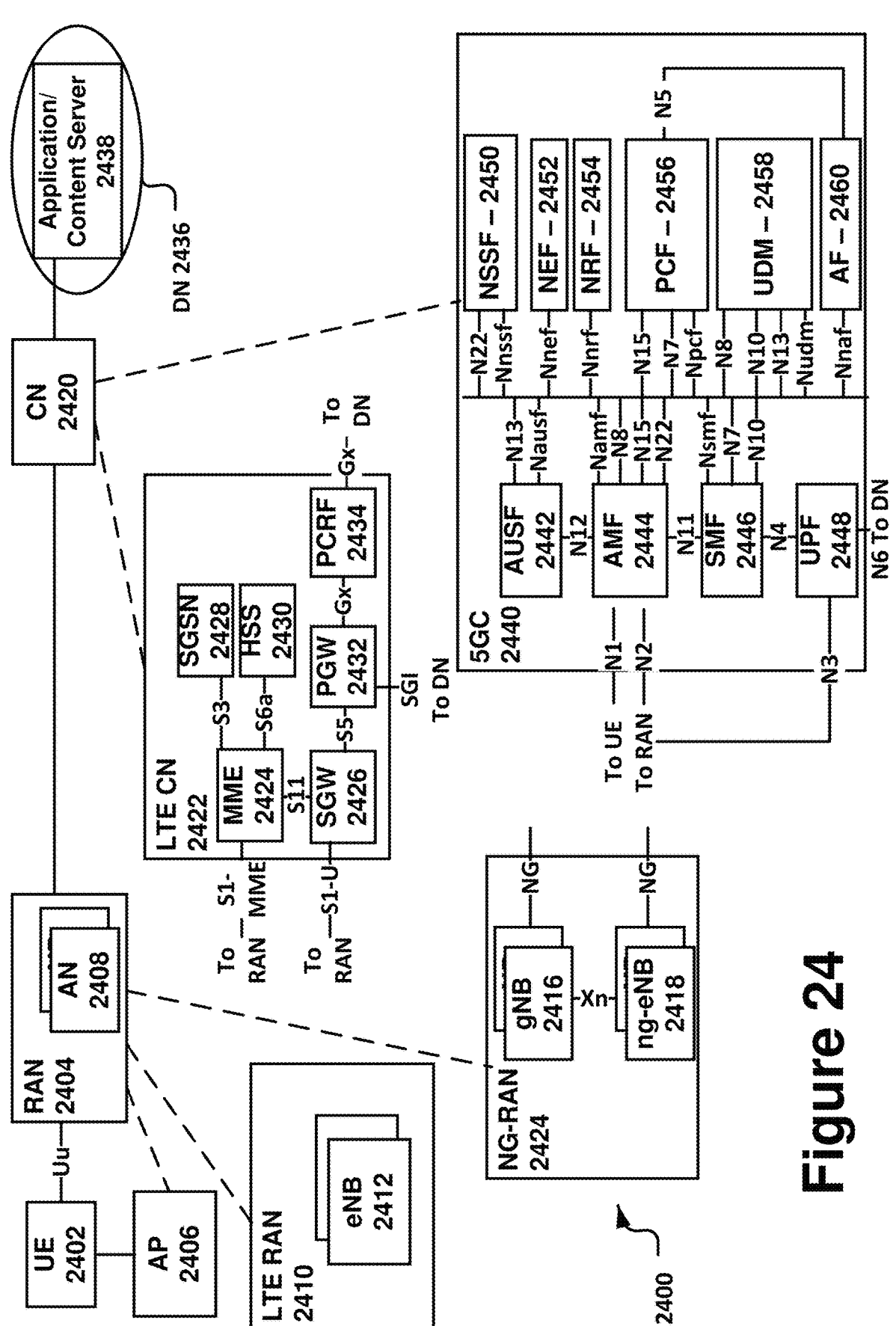
FIG. 24 schematically illustrates a wireless network in accordance with various embodiments.

As shown in FIG. 24, once the Remote UE sends the measurement report of the serving cell, the gNB decides to configure the Remote UE for multipath using RRC signalling and once configured, the Remote UE performs synchronization and sends the RRCReconfigurationComplete depending on configuration (using best path or both paths). Thereafter, based on DRB configuration, the data packets also follow accordingly.

Systems and Implementations

FIGS. 24-27 illustrate various systems, devices, and components that may implement aspects of disclosed embodiments.

FIG. 24 illustrates a network 2400 in accordance with various embodiments. The network 2400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 2400 may include a UE 2402, which may include any mobile or non-mobile computing device designed to communicate with a RAN 2404 via an over-the-air connection. The UE 2402 may be communicatively coupled with the RAN 2404 by a Uu interface. The UE 2402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 2400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 2402 may additionally communicate with an AP 2406 via an over-the-air connection. The AP 2406 may manage a WLAN connection, which may serve to offload some/all network traffic from the RAN 2404. The connection between the UE 2402 and the AP 2406 may be consistent with any IEEE 802.11 protocol, wherein the AP 2406 could be a wireless fidelity (Wi-Fi®) router. In some embodiments, the UE 2402, RAN 2404, and AP 2406 may utilize cellular-WLAN aggregation (for example, LWA/LWIP). Cellular-WLAN aggregation may involve the UE 2402 being configured by the RAN 2404 to utilize both cellular radio resources and WLAN resources.

The RAN 2404 may include one or more access nodes, for example, AN 2408. AN 2408 may terminate air-interface protocols for the UE 2402 by providing access stratum protocols including RRC, PDCP, RLC, MAC, and L1 protocols. In this manner, the AN 2408 may enable data/voice connectivity between CN 2420 and the UE 2402. In some embodiments, the AN 2408 may be implemented in a discrete device or as one or more software entities running on server computers as part of, for example, a virtual network, which may be referred to as a CRAN or virtual baseband unit pool. The AN 2408 be referred to as a BS, gNB, RAN node, eNB, ng-eNB, NodeB, RSU, TRxP, TRP, etc. The AN 2408 may be a macrocell base station or a low power base station for providing femtocells, picocells or other like cells having smaller coverage areas, smaller user capacity, or higher bandwidth compared to macrocells.

In embodiments in which the RAN 2404 includes a plurality of ANs, they may be coupled with one another via an X2 interface (if the RAN 2404 is an LTE RAN) or an Xn interface (if the RAN 2404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 2404 may each manage one or more cells, cell groups, component carriers, etc. to provide the UE 2402 with an air interface for network access. The UE 2402 may be simultaneously connected with a plurality of cells provided by the same or different ANs of the RAN 2404. For example, the UE 2402 and RAN 2404 may use carrier aggregation to allow the UE 2402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 2404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 2402 or AN 2408 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 2404 may be an LTE RAN 2410 with eNB s, for example, eNB 2412. The LTE RAN 2410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 2404 may be an NG-RAN 2414 with gNB s, for example, gNB 2416, or ng-eNBs, for example, ng-eNB 2418. The gNB 2416 may connect with 5G-enabled UEs using a 5G NR interface. The gNB 2416 may connect with a 5G core through an NG interface, which may include an N2 interface or an N3 interface. The ng-eNB 2418 may also connect with the 5G core through an NG interface, but may connect with a UE via an LTE air interface. The gNB 2416 and the ng-eNB 2418 may connect with each other over an Xn interface.

In some embodiments, the NG interface may be split into two parts, an NG user plane (NG-U) interface, which carries traffic data between the nodes of the NG-RAN 2414 and a UPF 2448 (e.g., N3 interface), and an NG control plane (NG-C) interface, which is a signaling interface between the nodes of the NG-RAN 2414 and an AMF 2444 (e.g., N2 interface).

The NG-RAN 2414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 2402 can be configured with multiple BWPs where each BWP configuration has a different SCS. When a BWP change is indicated to the UE 2402, the SCS of the transmission is changed as well. Another use case example of BWP is related to power saving. In particular, multiple BWPs can be configured for the UE 2402 with different amount of frequency resources (for example, PRBs) to support data transmission under different traffic loading scenarios. A BWP containing a smaller number of PRBs can be used for data transmission with small traffic load while allowing power saving at the UE 2402 and in some cases at the gNB 2416. A BWP containing a larger number of PRBs can be used for scenarios with higher traffic load.

The RAN 2404 is communicatively coupled to CN 2420 that includes network elements to provide various functions to support data and telecommunications services to customers/subscribers (for example, users of UE 2402). The components of the CN 2420 may be implemented in one physical node or separate physical nodes. In some embodiments, NFV may be utilized to virtualize any or all of the functions provided by the network elements of the CN 2420 onto physical compute/storage resources in servers, switches, etc. A logical instantiation of the CN 2420 may be referred to as a network slice, and a logical instantiation of a portion of the CN 2420 may be referred to as a network sub-slice.

In some embodiments, the CN 2420 may be an LTE CN 2422, which may also be referred to as an EPC. The LTE CN 2422 may include MME 2424, SGW 2426, SGSN 2428, HSS 2430, PGW 2432, and PCRF 2434 coupled with one another over interfaces (or "reference points") as shown. Functions of the elements of the LTE CN 2422 may be briefly introduced as follows.

The MME 2424 may implement mobility management functions to track a current location of the UE 2402 to facilitate paging, bearer activation/deactivation, handovers, gateway selection, authentication, etc.

The SGW 2426 may terminate an S1 interface toward the RAN and route data packets between the RAN and the LTE CN 2422. The SGW 2426 may be a local mobility anchor point for inter-RAN node handovers and also may provide an anchor for inter-3GPP mobility. Other responsibilities may include lawful intercept, charging, and some policy enforcement.

The SGSN 2428 may track a location of the UE 2402 and perform security functions and access control. In addition, the SGSN 2428 may perform inter-EPC node signaling for mobility between different RAT networks; PDN and S-GW selection as specified by MME 2424; MME selection for handovers; etc. The S3 reference point between the MME 2424 and the SGSN 2428 may enable user and bearer information exchange for inter-3GPP access network mobility in idle/active states.

The HSS 2430 may include a database for network users, including subscription-related information to support the network entities' handling of communication sessions. The HSS 2430 can provide support for routing/roaming, authentication, authorization, naming/addressing resolution, location dependencies, etc. An S6a reference point between the HSS 2430 and the MME 2424 may enable transfer of subscription and authentication data for authenticating/authorizing user access to the LTE CN 2420.

The PGW 2432 may terminate an SGi interface toward a data network (DN) 2436 that may include an application/content server 2438. The PGW 2432 may route data packets between the LTE CN 2422 and the data network 2436. The PGW 2432 may be coupled with the SGW 2426 by an S5 reference point to facilitate user plane tunneling and tunnel management. The PGW 2432 may further include a node for policy enforcement and charging data collection (for example, PCEF). Additionally, the SGi reference point between the PGW 2432 and the data network 24 36 may be an operator external public, a private PDN, or an intra-operator packet data network, for example, for provision of IMS services. The PGW 2432 may be coupled with a PCRF 2434 via a Gx reference point.

The PCRF 2434 is the policy and charging control element of the LTE CN 2422. The PCRF 2434 may be communicatively coupled to the app/content server 2438 to determine appropriate QoS and charging parameters for service flows. The PCRF 2432 may provision associated rules into a PCEF (via Gx reference point) with appropriate TFT and QCI.

In some embodiments, the CN 2420 may be a 5GC 2440. The 5GC 2440 may include an AUSF 2442, AMF 2444, SMF 2446, UPF 2448, NSSF 2450, NEF 2452, NRF 2454, PCF 2456, UDM 2458, and AF 2460 coupled with one another over interfaces (or "reference points") as shown. Functions of the elements of the 5GC 2440 may be briefly introduced as follows.

The AUSF 2442 may store data for authentication of UE 2402 and handle authentication-related functionality. The AUSF 2442 may facilitate a common authentication framework for various access types. In addition to communicating with other elements of the 5GC 2440 over reference points as shown, the AUSF 2442 may exhibit an Nausf service-based interface.

The AMF 2444 may allow other functions of the 5GC 2440 to communicate with the UE 2402 and the RAN 2404 and to subscribe to notifications about mobility events with respect to the UE 2402. The AMF 2444 may be responsible for registration management (for example, for registering UE 2402), connection management, reachability management, mobility management, lawful interception of AMF-related events, and access authentication and authorization. The AMF 2444 may provide transport for SM messages between the UE 2402 and the SMF 2446, and act as a transparent proxy for routing SM messages. AMF 2444 may also provide transport for SMS messages between UE 2402 and an SMSF. AMF 2444 may interact with the AUSF 2442 and the UE 2402 to perform various security anchor and context management functions. Furthermore, AMF 2444 may be a termination point of a RAN CP interface, which may include or be an N2 reference point between the RAN 2404 and the AMF 2444; and the AMF 2444 may be a termination point of NAS (N1) signaling, and perform NAS ciphering and integrity protection. AMF 2444 may also support NAS signaling with the UE 2402 over an N3 IWF interface.

The SMF 2446 may be responsible for SM (for example, session establishment, tunnel management between UPF 2448 and AN 2408); UE IP address allocation and management (including optional authorization); selection and control of UP function; configuring traffic steering at UPF 2448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 2444 over N2 to AN 2408; and determining SSC mode of a session. SM may refer to management of a PDU session, and a PDU session or "session" may refer to a PDU connectivity service that provides or enables the exchange of PDUs between the UE 2402 and the data network 2436.

The UPF 2448 may act as an anchor point for intra-RAT and inter-RAT mobility, an external PDU session point of interconnect to data network 2436, and a branching point to support multi-homed PDU session. The UPF 2448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 2448 may include an uplink classifier to support routing traffic flows to a data network.

The NSSF 2450 may select a set of network slice instances serving the UE 2402. The NSSF 2450 may also determine allowed NSSAI and the mapping to the subscribed S-NSSAIs, if needed. The NSSF 2450 may also determine the AMF set to be used to serve the UE 2402, or a list of candidate AMFs based on a suitable configuration and possibly by querying the NRF 2454. The selection of a set of network slice instances for the UE 2402 may be triggered by the AMF 2444 with which the UE 2402 is registered by interacting with the NSSF 2450, which may lead to a change of AMF. The NSSF 2450 may interact with the AMF 2444 via an N22 reference point; and may communicate with another NSSF in a visited network via an N31 reference point (not shown). Additionally, the NSSF 2450 may exhibit an Nnssf service-based interface.

The NEF 2452 may securely expose services and capabilities provided by 3GPP network functions for third party, internal exposure/re-exposure, AFs (e.g., AF 2460), edge computing or fog computing systems, etc. In such embodiments, the NEF 2452 may authenticate, authorize, or throttle the AFs. NEF 2452 may also translate information exchanged with the AF 2460 and information exchanged with internal network functions. For example, the NEF 2452 may translate between an AF-Service-Identifier and an internal 5GC information. NEF 2452 may also receive information from other NFs based on exposed capabilities of other NFs. This information may be stored at the NEF 2452 as structured data, or at a data storage NF using standardized interfaces. The stored information can then be re-exposed by the NEF 2452 to other NFs and AFs, or used for other purposes such as analytics. Additionally, the NEF 2452 may exhibit an Nnef service-based interface.

The NRF 2454 may support service discovery functions, receive NF discovery requests from NF instances, and provide the information of the discovered NF instances to the NF instances. NRF 2454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 2454 may exhibit the Nnrf service-based interface.

The PCF 2456 may provide policy rules to control plane functions to enforce them, and may also support unified policy framework to govern network behavior. The PCF 2456 may also implement a front end to access subscription information relevant for policy decisions in a UDR of the UDM 2458. In addition to communicating with functions over reference points as shown, the PCF 2456 exhibit an Npcf service-based interface.

The UDM 2458 may handle subscription-related information to support the network entities' handling of communication sessions, and may store subscription data of UE 2402. For example, subscription data may be communicated via an N8 reference point between the UDM 2458 and the AMF 2444. The UDM 2458 may include two parts, an application front end and a UDR. The UDR may store subscription data and policy data for the UDM 2458 and the PCF 2456, and/or structured data for exposure and application data (including PFDs for application detection, application request information for multiple UEs 2402) for the NEF 2452. The Nudr service-based interface may be exhibited by the UDR 221 to allow the UDM 2458, PCF 2456, and NEF 2452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 2458 may exhibit the Nudm service-based interface.

The AF 2460 may provide application influence on traffic routing, provide access to NEF, and interact with the policy framework for policy control.

In some embodiments, the 5GC 2440 may enable edge computing by selecting operator/3rd party services to be geographically close to a point that the UE 2402 is attached to the network. This may reduce latency and load on the network. To provide edge-computing implementations, the 5GC 2440 may select a UPF 2448 close to the UE 2402 and execute traffic steering from the UPF 2448 to data network 2436 via the N6 interface. This may be based on the UE subscription data, UE location, and information provided by the AF 2460. In this way, the AF 2460 may influence UPF (re)selection and traffic routing. Based on operator deployment, when AF 2460 is considered to be a trusted entity, the network operator may permit AF 2460 to interact directly with relevant NFs. Additionally, the AF 2460 may exhibit an Naf service-based interface.

The data network 2436 may represent various network operator services, Internet access, or third party services that may be provided by one or more servers including, for example, application/content server 2438.

Figure 25:
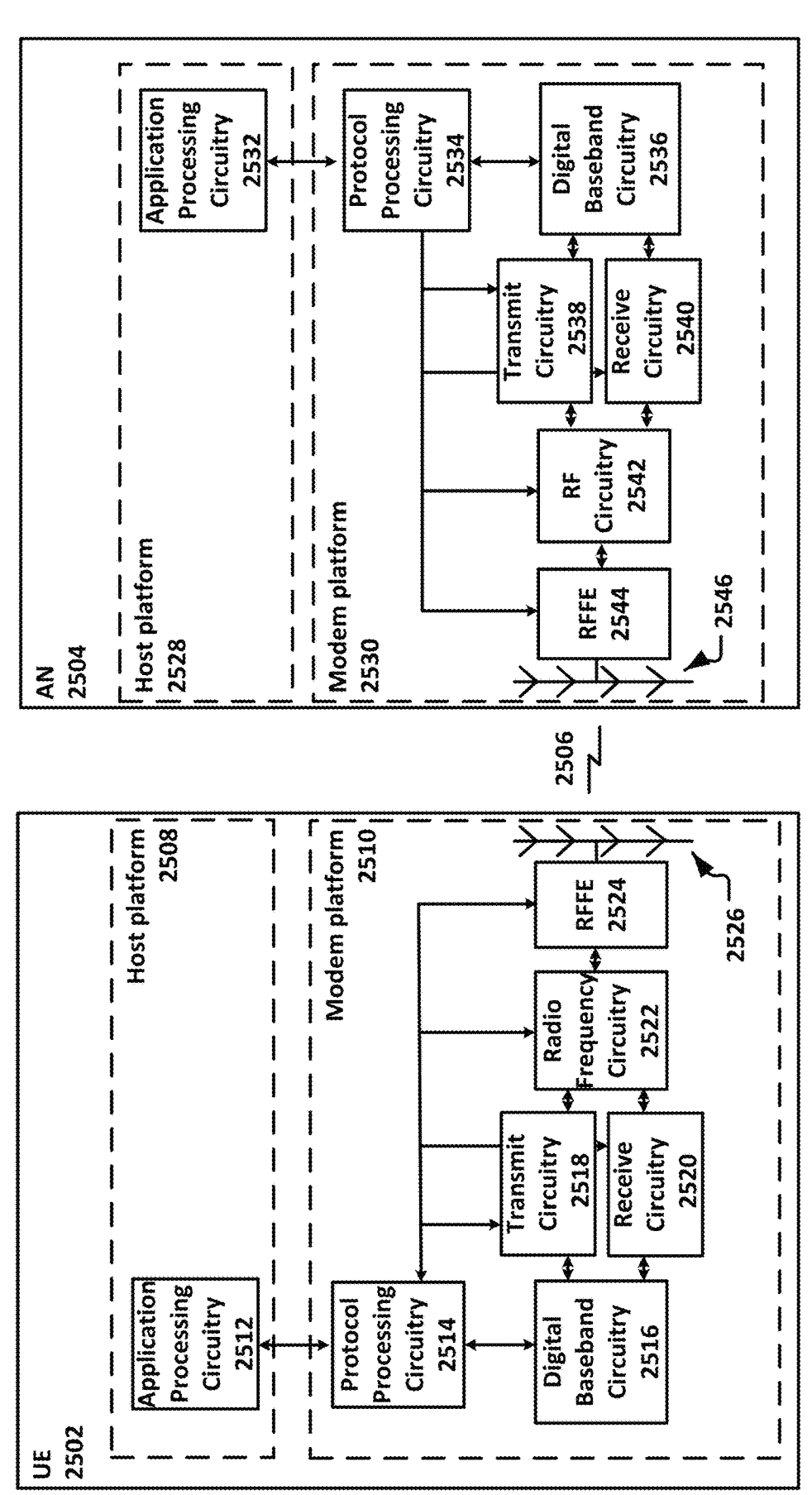
FIG. 25 schematically illustrates components of a wireless network in accordance with various embodiments.

FIG. 25 schematically illustrates a wireless network 2500 in accordance with various embodiments. The wireless network 2500 may include a UE 2502 in wireless communication with an AN 2504. The UE 2502 and AN 2504 may be similar to, and substantially interchangeable with, like-named components described elsewhere herein.

The UE 2502 may be communicatively coupled with the AN 2504 via connection 2506. The connection 2506 is illustrated as an air interface to enable communicative coupling, and can be consistent with cellular communications protocols such as an LTE protocol or a 5G NR protocol operating at mmWave or sub-6 GHz frequencies.

The UE 2502 may include a host platform 2508 coupled with a modem platform 2510. The host platform 2508 may include application processing circuitry 2512, which may be coupled with protocol processing circuitry 2514 of the modem platform 2510. The application processing circuitry 2512 may run various applications for the UE 2502 that source/sink application data. The application processing circuitry 2512 may further implement one or more layer operations to transmit/receive application data to/from a data network. These layer operations may include transport (for example UDP) and Internet (for example, IP) operations The protocol processing circuitry 2514 may implement one or more of layer operations to facilitate transmission or reception of data over the connection 2506. The layer operations implemented by the protocol processing circuitry 2514 may include, for example, MAC, RLC, PDCP, RRC and NAS operations.

The modem platform 2510 may further include digital baseband circuitry 2516 that may implement one or more layer operations that are "below" layer operations performed by the protocol processing circuitry 2514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 2510 may further include transmit circuitry 2518, receive circuitry 2520, RF circuitry 2522, and RF front end (RFFE) 2524, which may include or connect to one or more antenna panels 2526. Briefly, the transmit circuitry 2518 may include a digital-to-analog converter, mixer, intermediate frequency (IF) components, etc.; the receive circuitry 2520 may include an analog-to-digital converter, mixer, IF components, etc.; the RF circuitry 2522 may include a low-noise amplifier, a power amplifier, power tracking components, etc.; RFFE 2524 may include filters (for example, surface/bulk acoustic wave filters), switches, antenna tuners, beamforming components (for example, phase-array antenna components), etc. The selection and arrangement of the components of the transmit circuitry 2518, receive circuitry 2520, RF circuitry 2522, RFFE 2524, and antenna panels 2526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 2514 may include one or more instances of control circuitry (not shown) to provide control functions for the transmit/receive components.

A UE reception may be established by and via the antenna panels 2526, RFFE 2524, RF circuitry 2522, receive circuitry 2520, digital baseband circuitry 2516, and protocol processing circuitry 2514. In some embodiments, the antenna panels 2526 may receive a transmission from the AN 2504 by receive-beamforming signals received by a plurality of antennas/antenna elements of the one or more antenna panels 2526.

A UE transmission may be established by and via the protocol processing circuitry 2514, digital baseband circuitry 2516, transmit circuitry 2518, RF circuitry 2522, RFFE 2524, and antenna panels 2526. In some embodiments, the transmit components of the UE 2504 may apply a spatial filter to the data to be transmitted to form a transmit beam emitted by the antenna elements of the antenna panels 2526.

Similar to the UE 2502, the AN 2504 may include a host platform 2528 coupled with a modem platform 2530. The host platform 2528 may include application processing circuitry 2532 coupled with protocol processing circuitry 2534 of the modem platform 2530. The modem platform may further include digital baseband circuitry 2536, transmit circuitry 2538, receive circuitry 2540, RF circuitry 2542, RFFE circuitry 2544, and antenna panels 2546. The components of the AN 2504 may be similar to and substantially interchangeable with like-named components of the UE 2502. In addition to performing data transmission/reception as described above, the components of the AN 2508 may perform various logical functions that include, for example, RNC functions such as radio bearer management, uplink and downlink dynamic radio resource management, and data packet scheduling.

Figure 26:
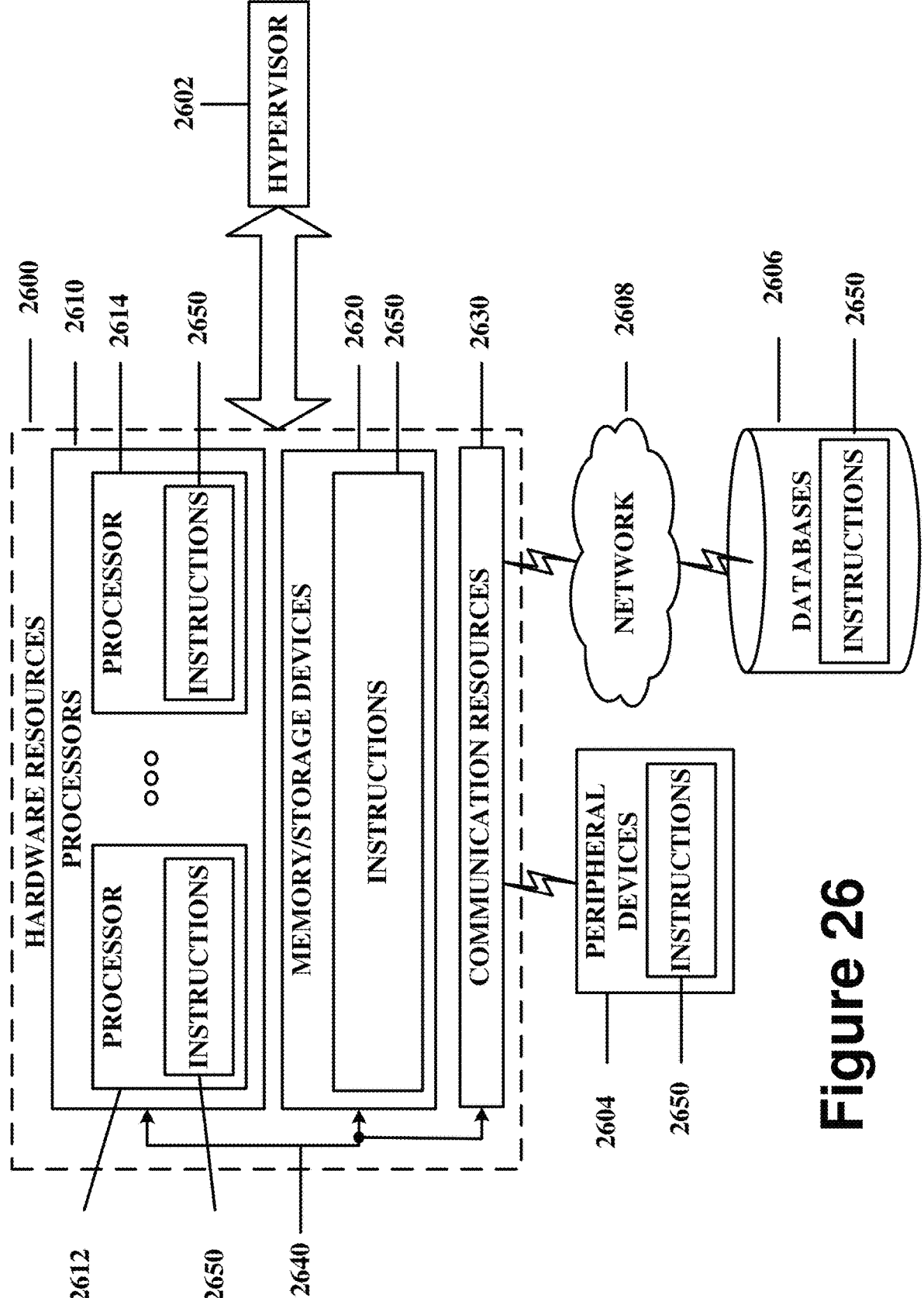
FIG. 26 is a block diagram illustrating components, according to some example embodiments, able to read instructions from a machine-readable or computer-readable medium (e.g., a non-transitory machine-readable storage medium) and perform any one or more of the methodologies discussed herein.

FIG. 26 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 26 shows a diagrammatic representation of hardware resources 2600 including one or more processors (or processor cores) 2610, one or more memory/storage devices 2620, and one or more communication resources 2630, each of which may be communicatively coupled via a bus 2640 or other interface circuitry. For embodiments where node virtualization (e.g., NFV) is utilized, a hypervisor 2602 may be executed to provide an execution environment for one or more network slices/sub-slices to utilize the hardware resources 2600.

The processors 2610 may include, for example, a processor 2612 and a processor 2614. The processors 2610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2620 may include main memory, disk storage, or any suitable combination thereof. The memory/storage devices 2620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2630 may include interconnection or network interface controllers, components, or other suitable devices to communicate with one or more peripheral devices 2604 or one or more databases 2606 or other network elements via a network 2608. For example, the communication resources 2630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 2650 may comprise software, a program, an application, an applet, an app, or other executable code for causing at least any of the processors 2610 to perform any one or more of the methodologies discussed herein. The instructions 2650 may reside, completely or partially, within at least one of the processors 2610 (e.g., within the processor's cache memory), the memory/storage devices 2620, or any suitable combination thereof. Furthermore, any portion of the instructions 2650 may be transferred to the hardware resources 2600 from any combination of the peripheral devices 2604 or the databases 2606. Accordingly, the memory of processors 2610, the memory/storage devices 2620, the peripheral devices 2604, and the databases 2606 are examples of computer-readable and machine-readable media.

Figure 27:
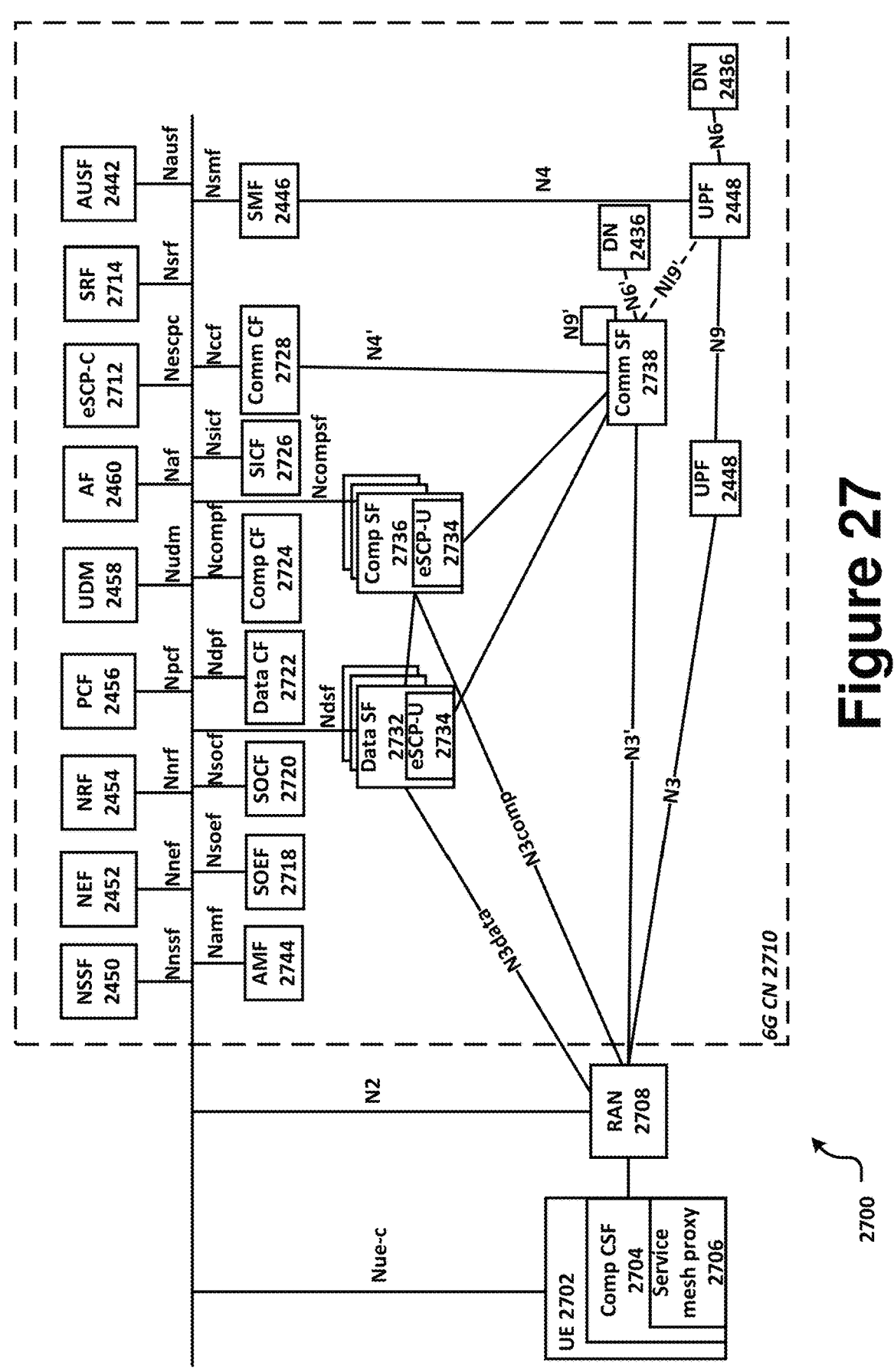
FIG. 27 illustrates a network in accordance with various embodiments.

FIG. 27 illustrates a network 2700 in accordance with various embodiments. The network 2700 may operate in a matter consistent with 3GPP technical specifications or technical reports for 6G systems. In some embodiments, the network 2700 may operate concurrently with network 2400. For example, in some embodiments, the network 2700 may share one or more frequency or bandwidth resources with network 2400. As one specific example, a UE (e.g., UE 2702) may be configured to operate in both network 2700 and network 2400. Such configuration may be based on a UE including circuitry configured for communication with frequency and bandwidth resources of both networks 2400 and 2700. In general, several elements of network 2700 may share one or more characteristics with elements of network 2400. For the sake of brevity and clarity, such elements may not be repeated in the description of network 2700.

The network 2700 may include a UE 2702, which may include any mobile or non-mobile computing device designed to communicate with a RAN 2708 via an over-the-air connection. The UE 2702 may be similar to, for example, UE 2402. The UE 2702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 27, in some embodiments the network 2700 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 27, the UE 2702 may be communicatively coupled with an AP such as AP 2406 as described with respect to FIG. 24. Additionally, although not specifically shown in FIG. 27, in some embodiments the RAN 2708 may include one or more ANss such as AN 2408 as described with respect to FIG. 24. The RAN 2708 and/or the AN of the RAN 2708 may be referred to as a base station (BS), a RAN node, or using some other term or name.

The UE 2702 and the RAN 2708 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 2708 may allow for communication between the UE 2702 and a 6G core network (CN) 2710. Specifically, the RAN 2708 may facilitate the transmission and reception of data between the UE 2702 and the 6G CN 2710. The 6G CN 2710 may include various functions such as NSSF 2450, NEF 2452, NRF 2454, PCF 2456, UDM 2458, AF 2460, SMF 2446, and AUSF 2442. The 6G CN 2710 may additional include UPF 2448 and DN 2436 as shown in FIG. 27.

Additionally, the RAN 2708 may include various additional functions that are in addition to, or alternative to, functions of a legacy cellular network such as a 4G or 5G network. Two such functions may include a Compute Control Function (Comp CF) 2724 and a Compute Service Function (Comp SF) 2736. The Comp CF 2724 and the Comp SF 2736 may be parts or functions of the Computing Service Plane. Comp CF 2724 may be a control plane function that provides functionalities such as management of the Comp SF 2736, computing task context generation and management (e.g., create, read, modify, delete), interaction with the underlaying computing infrastructure for computing resource management, etc. Comp SF 2736 may be a user plane function that serves as the gateway to interface computing service users (such as UE 2702) and computing nodes behind a Comp SF instance. Some functionalities of the Comp SF 2736 may include: parse computing service data received from users to compute tasks executable by computing nodes; hold service mesh ingress gateway or service API gateway; service and charging policies enforcement;

performance monitoring and telemetry collection, etc. In some embodiments, a Comp SF 2736 instance may serve as the user plane gateway for a cluster of computing nodes. A Comp CF 2724 instance may control one or more Comp SF 2736 instances.

Two other such functions may include a Communication Control Function (Comm CF) 2728 and a Communication Service Function (Comm SF) 2738, which may be parts of the Communication Service Plane. The Comm CF 2728 may be the control plane function for managing the Comm SF 2738, communication sessions creation/configuration/releasing, and managing communication session context. The Comm SF 2738 may be a user plane function for data transport. Comm CF 2728 and Comm SF 2738 may be considered as upgrades of SMF 2446 and UPF 2448, which were described with respect to a 5G system in FIG. 24. The upgrades provided by the Comm CF 2728 and the Comm SF 2738 may enable service-aware transport. For legacy (e.g., 4G or 5G) data transport, SMF 2446 and UPF 2448 may still be used.

Two other such functions may include a Data Control Function (Data CF) 2722 and Data Service Function (Data SF) 2732 may be parts of the Data Service Plane. Data CF 2722 may be a control plane function and provides functionalities such as Data SF 2732 management, Data service creation/configuration/releasing, Data service context management, etc. Data SF 2732 may be a user plane function and serve as the gateway between data service users (such as UE 2702 and the various functions of the 6G CN 2710) and data service endpoints behind the gateway. Specific functionalities may include: parse data service user data and forward to corresponding data service endpoints, generate charging data, report data service status.

Another such function may be the Service Orchestration and Chaining Function (SOCF) 2720, which may discover, orchestrate and chain up communication/computing/data services provided by functions in the network. Upon receiving service requests from users, SOCF 2720 may interact with one or more of Comp CF 2724, Comm CF 2728, and Data CF 2722 to identify Comp SF 2736, Comm SF 2738, and Data SF 2732 instances, configure service resources, and generate the service chain, which could contain multiple Comp SF 2736, Comm SF 2738, and Data SF 2732 instances and their associated computing endpoints. Workload processing and data movement may then be conducted within the generated service chain. The SOCF 2720 may also responsible for maintaining, updating, and releasing a created service chain.

Another such function may be the service registration function (SRF) 2714, which may act as a registry for system services provided in the user plane such as services provided by service endpoints behind Comp SF 2736 and Data SF 2732 gateways and services provided by the UE 2702. The SRF 2714 may be considered a counterpart of NRF 2454, which may act as the registry for network functions.

Other such functions may include an evolved service communication proxy (eSCP) and service infrastructure control function (SICF) 2726, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 2712 and eSCP-U 2734, for control plane service communication proxy and user plane service communication proxy, respectively. The SICF 2726 may control and configure eCSP instances in terms of service traffic routing policies, access rules, load balancing configurations, performance monitoring, etc.

Another such function is the AMF 2744. The AMF 2744 may be similar to 2444, but with additional functionality. Specifically, the AMF 2744 may include potential functional repartition, such as move the message forwarding functionality from the AMF 2744 to the RAN 2708.

Another such function is the service orchestration exposure function (SOEF) 2718. The SOEF may be configured to expose service orchestration and chaining services to external users such as applications.

The UE 2702 may include an additional function that is referred to as a computing client service function (comp CSF) 2704. The comp CSF 2704 may have both the control plane functionalities and user plane functionalities, and may interact with corresponding network side functions such as SOCF 2720, Comp CF 2724, Comp SF 2736, Data CF 2722, and/or Data SF 2732 for service discovery, request/response, compute task workload exchange, etc. The Comp CSF 2704 may also work with network side functions to decide on whether a computing task should be run on the UE 2702, the RAN 2708, and/or an element of the 6G CN 2710.

The UE 2702 and/or the Comp CSF 2704 may include a service mesh proxy 2706. The service mesh proxy 2706 may act as a proxy for service-to-service communication in the user plane. Capabilities of the service mesh proxy 2706 may include one or more of addressing, security, load balancing, etc.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Procedures

In some embodiments, the electronic device(s), network (s), system(s), chip(s) or component(s), or portions or implementations thereof, of FIGS. 24-27, or some other figure herein, may be configured to perform one or more processes, techniques, or methods as described herein, or portions thereof. One such process is depicted in FIG. 28. The process of FIG. 28 may be performed by an electronic device, and may include identifying, at 2801, a PDCP packet data convergence protocol (PDCP) data that is to be transmitted to a remote electronic device; transmitting, at 2802 via a first Uu path, the PDCP data to the remote electronic device; and transmitting, at 2803, the PDCP data to a relay UE via a first communication path, wherein the relay UE is to transmit the PDCP data or an indication of the PDCP data to the remote electronic device via a second communication path.

Another such process may be depicted at FIG. 29. The process of FIG. 29 may be performed by a first user equipment (UE), one or more elements of a UE, and/or an electronic device that includes and/or implements a UE. The process may include identifying, at 2901, a PDCP packet data convergence protocol (PDCP) data that is received from a first electronic device via a first communication path; and transmitting, at 2902 the PDCP data to a second electronic device via a second communication path. In some embodiments, the data is transmitted from the first electronic device to the second electronic device via a first Uu path.

Another such process is depicted in FIG. 30. The process of FIG. 30 may relate to a method to be performed by a user equipment (UE), one or more elements of a UE, and/or an electronic device that includes or implements one or more elements of a UE. The process may include identifying, at 3001, relay information received from a remote UE; and transmitting, at 3002, an indication of the relay information to a gNodeB (gNB).

Another such process is depicted in FIG. 31. The process of FIG. 31 may relate to a method to be performed by a user equipment (UE), one or more elements of a UE, and/or an electronic device that includes or implements one or more elements of a UE. The process may include transmitting, at 3101 via a first communication path, relay information to a relay UE that is to send an indication of the relay information to a gNodeB (gNB) via a second communication path; and transmitting, at 3102 via a third communication path, data to the gNB at least partially concurrently with the transmission of the relay information.

Another such process is depicted in FIG. 32. The process of FIG. 32 may relate to a method to be performed by a gNodeB (gNB), one or more elements of a gNB, and/or an electronic device that implements or includes one or more elements of a gNB. The process may include identifying, at 3201 from a first communication path from a relay UE, a received indication of relay information received by the relay UE from a remote UE via a second communication path; and identifying, at 3202 from a third communication path from the remote UE, received data.

Another such process is depicted in FIG. 33. The process of FIG. 33 may include or relate to a method to be performed by a user equipment (UE), one or more elements of a UE, and/or one or more electronic devices that include and/or implement a UE. The process may include identifying, at 3301 from a gNodeB (gNB) of a serving cell to which the UE and one or more relay UEs belong, a medium access control (MAC) control element (CE); and identifying, at 3302 based on the MAC CE, that the UE is to communicate with the gNB via multipath communication. In embodiments, multipath communication may include communication via: a direct path that includes a communication link between the UE and the gNB; and an indirect path that includes a communication link between the UE and the one or more relay UEs, and a communication link between the one or more relay UEs and the gNB.

Another such process is depicted in FIG. 34. The process of FIG. 34 may include or relate to a method to be performed by a gNodeB (gNB), one or more elements of a gNB, and/or one or more electronic devices that include and/or implement a gNB. The process may include generating, at 3401, a medium access control (MAC) control element (CE) that includes an indication that a remote UE of a serving cell to which the gNB and one or more relay UEs belong is to communicate with the gNB via multipath communication; and transmitting, at 3402, the MAC CE to the remote UE. In some embodiments, the multipath communication may include communication via: a direct path that includes a communication link between the remote UE and the gNB; and an indirect path that includes a communication link between the remote UE and the one or more relay UEs, and a communication link between the one or more relay UEs and the gNB.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1A may include a method that allows at least two paths of communication between a UE and the network wherein one path is indirect via a forwarding/aggregating/relay UE, to relay information (control and user plane) from the Remote UE to/from the network and another path is direct via Uu link wherein the Remote UE and Forwarding UE belong to the same gNB but could be on the same or different cell.

Example 2A may include the method of example 1A or some other example herein, wherein Remote UE or the Aggregate UE may inform the gNB of the ideal indirect path already established or the Remote UE provides a list of potential available/candidate Aggregating UEs and gNB selects from the list.

Example 3A may include the method of example 2A or some other example herein, wherein the Remote UE or the Aggregate UE provides information about the indirect path including at least an ID and the serving cell ID for the Aggregate/forwarding UE and the gNB configures the addition of the indirect path by providing mapping information for mapping Remote UE's Uu Radio bearer onto Uu RLC channel at the Aggregate/forwarding UE along with the Remote UE ID information.

Example 4A may include the method of example 2A or some other example herein, wherein the gNB further provides a local ID for the aggregate UE when selecting from the list of candidate aggregate UEs.

Example 5A may include the method of example 4A or some other example herein, wherein the gNB configures the Remote UE with the mapping of its Uu RB to Aggregate UE's egress Uu RLC channel so that the Remote UE can provide to the Aggregate UE by implementation if necessary.

Example 6A may include the method of example 1A or some other example herein, wherein the release of indirect path (and corresponding disabling on multipath and duplication if any configured) is initiated by the gNB and carried out by the Remote UE upon Aggregate UE HO or RRC failure or RLF based on the information available at gNB or provided by the Remote UE or the failure of reception of Relay UE's periodic update.

Example 7A may include the system and method that allows duplication of data over a direct Uu link and an indirect link via an ideal UE-UE connection.

Example 8A may include the method of example 7A or some other example herein, where duplication is triggered by the network via RRC configuration for data which requires high reliability.

Example 9A may include the method of example 7A or some other example herein, where duplication is autonomously triggered by the remote UE based on a preconfigured threshold for channel condition over direct Uu link.

Example 10A may include the method of example 7A or some other example herein, where duplication is autonomously triggered by the remote UE in the event of receiving a retransmission grant or negative acknowledgement from the network.

Example 11A may include the method of example 1A or some other example herein, where an SRAP layer is used to perform radio bearer mapping from the non-standardized L2 layer to egress Uu RLC channels for the Forwarding UEs Uu interface.

Example 12A may include the method of example 1A or some other example herein, where a singular RB is mapped to a unique egress Uu RLC entity/channel/bearer at the forwarding UE.

Example 13A may include the method of example 1A or some other example herein, where mapping information between remote UE's RB (Radio bearer ID) and egress Uu RLC entity (logical channel ID) to both remote UE and forwarding UE is provided by the gNB.

Example 14A may include the method of example 13A or some other example herein, where the SRAP layer between the forwarding UE and the gNB is bypassed or omitted due to mapping function being specified in Uu RLC layer at forwarding UE side.

Example 15A may include the method of example 7A and example 11A or some other example herein, where a non-standardized ideal UE-UE link transparently forwards the duplicated PDCP PDU to the Uu SRAP layer at the forwarding UE.

Example 16A may include the method of examples 7A and 14A or some other example herein, where a non-standardized ideal UE-UE link transparently forwards the duplicated PDCP PDU to the Uu RLC channel at the forwarding UE.

Example 17A may include the method of example 7A or some other example herein, where new RRC configuration is defined to support UE aggregation via non-standardized UE-UE connection and Uu connection.

Example 18A may include the method of example 7A or some other example herein, where duplication activation MAC CE is transmitted transparently and encapsulated as a non-standardized layer 2 data packet for the system in example 1A.

Example 19A may include a method of a next generation Node B (gNB), the method comprising:
establishing a direct path of communication with a first user equipment (UE);
establishing an indirect path of communication with the first UE via a second UE; and
communicating with the first UE via the direct path and the indirect path.

Example 20A may include the method of example 19A or some other example herein, further comprising receiving assistance information associated with the indirect path from the first and/or second UE.

Example 1B relates to a system and/or method to allow for PDCP duplication over Uu and PC5 paths for reliable communication.

Example 2B includes the subject matter of example 1B, and/or some other example herein, wherein the Remote UE can submit the same PDCP data PDU to each activated RLC entity for the radio bearer.

Example 3B includes the subject matter of example 2B, and/or some other example herein, wherein one PC5 RLC entity and at least one Uu RLC entity are connected to the same Uu PDCP entity at the remote UE to support PDCP duplication per radio bearer.

Example 4B relates to a system and/or method where PDCP duplication can be activated for uplink traffic based on (i) channel condition, (ii) reliability requirement, (iii) negative acknowledgement from the gNB, or a combination of (i), (ii) and/or (iii).

Example 5B relates to the subject matter of any of examples 1B-4B, and/or some other example herein, wherein a remote UE maintains a complete Uu stack, with the Uu RLC, Uu MAC and Uu PHY terminating between the Remote UE and the gNB, and a partial PC5 stack with the PC5 RLC, PC5 MAC and PC5 PHY terminating between the Remote UE and the Relay UE.

Example 6B includes the subject matter of any of examples 1B-5B, and/or some other example herein, wherein a reordering timer is configured by upper layers, for the receiving entity of duplicated data.

Example 7B relates to the subject matter of any of examples 1B-6B, and/or some other example herein, wherein carrier duplication is supported for the Uu link between the Remote UE and the gNB, but not for the PC5 link between the Remote UE and the Relay UE.

Example 8B includes the subject matter of any of examples 1B-7B, and/or some other example herein, wherein duplication can be activated/deactivated by MAC CE from the gNB received directly by Remote UE, or forwarded by Relay UE to the Remote UE.

Example 9B includes a method to be performed by an electronic device, wherein the method comprises:
  identifying a PDCP packet data convergence protocol (PDCP) data that is to be transmitted to a remote electronic device;
  transmitting, via a first Uu path, the PDCP data to the remote electronic device; and
  transmitting the PDCP data to a relay UE via a first communication path, wherein the relay UE is to transmit the PDCP data or an indication of the PDCP data to the remote electronic device via a second communication path.

Example 10B includes the method of example 9B, and/or some other example herein, wherein:
  the electronic device is a UE, one or more elements of a UE, and/or an electronic device that includes or implements one or more elements of a UE;
  the remote electronic device is a gNodeB (gNB), one or more elements of a gNB, and/or an electronic device that includes or implements one or more elements of a gNB;
  the first communication path is a PC5 path; and
  the second communication path is a second Uu path.

Example 11B includes the method of example 9B, and/or some other example herein, wherein:
  the electronic device is a gNodeB (gNB), one or more elements of a gNB, and/or an electronic device that includes or implements one or more elements of a gNB;
  the remote electronic device is a UE, one or more elements of a UE, and/or an electronic device that includes or implements one or more elements of a UE;
  the first communication path is a second Uu path; and
  the second communication path is a PC5 path.

Example 12B includes the method of any of examples 9B-11B, and/or some other example herein, wherein the PDCP data is PDCP data related to a radio link control (RLC) entity.

Example 13B includes the method of any of examples 9B-12B, and/or some other example herein, wherein the PDCP data is transmitted along the first Uu path and the first communication path based on one or more of (i) channel condition, (ii) reliability requirement, (iii) negative acknowledgement from the gNB.

Example 14B includes the method of any of examples 9B-13B, and/or some other example herein, wherein the PDCP data is a protocol data unit (PDU).

Example 14.5B includes the method of any of examples 9B-14B, and/or some other example herein, wherein transmission along the first Uu path and transmission along the first communication path occur at least partially concurrently.

Example 15B includes a method to be performed by a user equipment (UE), one or more elements of a UE, and/or an electronic device that includes and/or implements a UE, wherein the method comprises:
  identifying, a PDCP packet data convergence protocol (PDCP) data that is received from a first electronic device via a first communication path; and
  transmitting the PDCP data to a second electronic device via a second communication path;
  wherein the data is transmitted from the first electronic device to the second electronic device via a first Uu path.

Example 16B includes the method of example 15B, and/or some other example herein, wherein:
  the first electronic device is a UE, one or more elements of a UE, and/or an electronic device that includes or implements one or more elements of a UE;
  the second electronic device is a gNodeB (gNB), one or more elements of a gNB, and/or an electronic device that includes or implements one or more elements of a gNB;
  the first communication path is a PC5 path; and
  the second communication path is a second Uu path.

Example 17B includes the method of example 15B, and/or some other example herein, wherein:
  the first electronic device is a gNodeB (gNB), one or more elements of a gNB, and/or an electronic device that includes or implements one or more elements of a gNB;
  the second electronic device is a UE, one or more elements of a UE, and/or an electronic device that includes or implements one or more elements of a UE;
  the first communication path is a second Uu path; and
  the second communication path is a PC5 path.

Example 18B includes the method of any of examples 15B-17B, and/or some other example herein, wherein the PDCP data is PDCP data related to a radio link control (RLC) entity.

Example 19B includes the method of any of examples 15B-18B, and/or some other example herein, wherein the PDCP data is transmitted along the first Uu path and the first communication path based on one or more of (i) channel condition, (ii) reliability requirement, (iii) negative acknowledgement from the gNB.

Example 20B includes the method of any of examples 15B-19B, and/or some other example herein, wherein the PDCP data is a protocol data unit (PDU).

Example 21B includes the method of any of examples 15B-20B, and/or some other example herein, wherein transmission along the first Uu path and transmission along the first communication path occur at least partially concurrently in time.

Example 1C includes a system and method that allows unicast communication between two peer UEs wherein one UE can act as a relay UE to relay information (control and user plane) from the Remote UE to/from the network (relay path) and wherein the Remote UE and Relay UE belong to the same cell.

Example 2C includes the method of example 1C, and/or some other example herein, wherein the Remote UE is configured to support multipath (ability to use direct path and relay path simultaneously) relaying using dedicated signalling by the gNB (applicable to all the bearers or all the DRB s).

Example 3C includes the method of example 1C or 2C, and/or some other example herein, wherein the gNB uses MAC CE or L1 signalling to dynamically activate/deactivate multipath relaying.

Example 4C includes the method of example 2C, and/or some other example herein, wherein the Remote UE performs RLM even after being connected to the network via a direct or indirect path.

Example 5C includes the method of example 2C, and/or some other example herein, wherein the gNB further configures the Remote UE on a per-bearer basis using dedicated signalling to use the best path or use dynamic switching between paths or use only direct path or only indirect path or duplicate on both paths.

Example 6C includes the method of example 2C, and/or some other example herein, wherein the gNB configuration includes PC5 RLC/LCH and Uu RLC/LCH configuration to support both direct and indirect paths.

Example 7C includes the method of example 1C, and/or some other example herein, wherein the Remote UE uses channel conditions and configured thresholds to select the best path between the direct and relay path to send packets Example 8C includes the method of example 1C, and/or some other example herein, wherein the Remote UE uses metrics such as its buffer status, Relay UE's load information if available and Relay UE's Uu link quality if available to determine the best path between the direct and relay paths to send packets.

Example 9C includes the method of example 4C, and/or some other example herein, wherein the gNB decides and selects the Relay UE for the second path and configures the Remote UE based on measurement report received from the remote UE.

Example 10C includes the method of example 4C, and/or some other example herein, wherein the Remote UE performs synchronization to the gNB once it receives configuration for the direct path upon sending measurement report of the serving cell.

Example 11C includes a method to be performed by a user equipment (UE), one or more elements of a UE, and/or an electronic device that includes or implements one or more elements of a UE, wherein the method comprises:

identifying relay information received from a remote UE; and transmitting an indication of the relay information to a gNodeB (gNB).

Example 12C includes the method of example 11C, and/or some other example herein, wherein the relay information relates to sidelink (SL) operation.

Example 13C includes the method of any of examples 11C-12C, and/or some other example herein, wherein the UE and the remote UE are in a same cell of a cellular network.

Example 14C includes the method of any of examples 11C-13C, and/or some other example herein, wherein the relay information includes control information and user plane information.

Example 15C includes the method of any of examples 11C-14C, and/or some other example herein, wherein the relay information is received and/or transmitted in a layer 2 (L2) transmission.

Example 16C includes the method of any of examples 11C-15C, and/or some other example herein, wherein the relay information is received over a PC5 path.

Example 17C includes the method of any of examples 11C-16C, and/or some other example herein, wherein the indication of the relay information is transmitted over a first Uu path.

Example 18C includes the method of any of examples 11C-17C, and/or some other example herein, wherein the remote UE is further communicatively coupled with the gNB by a second Uu path and configured to directly send control and/or user plane information to the gNB over the second Uu path at least partially concurrently with transmission of the relay information to the UE.

Example 19C includes a method to be performed by a user equipment (UE), one or more elements of a UE, and/or an electronic device that includes or implements one or more elements of a UE, wherein the method comprises:

transmitting, via a first communication path, relay information to a relay UE that is to send an indication of the relay information to a gNodeB (gNB) via a second communication path; and transmitting, via a third communication path, data to the gNB at least partially concurrently with the transmission of the relay information.

Example 20C includes the method of example 19C, and/or some other example herein, wherein the UE and the relay UE are in a same cell of a cellular network.

Example 21C includes the method of any of examples 19C-20C, and/or some other example herein, wherein the relay information includes user and/or control plane data.

Example 22C includes the method of any of examples 19C-21C, and/or some other example herein, wherein the data transmitted via the third communication path includes user and/or control plane data.

Example 23C includes the method of any of examples 19C-22C, and/or some other example herein, wherein the first communication path is a PC5 path.

Example 24C includes the method of any of examples 19C-23C, and/or some other example herein, wherein the second communication path is a Uu path.

Example 25C includes the method of any of examples 19C-24C, and/or some other example herein, wherein the third communication path is a Uu path.

Example 26C includes the method of any of examples 19C-25C, and/or some other example herein, wherein the transmission of the relay information is related to sidelink operation.

Example 27C includes a method to be performed by a gNodeB (gNB), one or more elements of a gNB, and/or an electronic device that implements or includes one or more elements of a gNB, wherein the method comprises:

identifying, from a first communication path from a relay UE, a received indication of relay information received by the relay UE from a remote UE via a second communication path; and identifying, from a third communication path from the remote UE, received data.

Example 28C includes the method of example 27C, and/or some other example herein, wherein the relay information includes user and control plane data.

Example 29C includes the method of any of examples 27C-28C, and/or some other example herein, wherein the data received from the third communication path was transmitted at least partially concurrently with transmission of the relay information via the second communication path.

Example 30C includes the method of any of examples 27C-29C, and/or some other example herein, wherein the data includes user and control plane data.

Example 31C includes the method of any of examples 27C-30C, and/or some other example herein, wherein the first communication path is a Uu path.

Example 32C includes the method of any of examples 27C-31C, and/or some other example herein, wherein the second communication path is a PC5 path.

Example 33C includes the method of any of examples 27C-32C, and/or some other example herein, wherein the third communication path is a Uu path.

Example 34C includes the method of any of examples 27C-33C, and/or some other example herein, wherein the first, second, or third communication paths relate to sidelink operation.

Example 1D includes a method to be performed by a user equipment (UE), one or more elements of a UE, and/or one or more electronic devices that include and/or implement a UE, wherein the method comprises: identifying, from a gNodeB gNB of a serving cell to which the UE and one or more relay UEs belong, a medium access control (MAC) control element (CE); and identifying, based on the MAC CE, that the UE is to communicate with the gNB via multipath communication, wherein multipath communication includes communication via: a direct path that includes a communication link between the UE and the gNB; and an indirect path that includes a communication link between the UE and the one or more relay UEs, and a communication link between the one or more relay UEs and the gNB.

Example 2D includes the method of example 1D, and/or some other example herein wherein, during multipath communication, communication between the UE and the gNB via the direct path occurs generally concurrently with communication between the UE and the gNB via the indirect path.

Example 3D includes the method of any of examples 1D-2D, and/or some other example herein, wherein the communication link between the UE and the gNB is a Uu link.

Example 4D includes the method of any of examples 1D-3D, and/or some other example herein, wherein the communication link between the UE and the one or more relay UEs is a PC5 link, and the communication link between the one or more relay UEs and the gNB is a Uu link.

Example 5D includes the method of any of examples 1D-4D, and/or some other example herein, wherein the UE receives the MAC CE via the direct path or the indirect path.

Example 6D includes the method of any of examples 1D-5D, and/or some other example herein, wherein prior to the multipath communication, the UE is to: perform, based on the MAC CE, measurement of a link of the direct path or the indirect path; and report, to the gNB prior to performance of the multipath communication, a result of the measurement.

Example 7D includes the method of any of examples 1D-6D, and/or some other example herein, wherein the MAC CE is a first MAC CE, and wherein the method further comprises: identifying, from the gNB, a second MAC CE; and deactivating, based on the MAC CE, the multipath communication.

Example 8D includes a method to be performed by a gNodeB (gNB), one or more elements of a gNB, and/or one or more electronic devices that include and/or implement a gNB, wherein the method comprises: generating a medium access control (MAC) control element (CE) that includes an indication that a remote UE of a serving cell to which the gNB and one or more relay UEs belong is to communicate with the gNB via multipath communication; and transmitting the MAC CE to the remote UE; wherein multipath communication includes communication via: a direct path that includes a communication link between the remote UE and the gNB; and an indirect path that includes a communication link between the remote UE and the one or more relay UEs, and a communication link between the one or more relay UEs and the gNB.

Example 9D includes the method of example 8D, and/or some other example herein, wherein, during multipath communication, communication via the direct path occurs generally concurrently with communication via the indirect path.

Example 10D includes the method of any of examples 8D-9D, and/or some other example herein, wherein the communication link between the remote UE and the gNB is a Uu link.

Example 11D includes the method of any of examples 8D-10D, and/or some other example herein, wherein the communication link between the remote UE and the one or more relay UEs is a PC5 link, and the communication link between the one or more relay UEs and the gNB is a Uu link.

Example 12D includes the method of any of examples 8D-11D, and/or some other example herein, wherein the gNB is to transmit the MAC CE via the direct path or the indirect path.

Example 13D includes the method of any of examples 8D-12D, and/or some other example herein, wherein prior to the multipath communication, the remote UE is to: perform, based on the MAC CE, measurement of a link of the direct path or the indirect path; and report, to the gNB prior to performance of the multipath communication, a result of the measurement.

Example 14D includes the method of any of examples 8D-13D, and/or some other example herein, wherein the MAC CE is a first MAC CE, and wherein the method further comprises transmitting, from the gNB to the remote UE, a second MAC CE that includes an indication that the remote UE is to deactivate the multipath communication.

Example Z01 may include an apparatus comprising means to perform one or more elements of a method described in or related to any of examples 1A-14D, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1A-14D, or any other method or process described herein.

Example Z03 may include an apparatus comprising logic, modules, or circuitry to perform one or more elements of a method described in or related to any of examples 1A-14D, or any other method or process described herein.

Example Z04 may include a method, technique, or process as described in or related to any of examples 1A-14D, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1A-14D, or portions thereof.

Example Z06 may include a signal as described in or related to any of examples 1A-14D, or portions or parts thereof.

Example Z07 may include a datagram, packet, frame, segment, protocol data unit (PDU), or message as described in or related to any of examples 1A-14D, or portions or parts thereof, or otherwise described in the present disclosure.

Example Z08 may include a signal encoded with data as described in or related to any of examples 1A-14D, or portions or parts thereof, or otherwise described in the present disclosure.

Example Z09 may include a signal encoded with a datagram, packet, frame, segment, protocol data unit (PDU), or message as described in or related to any of examples 1A-14D, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1A-14D, or portions thereof.

Example Z11 may include a computer program comprising instructions, wherein execution of the program by a processing element is to cause the processing element to carry out the method, techniques, or process as described in or related to any of examples 1A-14D, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |

46

-continued

| | |
|---|---|
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital Expenditure |
| CBD | Candidate Beam Detection |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |

-continued

| | | |
|---|---|---|
| CDMA | Code-Division Multiple Access | |
| CDR | Charging Data Request | |
| CDR | Charging Data Response | |
| CFRA | Contention Free Random Access | |
| CG | Cell Group | |
| CGF | Charging Gateway Function | |
| CHF | Charging Function | |
| CI | Cell Identity | |
| CID | Cell-ID (e.g., positioning method) | |
| CIM | Common Information Model | |
| CIR | Carrier to Interference Ratio | |
| CK | Cipher Key | |
| CM | Connection Management, Conditional Mandatory | |
| CMAS | Commercial Mobile Alert Service | |
| CMD | Command | |
| CMS | Cloud Management System | |
| CO | Conditional Optional | |
| CoMP | Coordinated Multi-Point | |
| CORESET | Control Resource Set | |
| COTS | Commercial Off-The-Shelf | |
| CP | Control Plane, Cyclic Prefix, Connection Point | |
| CPD | Connection Point Description | |
| CPE | Customer Premise Equipment | |
| CPICH | Common Pilot Channel | |
| CQI | Channel Quality Indicator | |
| CPU | CSI processing unit, Central Processing Unit | |
| C/R | Command/Response field bit | |
| CRAN | Cloud Ratio Access Network, Cloud RAN | |
| CRB | Common Resource Block | |
| CRC | Cyclic Redundancy Check | |
| CRI | Channel-State Information Resource Indicator, CSI-RS Resource Indicator | |
| C-RNTI | Cell RNTI | |
| CS | Circuit Switched | |
| CSCF | call session control function | |
| CSAR | Cloud Service Archive | |
| CSI | Channel-State Information | |
| CSI-IM | CSI Interference Measurement | |

-continued

| | | |
|---|---|---|
| CSI-RS | CSI Reference Signal | |
| CSI-RSRP | CSI reference signal received power | |
| CSI-RSRQ | CSI reference signal received quality | |
| CSI-SINR | CSI signal-to-noise and interference ratio | |
| CSMA | Carrier Sense Multiple Access | |
| CSMA/CA | CSMA with collision avoidance | |
| CSS | Common Search Space, Cell- specific Search Space | |
| CTF | Charging Trigger Function | |
| CTS | Clear-to-Send | |
| CW | Codeword | |
| CWS | Contention Window Size | |
| D2D | Device-to-Device | |
| DC | Dual Connectivity, Direct Current | |
| DCI | Downlink Control Information | |
| DF | Deployment Flavour | |
| DL | Downlink | |
| DMTF | Distributed Management Task Force | |
| DPDK | Data Plane Development Kit | |
| DM-RS, DMRS | Demodulation Reference Signal | |
| DN | Data network | |
| DNN | Data Network Name | |
| DNAI | Data Network Access Identifier | |
| DRB | Data Radio Bearer | |
| DRS | Discovery Reference Signal | |
| DRX | Discontinuous Reception | |
| DSL | Domain Specific Language. Digital Subscriber Line | |
| DSLAM | DSL Access Multiplexer | |
| DwPTS | Downlink Pilot Time Slot | |
| E-LAN | Ethernet Local Area Network | |
| E2E | End-to-End | |
| EAS | Edge Application Server | |
| ECCA | extended clear channel assessment, extended CCA | |
| ECCE | Enhanced Control Channel Element, Enhanced CCE | |
| ED | Energy Detection | |
| EDGE | Enhanced Datarates for GSM Evolution (GSM Evolution) | |
| EAS | Edge Application Server | |

-continued

-continued

| | | |
|---|---|---|
| EASID | Edge Application Server Identification | |
| ECS | Edge Configuration Server | |
| ECSP | Edge Computing Service Provider | |
| EDN | Edge Data Network | |
| EEC | Edge Enabler Client | |
| EECID | Edge Enabler Client Identification | |
| EES | Edge Enabler Server | |
| EESID | Edge Enabler Server Identification | |
| EHE | Edge Hosting Environment | |
| EGMF | Exposure Governance Management Function | |
| EGPRS | Enhanced GPRS | |
| EIR | Equipment Identity Register | |
| eLAA | enhanced Licensed Assisted Access, enhanced LAA | |
| EM | Element Manager | |
| eMBB | Enhanced Mobile Broadband | |
| EMS | Element Management System | |
| eNB | evolved NodeB, E-UTRAN Node B | |
| EN-DC | E-UTRA-NR Dual Connectivity | |
| EPC | Evolved Packet Core | |
| EPDCCH | enhanced PDCCH, enhanced Physical Downlink Control Cannel | |
| EPRE | Energy per resource element | |
| EPS | Evolved Packet System | |
| EREG | enhanced REG, enhanced resource element groups | |
| ETSI | European Telecommunications Standards Institute | |
| ETWS | Earthquake and Tsunami Warning System | |
| eUICC | embedded UICC, embedded Universal Integrated Circuit Card | |
| E-UTRA | Evolved UTRA | |
| E-UTRAN | Evolved UTRAN | |
| EV2X | Enhanced V2X | |
| F1AP | F1 Application Protocol | |
| F1-C | F1 Control plane interface | |

| | | |
|---|---|---|
| F1-U | F1 User plane interface | |
| FACCH | Fast Associated Control CHannel | |
| FACCH/F | Fast Associated Control Channel/Full rate | |
| FACCH/H | Fast Associated Control Channel/Half rate | |
| FACH | Forward Access Channel | |
| FAUSCH | Fast Uplink Signalling Channel | |
| FB | Functional Block | |
| FBI | Feedback Information | |
| FCC | Federal Communications Commission | |
| FCCH | Frequency Correction CHannel | |
| FDD | Frequency Division Duplex | |
| FDM | Frequency Division Multiplex | |
| FDMA | Frequency Division Multiple Access | |
| FE | Front End | |
| FEC | Forward Error Correction | |
| FFS | For Further Study | |
| FFT | Fast Fourier Transformation | |
| feLAA | further enhanced Licensed Assisted Access, further enhanced LAA | |
| FN | Frame Number | |
| FPGA | Field-Programmable Gate Array | |
| FR | Frequency Range | |
| FQDN | Fully Qualified Domain Name | |
| G-RNTI | GERAN Radio Network Temporary Identity | |
| GERAN | GSM EDGE RAN, GSM EDGE Radio Access Network | |
| GGSN | Gateway GPRS Support Node | |
| GLONASS | GLObal'naya NAvigatsionnaya Sputnikovaya Sistema (Engl.: Global Navigation Satellite System) | |
| gNB | Next Generation NodeB | |
| gNB-CU | gNB-centralized unit, Next Generation NodeB centralized unit | |

| | | |
|---|---|---|
| gNB-DU | gNB-distributed unit, Next Generation NodeB distributed unit | |
| GNSS | Global Navigation Satellite System | |
| GPRS | General Packet Radio Service | |
| GPSI | Generic Public Subscription Identifier | |
| GSM | Global System for Mobile Communications, Groupe Spécial Mobile | |
| GTP | GPRS Tunneling Protocol | |
| GRP-UGPRS | Tunnelling Protocol for User Plane | |
| GTS | Go To Sleep Signal (related to WUS) | |
| GUMMEI | Globally NodeB Unique MME Identifier | |
| GUTI | Globally Unique Temporary UE Identity | |
| HARQ | Hybrid ARQ, Hybrid Automatic Repeat Request | |
| HANDO | Handover | |
| HFN | HyperFrame Number | |
| HHO | Hard Handover | |
| HLR | Home Location Register | |
| HN | Home Network | |
| HO | Handover | |
| HPLMN | Home Public Land Mobile Network | |
| HSDPA | High Speed Downlink Packet Access | |
| HSN | Hopping Sequence Number | |
| HSPA | High Speed Packet Access | |
| HSS | Home Subscriber Server | |
| HSUPA | High Speed Uplink Packet Access | |
| HTTP | Hyper Text Transfer Protocol | |
| HTTPS | Hyper Text Transfer Protocol Secure (https is http/1.1 over SSL, i.e. port 443) | |
| I-Block | Information Block | |
| ICCID | Integrated Circuit Card Identification | |
| IAB | Integrated Access and Backhaul | |
| ICIC | Inter-Cell Interference Coordination | |

| | | |
|---|---|---|
| ID | Identity, identifier | |
| IDFT | Inverse Discrete Fourier Transform | |
| IE | Information element | |
| IBE | In-Band Emission | |
| IEEE | Institute of Electrical and Electronics Engineers | |
| IEI | Information Element Identifier | |
| IEIDL | Information Element Identifier Data Length | |
| IETF | Internet Engineering Task Force | |
| IF | Infrastructure | |
| IIOT | Industrial Internet of Things | |
| IM | Interference Measurement, Intermodulation, Multimedia | |
| IP | | |
| IMC | IMS Credentials | |
| IMEI | International Mobile Equipment Identity | |
| IMGI | International mobile group identity | |
| IMPI | IP Multimedia Private Identity | |
| IMPU | IP Multimedia PUblic identity | |
| IMS | IP Multimedia Subsystem | |
| IMSI | International Mobile Subscriber Identity | |
| IoT | Internet of Things | |
| IP | Internet Protocol | |
| Ipsec | IP Security, Internet Protocol Security | |
| IP-CAN | IP-Connectivity Access Network | |
| IP-M | IP Multicast | |
| IPv4 | Internet Protocol Version 4 | |
| IPv6 | Internet Protocol Version 6 | |
| IR | Infrared | |
| IS | In Sync | |
| IRP | Integration Reference Point | |
| ISDN | Integrated Services Digital Network | |
| ISIM | IM Services Identity Module | |
| ISO | International Organisation for Standardisation | |
| ISP | Internet Service Provider | |
| IWF | Interworking-Function | |
| I-WLAN | Interworking WLAN | |
| | Constraint length of the convolutional code, USIM Individual key | |
| kB | Kilobyte (1000 bytes) | |

-continued

-continued

| | | |
|---|---|---|
| kbps | kilo-bits per second | |
| Kc | Ciphering key | |
| Ki | Individual subscriber authentication key | |
| KPI | Key Performance Indicator | |
| KQI | Key Quality Indicator | |
| KSI | Key Set Identifier | |
| ksps | kilo-symbols per second | |
| KVM | Kernel Virtual Machine | |
| L1 | Layer 1 (physical layer) | |
| L1-RSRP | Layer 1 reference signal received power | |
| L2 | Layer 2 (data link layer) | |
| L3 | Layer 3 (network layer) | |
| LAA | Licensed Assisted Access | |
| LAN | Local Area Network | |
| LADN | Local Area Data Network | |
| LBT | Listen Before Talk | |
| LCM | LifeCycle Management | |
| LCR | Low Chip Rate | |
| LCS | Location Services | |
| LCID | Logical Channel ID | |
| LI | Layer Indicator | |
| LLC | Logical Link Control, Low Layer Compatibility | |
| LMF | Location Management Function | |
| LOS | Line of Sight | |
| LPLMN | Local PLMN | |
| LPP | LTE Positioning Protocol | |
| LSB | Least Significant Bit | |
| LTE | Long Term Evolution | |
| LWA | LTE-WLAN aggregation | |
| LWIP | LTE/WLAN Radio Level Integration with IPsec Tunnel | |
| LTE | Long Term Evolution | |
| M2M | Machine-to-Machine | |
| MAC | Medium Access Control (protocol layering context) | |
| MAC | Message authentication code (security/encryption context) | |
| MAC-A | MAC used for authentication and key agreement (TSG T WG3 context) | |
| MAC-I | MAC used for data integrity of signalling messages (TSG T WG3 context) | |

| | |
|---|---|
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, Scheduling |
| MCH | Information |
| MSID | Mobile Station Identifier |

-continued

| | |
|---|---|
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, | N-MIB Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |

-continued

| | |
|---|---|
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |

US 12,684,454 B2

57
-continued

| PDCP | Packet Data Convergence Protocol, Packet Data Convergence Protocol layer | |
| PDCCH | Physical Downlink Control Channel | |
| PDCP | Packet Data Convergence Protocol | 10 |
| PDN | Packet Data Network, Public Data Network | |
| PDSCH | Physical Downlink Shared Channel | |
| PDU | Protocol Data Unit | 15 |
| PEI | Permanent Equipment Identifiers | |
| PFD | Packet Flow Description | |
| P-GW | PDN Gateway | 20 |
| PHICH | Physical hybrid-ARQ indicator channel | |
| PHY | Physical layer | |
| PLMN | Public Land Mobile Network | 25 |
| PIN | Personal Identification Number | |
| PM | Performance Measurement | 30 |
| PMI | Precoding Matrix Indicator | |
| PNF | Physical Network Function | |
| PNFD | Physical Network Function Descriptor | 35 |
| PNFR | Physical Network Function Record | |
| POC | PTT Point over Cellular | |
| PP, PTP | Point-to-Point | |
| PPP | Point-to-Point Protocol | 40 |
| PRACH | Physical RACH | |
| PRB | Physical resource block | |
| PRG | Physical resource block group | 45 |
| ProSe | Proximity Services, Proximity-Based Service | |
| PRS | Positioning Reference Signal | 50 |
| PRR | Packet Reception Radio | |
| PS | Packet Services | |
| PSBCH | Physical Sidelink Broadcast Channel | 55 |
| PSDCH | Physical Sidelink Downlink Channel | |
| PSCCH | Physical Sidelink Control Channel | 60 |
| PSSCH | Physical Sidelink Shared Channel | |
| PSFCH | physical sidelink feedback channel | 65 |

58
-continued

| PSCell | Primary SCell | |
| PSS | Primary Synchronization Signal | |
| PSTN | Public Switched Telephone Network | |
| PT-RS | Phase-tracking reference signal | |
| PTT | Push-to-Talk | |
| PUCCH | Physical Uplink Control Channel | |
| PUSCH | Physical Uplink Shared Channel | |
| QAM | Quadrature Amplitude Modulation | |
| QCI | QoS class of identifier | |
| QCL | Quasi co-location | |
| QFI | QoS Flow ID, QoS Flow Identifier | |
| | QoS Quality of Service | |
| | QPSK Quadrature (Quaternary) Phase Shift Keying | |
| QZSS | Quasi-Zenith Satellite System | |
| RA-RNTI | Random Access RNTI | |
| RAB | Radio Access Bearer, Random Access Burst | |
| RACH | Random Access Channel | |
| RADIUS | Remote Authentication Dial In User Service | |
| RAN | Radio Access Network | |
| RAND | RANDom number (used for authentication) | |
| RAR | Random Access Response | |
| RAT | Radio Access Technology | |
| RAU | Routing Area Update | |
| RB | Resource block, Radio Bearer | |
| RBG | Resource block group | |
| REG | Resource Element Group | |
| Rel | Release | |
| REQ | REQuest | |
| RF | Radio Frequency | |
| RI | Rank Indicator | |
| RIV | Resource indicator value | |
| RL | Radio Link | |
| RLC | Radio Link Control, Radio Link Control layer | |
| RLC AM | RLC Acknowledged Mode | |
| RLC UM | RLC Unacknowledged Mode | |
| RLF | Radio Link Failure | |
| RLM | Radio Link Monitoring | |
| RLM-RS | Reference Signal for RLM | |
| RM | Registration Management | |

-continued

-continued

| | | |
|---|---|---|
| RMC | Reference Measurement Channel | |
| RMSI | Remaining MSI, Remaining Minimum System Information | |
| RN | Relay Node | |
| RNC | Radio Network Controller | |
| RNL | Radio Network Layer | |
| RNTI | Radio Network Temporary Identifier | |
| ROHC | RObust Header Compression | |
| RRC | Radio Resource Control, Radio Resource Control layer | |
| RRM | Radio Resource Management | |
| RS | Reference Signal | |
| RSRP | Reference Signal Received Power | |
| RSRQ | Reference Signal Received Quality | |
| RSSI | Received Signal Strength Indicator | |
| RSU | Road Side Unit | |
| RSTD | Reference Signal Time difference | |
| RTP | Real Time Protocol | |
| RTS | Ready-To-Send | |
| RTT | Round Trip Time | |
| Rx | Reception, Receiving, Receiver | |
| S1AP | S1 Application Protocol | |
| S1-MME | S1 for the control plane | |
| S1-U | S1 for the user plane | |
| S-CSCF | serving CSCF | |
| S-GW | Serving Gateway | |
| S-RNTI | SRNC Radio Network Temporary Identity | |
| S-TMSI | SAE Temporary Mobile Station Identifier | |
| SA | Standalone operation mode | |
| SAE | System Architecture Evolution | |
| SAP | Service Access Point | |
| SAPD | Service Access Point Descriptor | |
| SAPI | Service Access Point Identifier | |
| SCC | Secondary Component Carrier, Secondary CC | |
| SCell | Secondary Cell | |
| SCEF | Service Capability Exposure Function | |
| SC-FDMA | Single Carrier Frequency Division Multiple Access | |
| SCG | Secondary Cell Group | |
| SCM | Security Context Management | |

| | | |
|---|---|---|
| SCS | Subcarrier Spacing | |
| SCTP | Stream Control Transmission Protocol | |
| SDAP | Service Data Adaptation Protocol, Service Data Adaptation Protocol layer | |
| SDL | Supplementary Downlink | |
| SDNF | Structured Data Storage Network Function | |
| SDP | Session Description Protocol | |
| SDSF | Structured Data Storage Function | |
| SDT | Small Data Transmission | |
| SDU | Service Data Unit | |
| SEAF | Security Anchor Function | |
| SeNB | secondary eNB | |
| SEPP | Security Edge Protection Proxy | |
| SFI | Slot format indication | |
| SFTD | Space-Frequency Time Diversity, SFN and frame timing difference | |
| SFN | System Frame Number | |
| SgNB | Secondary gNB | |
| SGSN | Serving GPRS Support Node | |
| S-GW | Serving Gateway | |
| SI | System Information | |
| SI-RNTI | System Information RNTI | |
| SIB | System Information Block | |
| SIM | Subscriber Identity Module | |
| SIP | Session Initiated Protocol | |
| SiP | System in Package | |
| SL | Sidelink | |
| SLA | Service Level Agreement | |
| SM | Session Management | |
| SMF | Session Management Function | |
| SMS | Short Message Service | |
| SMSF | SMS Function | |
| SMTC | SSB-based Measurement Timing Configuration | |
| SN | Secondary Node, Sequence Number | |
| SoC | System on Chip | |
| SON | Self-Organizing Network | |
| SpCell | Special Cell | |
| SP-CSI-RNTI | Semi-Persistent CSI RNTI | |
| SPS | Semi-Persistent Scheduling | |
| SQN | Sequence number | |
| SR | Scheduling Request | |

-continued

| | | |
|---|---|---|
| SRB | Signalling Radio Bearer | |
| SRS | Sounding Reference Signal | |
| SS | Synchronization Signal | |
| SSB | Synchronization Signal Block | |
| SSID | Service Set Identifier | |
| SS/PBCH | Block | |
| SSBRI | SS/PBCH Block Resource Indicator, Synchronization Signal Block Resource Indicator | |
| SSC | Session and Service Continuity | |
| SS-RSRP | Synchronization Signal based Reference Signal Received Power | |
| SS-RSRQ | Synchronization Signal based Reference Signal Received Quality | |
| SS-SINR | Synchronization Signal based Signal to Noise and Interference Ratio | |
| SSS | Secondary Synchronization Signal | |
| SSSG | Search Space Set Group | |
| SSSIF | Search Space Set Indicator | |
| SST | Slice/Service Types | |
| SU-MIMO | Single User MIMO | |
| SUL | Supplementary Uplink | |
| TA | Timing Advance, Tracking Area | |
| TAC | Tracking Area Code | |
| TAG | Timing Advance Group | |
| TAI | Tracking Area Identity | |
| TAU | Tracking Area Update | |
| TB | Transport Block | |
| TBS | Transport Block Size | |
| TBD | To Be Defined | |
| TCI | Transmission Configuration Indicator | |
| TCP | Transmission Communication Protocol | |
| TDD | Time Division Duplex | |
| TDM | Time Division Multiplexing | |
| TDMA | Time Division Multiple Access | |
| TE | Terminal Equipment | |
| TEID | Tunnel End Point Identifier | |
| TFT | Traffic Flow Template | |
| TMSI | Temporary Mobile Subscriber Identity | |
| TNL | Transport Network Layer | |

-continued

| | |
|---|---|
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |

-continued

| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "application" may refer to a complete and deployable package, environment to achieve a certain function in an operational environment. The term "AI/ML application" or the like may be an application that contains some AI/ML models and application-level descriptions.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field"

refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The invention claimed is:

1. An apparatus to be used in a user equipment (UE) configured for operation in a fifth-generation new-radio (5G NR) network, wherein the apparatus comprises:

a memory to store a medium access control (MAC) control element (CE) that is received from a gNodeB (gNB) of a serving cell to which the UE and a relay UE belong, the MAC CE to activate a sidelink radio bearer (SLRB) for packet data convergence protocol (PDCP) duplication; and one or more processors to identify, based on the MAC CE, that the UE is to communicate with the gNB via multiple communication paths comprising:

a direct path comprising a first communication link directly between the UE and the gNB, the first communication link being over a uU interface of the 5G NR network; and a relayed path comprising a sidelink between the UE and the relay UE using a sidelink interface, and a second communication link over the uU interface directly between the relay UE and the gNB, wherein:

the sidelink interface uses the SLRB, the uU interface and the sidelink interface use channels in different operating bands, and the one or more processors are configured to perform the PDCP duplication per radio bearer using the direct and relayed paths.

2. The apparatus of claim 1, wherein prior to communicating via the multiple communication paths, the apparatus is to:

perform, based on the MAC CE, measurement of a link of the direct path or the relayed path; and report, to the gNB prior to performance of the communicating via the multiple communication paths, a result of the measurement.

3. The apparatus of claim 1, wherein the MAC CE is a first MAC CE, and wherein the one or more processors are further to deactivate, based on a second MAC CE received from the gNB, the SLRB PDCP duplication.

4. One or more non-transitory computer-readable media comprising instructions that, upon execution of the instructions by one or more processors, are to cause a gNodeB (gNB) for operation in a fifth-generation new-radio (5G NR) network to:

generate a medium access control (MAC) control element (CE) that includes an indication that a remote UE of a serving cell to which the gNB and a relay UE belong is to activate a sidelink radio bearer (SLRB) for packet data convergence protocol (PDCP) duplication using multiple communication paths; and transmit the MAC CE to the remote UE;

wherein performing the PDCP duplication using the multiple communication paths comprises a direct path comprising a first communication link directly between the UE and the gNB, the first communication link being over a uU interface of the 5G NR network; and a relayed path comprising a sidelink between the UE and the relay UE using a sidelink interface, and a second communication link over the uU interface directly between the relay UE and the gNB, wherein:

the sidelink interface uses the SLRB, the uU interface and the sidelink interface use channels in different operating bands, and the one or more processors are configured to perform the PDCP duplication per radio bearer using the direct and relayed paths.

5. The one or more non-transitory computer-readable media of claim 4, wherein prior to communicating via the multiple communication paths, the gNB is configured to receive a measurement of a link of the direct path or the relayed path from the UE.

6. The one or more non-transitory computer-readable media of claim 4, wherein the instructions are further to transmit, from the gNB to the remote UE, a second MAC CE that includes an indication that the remote UE is to deactivate the SLRB PDCP duplication.

7. The apparatus of claim 1, wherein the sidelink interface is a PC5 interface.

8. The one or more non-transitory computer-readable media of claim 4 wherein the sidelink interface is a PC5 interface.

* * * * *